(12) United States Patent
Khandelwal et al.

(10) Patent No.: US 8,781,969 B2
(45) Date of Patent: Jul. 15, 2014

(54) EXTENSIBLE MEDIA RIGHTS

(75) Inventors: Vikas Khandelwal, Redmond, WA (US); Eduardo P. Oliveira, Redmond, WA (US); Clifford P. Van Dyke, Bellevue, WA (US); Mark D. VanAntwerp, Bellevue, WA (US); Clifford P. Storm, Sammamish, WA (US); James M. Alkove, Woodinville, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 12/835,569

(22) Filed: Jul. 13, 2010

(65) Prior Publication Data

US 2010/0280954 A1 Nov. 4, 2010

Related U.S. Application Data

(63) Continuation of application No. 11/134,719, filed on May 20, 2005, now abandoned.

(51) Int. Cl.
*G06F 21/00* (2013.01)
*G06Q 20/00* (2012.01)

(52) U.S. Cl.
USPC .......................................................... 705/51

(58) Field of Classification Search
USPC .............. 705/51, 16, 21, 59, 71; 308/44, 262, 308/278, 279
See application file for complete search history.

(56) References Cited

U.S. PATENT DOCUMENTS

| | | |
|---|---|---|
| 3,718,906 A | 2/1973 | Lightner |
| 4,183,085 A | 1/1980 | Roberts |
| 4,202,051 A | 5/1980 | Davida et al. |
| 4,323,921 A | 4/1982 | Guillou |
| 4,405,829 A | 9/1983 | Rivest |
| 4,528,643 A | 7/1985 | Freeny, Jr. |
| 4,529,870 A | 7/1985 | Chaum |
| 4,558,176 A | 12/1985 | Arnold |
| 4,620,150 A | 10/1986 | Germer |
| 4,658,093 A | 4/1987 | Hellman |
| 4,683,553 A | 7/1987 | Mollier |
| 4,747,139 A | 5/1988 | Taaffe |
| 4,750,034 A | 6/1988 | Lem |
| 4,799,259 A | 1/1989 | Ogrodski |
| 4,817,094 A | 3/1989 | Lebizay |
| 4,827,508 A | 5/1989 | Shear |
| 4,855,730 A | 8/1989 | Venners |

(Continued)

FOREIGN PATENT DOCUMENTS

| | | |
|---|---|---|
| AU | 9741703 | 3/1998 |
| CA | 2373542 | 11/2002 |

(Continued)

OTHER PUBLICATIONS

Canadian Application 2505295, Office Action mailed Nov. 19, 2013, 4 pages.

(Continued)

*Primary Examiner* — Dante Ravetti
(74) *Attorney, Agent, or Firm* — Carole Boelitz; Micky Minhas

(57) ABSTRACT

A DRM System. A DRM system comprising a service provider, a CE device coupled to the service provider, and an XMR license disposed upon the CE device.

20 Claims, 8 Drawing Sheets

(56) References Cited

U.S. PATENT DOCUMENTS

| | | |
|---|---|---|
| 4,855,922 A | 8/1989 | Huddleston |
| 4,857,999 A | 8/1989 | Welsh |
| 4,910,692 A | 3/1990 | Outram |
| 4,916,738 A | 4/1990 | Chandra et al. |
| 4,926,479 A | 5/1990 | Goldwasser et al. |
| 4,953,209 A | 8/1990 | Ryder, Sr. et al. |
| 4,959,774 A | 9/1990 | Davis |
| 4,967,273 A | 10/1990 | Greenberg |
| 4,977,594 A | 12/1990 | Shear |
| 5,001,752 A | 3/1991 | Fischer |
| 5,008,935 A | 4/1991 | Roberts |
| 5,012,514 A | 4/1991 | Renton |
| 5,029,206 A | 7/1991 | Mario et al. |
| 5,047,928 A | 9/1991 | Wiedemer |
| 5,048,086 A | 9/1991 | Bianco et al. |
| 5,050,213 A | 9/1991 | Shear |
| 5,103,392 A | 4/1992 | Mori |
| 5,103,476 A | 4/1992 | Waite et al. |
| 5,109,413 A | 4/1992 | Comerford et al. |
| 5,117,457 A | 5/1992 | Comerford et al. |
| 5,124,117 A | 6/1992 | Tatebayashi et al. |
| 5,142,578 A | 8/1992 | Matyas et al. |
| 5,159,633 A | 10/1992 | Nakamura |
| 5,163,092 A | 11/1992 | McNesby et al. |
| 5,177,790 A | 1/1993 | Hazard |
| 5,193,573 A | 3/1993 | Chronister |
| 5,204,897 A | 4/1993 | Wyman |
| 5,222,134 A | 6/1993 | Waite et al. |
| 5,241,602 A | 8/1993 | Lee et al. |
| 5,249,184 A | 9/1993 | Woest |
| 5,257,282 A | 10/1993 | Adkisson et al. |
| 5,260,999 A | 11/1993 | Wyman |
| 5,261,002 A | 11/1993 | Perlman et al. |
| 5,267,316 A | 11/1993 | Merino Gonzalez et al. |
| 5,269,019 A | 12/1993 | Peterson |
| 5,274,368 A | 12/1993 | Breeden |
| 5,287,537 A | 2/1994 | Newmark et al. |
| 5,301,268 A | 4/1994 | Takeda |
| 5,303,370 A | 4/1994 | Brosh |
| 5,319,705 A | 6/1994 | Halter et al. |
| 5,327,365 A | 7/1994 | Fujisaki et al. |
| 5,335,346 A | 8/1994 | Fabbio |
| 5,355,161 A | 10/1994 | Bird |
| 5,369,262 A | 11/1994 | Dvorkis |
| 5,406,630 A | 4/1995 | Piosenka |
| 5,410,598 A | 4/1995 | Shear |
| 5,414,861 A | 5/1995 | Horning |
| 5,437,040 A | 7/1995 | Campbell |
| 5,438,508 A | 8/1995 | Wyman |
| 5,440,640 A | 8/1995 | Anshel et al. |
| 5,442,704 A | 8/1995 | Holtey |
| 5,444,780 A | 8/1995 | Hartman, Jr. |
| 5,444,782 A | 8/1995 | Adams et al. |
| 5,448,045 A | 9/1995 | Clark |
| 5,457,699 A | 10/1995 | Bode |
| 5,459,867 A | 10/1995 | Adams |
| 5,469,506 A | 11/1995 | Berson et al. |
| 5,473,692 A | 12/1995 | Davis |
| 5,479,514 A | 12/1995 | Klonowski |
| 5,485,577 A | 1/1996 | Eyer et al. |
| 5,490,216 A | 2/1996 | Richardson, III |
| 5,500,897 A | 3/1996 | Hartman, Jr. |
| 5,502,766 A | 3/1996 | Boebert et al. |
| 5,509,070 A | 4/1996 | Schull |
| 5,513,319 A | 4/1996 | Finch |
| 5,522,040 A | 5/1996 | Hofsäss |
| 5,530,846 A | 6/1996 | Strong |
| 5,535,276 A | 7/1996 | Ganesan |
| 5,552,776 A | 9/1996 | Wade |
| 5,553,139 A | 9/1996 | Ross et al. |
| 5,553,143 A | 9/1996 | Ross et al. |
| 5,557,765 A | 9/1996 | Lipner et al. |
| 5,563,799 A | 10/1996 | Brehmer |
| 5,568,552 A | 10/1996 | Davis |
| 5,570,465 A | 10/1996 | Tsakanikas |
| 5,586,291 A | 12/1996 | Lasker |
| 5,588,060 A | 12/1996 | Aziz |
| 5,604,755 A | 2/1997 | Bertin et al. |
| 5,629,980 A | 5/1997 | Stefik et al. |
| 5,634,012 A | 5/1997 | Stefik et al. |
| 5,636,292 A | 6/1997 | Rhoads |
| 5,638,443 A | 6/1997 | Stefik et al. |
| 5,638,513 A | 6/1997 | Ananda |
| 5,666,416 A | 9/1997 | Micali |
| 5,668,877 A | 9/1997 | Aziz |
| 5,671,412 A | 9/1997 | Christiano |
| 5,673,316 A | 9/1997 | Auerbach et al. |
| 5,708,709 A | 1/1998 | Rose |
| 5,710,706 A | 1/1998 | Märkl |
| 5,710,887 A | 1/1998 | Chelliah et al. |
| 5,715,403 A | 2/1998 | Stefik |
| 5,717,757 A | 2/1998 | Micali |
| 5,721,788 A | 2/1998 | Powell |
| 5,724,425 A | 3/1998 | Chang et al. |
| 5,726,898 A | 3/1998 | Jacobs |
| 5,740,246 A | 4/1998 | Saito |
| 5,745,573 A | 4/1998 | Lipner et al. |
| 5,745,879 A | 4/1998 | Wyman |
| 5,754,657 A | 5/1998 | Schipper et al. |
| 5,754,763 A | 5/1998 | Bereiter |
| 5,757,908 A | 5/1998 | Cooper et al. |
| 5,758,068 A | 5/1998 | Brandt et al. |
| 5,758,069 A | 5/1998 | Olsen |
| 5,761,669 A | 6/1998 | Montague et al. |
| 5,763,832 A | 6/1998 | Anselm |
| 5,764,275 A | 6/1998 | Lappington |
| 5,765,152 A | 6/1998 | Erickson |
| 5,768,382 A | 6/1998 | Schneier |
| 5,771,354 A | 6/1998 | Crawford |
| 5,774,870 A | 6/1998 | Storey |
| 5,787,179 A | 7/1998 | Ogawa et al. |
| 5,790,664 A | 8/1998 | Coley et al. |
| 5,793,839 A | 8/1998 | Farris |
| 5,793,868 A | 8/1998 | Micali |
| 5,796,967 A | 8/1998 | Filepp et al. |
| 5,799,088 A | 8/1998 | Raike |
| 5,799,090 A | 8/1998 | Angert |
| 5,802,592 A | 9/1998 | Chess |
| 5,809,144 A | 9/1998 | Sirbu et al. |
| 5,809,145 A | 9/1998 | Byrne et al. |
| 5,812,857 A | 9/1998 | Nelson et al. |
| 5,825,876 A | 10/1998 | Peterson, Jr. et al. |
| 5,825,877 A | 10/1998 | Dan |
| 5,825,879 A | 10/1998 | Davis |
| 5,825,883 A | 10/1998 | Archibald |
| 5,841,865 A | 11/1998 | Sudia |
| 5,844,986 A | 12/1998 | Davis |
| 5,845,065 A | 12/1998 | Conte |
| 5,845,281 A | 12/1998 | Benson et al. |
| 5,852,665 A | 12/1998 | Gressel et al. |
| 5,864,620 A | 1/1999 | Pettitt et al. |
| 5,872,846 A | 2/1999 | Ichikawa |
| 5,875,236 A | 2/1999 | Jankowitz |
| 5,883,670 A | 3/1999 | Sporer |
| 5,883,955 A | 3/1999 | Ronning |
| 5,883,958 A | 3/1999 | Ishiguro et al. |
| 5,892,900 A | 4/1999 | Ginter et al. |
| 5,892,906 A | 4/1999 | Chou |
| 5,893,086 A | 4/1999 | Schmuck |
| 5,905,799 A | 5/1999 | Ganesan |
| 5,910,987 A | 6/1999 | Ginter et al. |
| 5,915,025 A | 6/1999 | Sato et al. |
| 5,917,912 A | 6/1999 | Ginter et al. |
| 5,925,127 A | 7/1999 | Ahmad |
| 5,926,624 A | 7/1999 | Katz et al. |
| 5,933,498 A | 8/1999 | Schneck et al. |
| 5,934,422 A | 8/1999 | Steed |
| 5,935,248 A | 8/1999 | Kuroda |
| 5,943,248 A | 8/1999 | Clapp |
| 5,943,422 A | 8/1999 | Van Wie et al. |
| 5,948,061 A | 9/1999 | Merriman |
| 5,949,877 A | 9/1999 | Traw et al. |
| 5,949,879 A | 9/1999 | Benson et al. |
| 5,951,642 A | 9/1999 | Onoe et al. |

(56) References Cited

U.S. PATENT DOCUMENTS

| | | | |
|---|---|---|---|
| 5,953,420 A | 9/1999 | Matyas, Jr. et al. |
| 5,953,502 A | 9/1999 | Helbig, Sr. |
| 5,956,408 A | 9/1999 | Arnold |
| 5,958,050 A | 9/1999 | Barnes et al. |
| 5,982,891 A | 11/1999 | Ginter et al. |
| 5,982,898 A | 11/1999 | Hsu et al. |
| 5,983,238 A | 11/1999 | Becker et al. |
| 5,983,350 A | 11/1999 | Minear et al. |
| 5,991,399 A | 11/1999 | Graunke et al. |
| 5,991,406 A | 11/1999 | Lipner et al. |
| 5,994,710 A | 11/1999 | Knee |
| 5,995,625 A | 11/1999 | Sudia et al. |
| 5,999,629 A | 12/1999 | Maher et al. |
| 5,999,921 A | 12/1999 | Arsenault |
| 6,002,772 A | 12/1999 | Saito |
| 6,005,945 A | 12/1999 | Whitehouse |
| 6,006,332 A | 12/1999 | Rabne et al. |
| 6,009,177 A | 12/1999 | Sudia |
| 6,021,438 A | 2/2000 | Duvvoori |
| 6,023,510 A | 2/2000 | Epstein |
| 6,023,766 A * | 2/2000 | Yamamura ............ 726/29 |
| 6,026,293 A | 2/2000 | Osborn |
| 6,028,596 A | 2/2000 | Oka |
| 6,047,242 A | 4/2000 | Benson |
| 6,049,789 A | 4/2000 | Frison |
| 6,049,878 A | 4/2000 | Caronni et al. |
| 6,058,188 A | 5/2000 | Chandersekaran et al. |
| 6,058,476 A | 5/2000 | Matsuzaki |
| 6,061,451 A | 5/2000 | Muratani et al. |
| 6,061,794 A | 5/2000 | Angelo |
| 6,069,647 A | 5/2000 | Sullivan et al. |
| 6,072,874 A | 6/2000 | Shin et al. |
| 6,073,124 A | 6/2000 | Krishnan et al. |
| 6,078,667 A | 6/2000 | Johnson |
| 6,078,909 A | 6/2000 | Knutson |
| 6,085,976 A | 7/2000 | Sehr |
| 6,094,486 A | 7/2000 | Marchant |
| 6,094,487 A | 7/2000 | Butler et al. |
| 6,101,606 A | 8/2000 | Diersch et al. |
| 6,105,069 A | 8/2000 | Franklin |
| 6,112,181 A | 8/2000 | Shear et al. |
| 6,119,229 A | 9/2000 | Martinez |
| 6,122,741 A | 9/2000 | Patterson et al. |
| 6,131,162 A | 10/2000 | Yoshiura et al. |
| 6,138,236 A | 10/2000 | Mirov et al. |
| 6,141,754 A | 10/2000 | Choy |
| 6,147,773 A | 11/2000 | Taylor |
| 6,148,417 A | 11/2000 | da Silva |
| 6,151,676 A | 11/2000 | Cuccia et al. |
| 6,157,721 A | 12/2000 | Shear et al. |
| 6,158,011 A | 12/2000 | Chen et al. |
| 6,158,657 A | 12/2000 | Hall, III et al. |
| 6,163,512 A | 12/2000 | Jeun |
| 6,167,358 A | 12/2000 | Othmer et al. |
| 6,170,060 B1 | 1/2001 | Mott et al. |
| 6,175,825 B1 | 1/2001 | Fruechtel |
| 6,182,219 B1 | 1/2001 | Feldbau |
| 6,185,678 B1 | 2/2001 | Arbaugh |
| 6,188,995 B1 | 2/2001 | Garst et al. |
| 6,189,146 B1 | 2/2001 | Misra et al. |
| 6,192,392 B1 | 2/2001 | Ginter |
| 6,199,068 B1 | 3/2001 | Carpenter |
| 6,199,169 B1 | 3/2001 | Voth |
| 6,202,151 B1 | 3/2001 | Musgrave et al. |
| 6,212,634 B1 | 4/2001 | Geer et al. |
| 6,219,652 B1 | 4/2001 | Carter et al. |
| 6,219,788 B1 | 4/2001 | Flavin et al. |
| 6,223,291 B1 | 4/2001 | Phul |
| 6,226,618 B1 | 5/2001 | Downs et al. |
| 6,226,747 B1 | 5/2001 | Larsson et al. |
| 6,230,185 B1 | 5/2001 | Salas et al. |
| 6,230,272 B1 | 5/2001 | Lockhart et al. |
| 6,233,567 B1 | 5/2001 | Cohen |
| 6,233,600 B1 | 5/2001 | Salas et al. |
| 6,233,684 B1 | 5/2001 | Stefik et al. |
| 6,233,685 B1 | 5/2001 | Smith |
| 6,236,728 B1 | 5/2001 | Marchant |
| 6,237,098 B1 | 5/2001 | Libicki |
| 6,240,183 B1 | 5/2001 | Marchant |
| 6,243,439 B1 | 6/2001 | Arai |
| 6,243,470 B1 | 6/2001 | Coppersmith |
| 6,243,692 B1 | 6/2001 | Floyd et al. |
| 6,253,193 B1 | 6/2001 | Ginter et al. |
| 6,253,224 B1 | 6/2001 | Brice, Jr. |
| 6,256,774 B1 | 7/2001 | O'Leary et al. |
| 6,260,141 B1 | 7/2001 | Park |
| 6,263,313 B1 | 7/2001 | Milsted et al. |
| 6,263,431 B1 | 7/2001 | Lovelace |
| 6,266,420 B1 | 7/2001 | Langford et al. |
| 6,272,469 B1 | 8/2001 | Koritzinsky et al. |
| 6,275,586 B1 | 8/2001 | Kelly |
| 6,279,111 B1 | 8/2001 | Jensenworth |
| 6,279,156 B1 | 8/2001 | Amberg et al. |
| 6,286,051 B1 | 9/2001 | Becker et al. |
| 6,289,319 B1 | 9/2001 | Lockwood |
| 6,289,452 B1 | 9/2001 | Arnold et al. |
| 6,295,577 B1 | 9/2001 | Anderson |
| 6,298,446 B1 | 10/2001 | Schreiber |
| 6,301,361 B1 | 10/2001 | Mischenko et al. |
| 6,301,660 B1 | 10/2001 | Benson |
| 6,303,924 B1 | 10/2001 | Adan |
| 6,304,915 B1 | 10/2001 | Nguyen et al. |
| 6,304,973 B1 | 10/2001 | Williams |
| 6,314,408 B1 | 11/2001 | Salas et al. |
| 6,314,409 B2 | 11/2001 | Schneck |
| 6,321,314 B1 | 11/2001 | Van Dyke |
| 6,321,335 B1 | 11/2001 | Chu |
| 6,324,287 B1 | 11/2001 | Angert |
| 6,324,683 B1 | 11/2001 | Fuh et al. |
| 6,327,652 B1 | 12/2001 | England |
| 6,330,670 B1 | 12/2001 | England et al. |
| 6,332,025 B2 | 12/2001 | Takahashi et al. |
| 6,334,189 B1 | 12/2001 | Granger |
| 6,335,972 B1 | 1/2002 | Chandersekaran et al. |
| 6,343,280 B2 | 1/2002 | Clark |
| 6,345,256 B1 | 2/2002 | Milsted et al. |
| 6,345,294 B1 | 2/2002 | O'Toole |
| 6,353,888 B1 | 3/2002 | Kakehi et al. |
| 6,360,320 B1 | 3/2002 | Ishiguro et al. |
| 6,363,488 B1 | 3/2002 | Ginter |
| 6,367,017 B1 | 4/2002 | Gray |
| 6,373,047 B1 | 4/2002 | Adan |
| 6,374,354 B1 | 4/2002 | Walmsley et al. |
| 6,374,355 B1 | 4/2002 | Patel |
| 6,374,357 B1 | 4/2002 | Mohammed et al. |
| 6,385,596 B1 | 5/2002 | Wiser et al. |
| 6,385,727 B1 | 5/2002 | Cassagnol |
| 6,389,535 B1 | 5/2002 | Thomlinson et al. |
| 6,389,537 B1 | 5/2002 | Davis |
| 6,389,538 B1 | 5/2002 | Gruse et al. |
| 6,389,541 B1 | 5/2002 | Patterson |
| 6,393,125 B1 | 5/2002 | Barbir |
| 6,393,427 B1 | 5/2002 | Vu |
| 6,397,259 B1 | 5/2002 | Lincke et al. |
| 6,398,245 B1 | 6/2002 | Gruse et al. |
| 6,404,888 B1 | 6/2002 | Barbir |
| 6,405,923 B1 | 6/2002 | Seysen |
| 6,408,170 B1 | 6/2002 | Schmidt |
| 6,409,089 B1 | 6/2002 | Eskicioglu |
| 6,411,941 B1 | 6/2002 | Mullor et al. |
| 6,418,421 B1 | 7/2002 | Hurtado et al. |
| 6,424,714 B1 | 7/2002 | Wasilewski |
| 6,424,715 B1 | 7/2002 | Saito |
| 6,425,081 B1 | 7/2002 | Iwamura |
| 6,438,690 B1 | 8/2002 | Patel et al. |
| 6,441,813 B1 | 8/2002 | Ishibashi |
| 6,442,529 B1 | 8/2002 | Krishan |
| 6,442,690 B1 | 8/2002 | Howard et al. |
| 6,446,207 B1 | 9/2002 | Vanstone et al. |
| 6,449,719 B1 | 9/2002 | Baker |
| 6,460,140 B1 | 10/2002 | Schoch |
| 6,463,534 B1 | 10/2002 | Geiger |
| 6,475,180 B2 | 11/2002 | Peterson et al. |
| 6,477,649 B2 | 11/2002 | Kambayashi |

(56) References Cited

U.S. PATENT DOCUMENTS

| | | | |
|---|---|---|---|
| 6,490,680 B1 | 12/2002 | Scheidt |
| 6,496,858 B1 | 12/2002 | Frailong |
| 6,502,079 B1 | 12/2002 | Ball et al. |
| 6,505,300 B2 | 1/2003 | Chan et al. |
| 6,507,909 B1 | 1/2003 | Zurko et al. |
| 6,523,119 B2 | 2/2003 | Pavlin et al. |
| 6,527,638 B1 | 3/2003 | Walker et al. |
| 6,530,023 B1 | 3/2003 | Nissl |
| 6,532,451 B1 | 3/2003 | Schell et al. |
| 6,539,364 B2 | 3/2003 | Moribatake et al. |
| 6,549,626 B1 | 4/2003 | Al-Salqan |
| 6,550,011 B1 | 4/2003 | Sims, III |
| 6,557,104 B2 | 4/2003 | Vu et al. |
| 6,557,105 B1 | 4/2003 | Tardo et al. |
| 6,560,581 B1 | 5/2003 | Fox et al. |
| 6,560,651 B2 | 5/2003 | Katz et al. |
| 6,564,995 B1 | 5/2003 | Montgomery |
| 6,567,793 B1 | 5/2003 | Hicks |
| 6,571,216 B1 | 5/2003 | Garg et al. |
| 6,574,609 B1 | 6/2003 | Downs et al. |
| 6,574,611 B1 | 6/2003 | Matsuyama et al. |
| 6,574,612 B1 | 6/2003 | Baratti et al. |
| 6,581,162 B1 | 6/2003 | Angelo et al. |
| 6,581,331 B1 | 6/2003 | Kral |
| 6,585,158 B2 | 7/2003 | Norskog |
| 6,587,684 B1 | 7/2003 | Hsu et al. |
| 6,587,837 B1 | 7/2003 | Spagna et al. |
| 6,609,201 B1 | 8/2003 | Folmsbee |
| 6,615,349 B1 | 9/2003 | Hair |
| 6,615,350 B1 | 9/2003 | Schell et al. |
| 6,625,729 B1 | 9/2003 | Angelo |
| 6,631,478 B1 | 10/2003 | Wang |
| 6,640,304 B2 | 10/2003 | Ginter et al. |
| 6,646,244 B2 | 11/2003 | Aas |
| 6,654,389 B1 | 11/2003 | Brunheroto et al. |
| 6,664,948 B2 | 12/2003 | Crane |
| 6,665,303 B1 | 12/2003 | Saito et al. |
| 6,665,409 B1 | 12/2003 | Rao |
| 6,668,246 B1 | 12/2003 | Yeung et al. |
| 6,671,737 B1 | 12/2003 | Snowdon et al. |
| 6,671,803 B1 | 12/2003 | Pasieka |
| 6,671,813 B2 | 12/2003 | Ananda |
| 6,678,828 B1 | 1/2004 | Pham |
| 6,681,017 B1 | 1/2004 | Matias et al. |
| 6,684,198 B1 | 1/2004 | Shimizu et al. |
| 6,684,332 B1 | 1/2004 | Douglas |
| 6,690,556 B2 | 2/2004 | Smola |
| 6,694,000 B2 | 2/2004 | Ung |
| 6,697,945 B2 | 2/2004 | Ishiguro et al. |
| 6,701,433 B1 | 3/2004 | Schell et al. |
| 6,704,873 B1 | 3/2004 | Underwood |
| 6,708,176 B2 | 3/2004 | Strunk |
| 6,711,263 B1 | 3/2004 | Nordenstam et al. |
| 6,714,921 B2 | 3/2004 | Stefik et al. |
| 6,715,049 B1 | 3/2004 | Hayakashi |
| 6,716,652 B1 | 4/2004 | Ortlieb |
| 6,728,880 B1 | 4/2004 | Sites |
| 6,738,810 B1 | 5/2004 | Kramer |
| 6,741,851 B1 | 5/2004 | Lee et al. |
| 6,763,458 B1 | 7/2004 | Watanabe |
| 6,765,470 B2 | 7/2004 | Shinzaki |
| 6,772,340 B1 | 8/2004 | Peinado et al. |
| 6,775,655 B1 | 8/2004 | Peinado et al. |
| 6,781,956 B1 | 8/2004 | Cheung |
| 6,791,157 B1 | 9/2004 | Casto |
| 6,792,531 B2 | 9/2004 | Heiden |
| 6,792,537 B1 | 9/2004 | Liu et al. |
| 6,799,270 B1 | 9/2004 | Bull et al. |
| 6,801,998 B1 | 10/2004 | Hanna et al. |
| 6,807,542 B2 | 10/2004 | Bantz et al. |
| 6,816,596 B1 | 11/2004 | Peinado et al. |
| 6,816,809 B2 | 11/2004 | Circenis |
| 6,816,900 B1 | 11/2004 | Vogel |
| 6,820,063 B1 | 11/2004 | England et al. |
| 6,826,606 B2 | 11/2004 | Freeman |
| 6,826,690 B1 | 11/2004 | Hind |
| 6,829,708 B1 | 12/2004 | Peinado et al. |
| 6,832,319 B1 | 12/2004 | Bell et al. |
| 6,834,352 B2 | 12/2004 | Shin |
| 6,839,841 B1 | 1/2005 | Medvinsky |
| 6,844,871 B1 | 1/2005 | Hinckley |
| 6,847,942 B1 | 1/2005 | Land |
| 6,850,252 B1 | 2/2005 | Hofberg |
| 6,851,051 B1 | 2/2005 | Bolle |
| 6,856,997 B2 | 2/2005 | Lee et al. |
| 6,859,790 B1 | 2/2005 | Nonaka et al. |
| 6,868,433 B1 | 3/2005 | Philyaw |
| 6,871,283 B1 | 3/2005 | Zurko |
| 6,873,975 B1 | 3/2005 | Hatakeyama et al. |
| 6,889,246 B1 | 5/2005 | Kawamoto et al. |
| 6,895,504 B1 | 5/2005 | Zhang |
| 6,898,286 B2 | 5/2005 | Murray |
| 6,918,034 B1 | 7/2005 | Sengodan et al. |
| 6,920,567 B1 | 7/2005 | Doherty et al. |
| 6,922,724 B1 | 7/2005 | Freeman |
| 6,934,840 B2 | 8/2005 | Rich et al. |
| 6,934,942 B1 | 8/2005 | Chilimbi |
| 6,948,073 B2 | 9/2005 | England et al. |
| 6,954,728 B1 | 10/2005 | Kusumoto |
| 6,957,186 B1 | 10/2005 | Guheen |
| 6,959,288 B1 | 10/2005 | Medina et al. |
| 6,959,290 B2 | 10/2005 | Stefik et al. |
| 6,959,291 B1 | 10/2005 | Armstrong |
| 6,961,426 B2 | 11/2005 | Vesely |
| 6,961,858 B2 | 11/2005 | Fransdonk |
| 6,973,444 B1 | 12/2005 | Blinn et al. |
| 6,976,162 B1 | 12/2005 | Ellison |
| 6,976,163 B1 | 12/2005 | Hind |
| 6,978,367 B1 | 12/2005 | Hind et al. |
| 6,983,049 B2 | 1/2006 | Wee et al. |
| 6,983,050 B1 | 1/2006 | Yacobi |
| 6,986,042 B2 | 1/2006 | Griffin |
| 6,990,174 B2 | 1/2006 | Eskelinen |
| 6,993,137 B2 | 1/2006 | Fransdonk |
| 6,993,648 B2 | 1/2006 | Goodman |
| 7,000,100 B2 | 2/2006 | Lacombe |
| 7,000,829 B1 | 2/2006 | Harris |
| 7,006,633 B1 | 2/2006 | Reece |
| 7,010,032 B1 | 3/2006 | Kikuchi et al. |
| 7,010,808 B1 | 3/2006 | Leung et al. |
| 7,013,384 B2 | 3/2006 | Challener |
| 7,016,498 B2 | 3/2006 | Peinado et al. |
| 7,017,188 B1 | 3/2006 | Schmeidler et al. |
| 7,020,704 B1 | 3/2006 | Lipscomb et al. |
| 7,020,781 B1 | 3/2006 | Saw et al. |
| 7,024,393 B1 | 4/2006 | Peinado et al. |
| 7,028,149 B2 | 4/2006 | Grawrock |
| 7,028,180 B1 | 4/2006 | Aull |
| 7,036,011 B2 | 4/2006 | Grimes et al. |
| 7,043,633 B1 | 5/2006 | Fink |
| 7,047,222 B1 | 5/2006 | Bush |
| 7,047,404 B1 | 5/2006 | Doonan et al. |
| 7,051,005 B1 | 5/2006 | Peinado |
| 7,052,530 B2 | 5/2006 | Edlund |
| 7,054,468 B2 | 5/2006 | Yang |
| 7,055,169 B2 | 5/2006 | Delpuch |
| 7,058,819 B2 | 6/2006 | Okaue |
| 7,069,442 B2 | 6/2006 | Sutton, II |
| 7,069,595 B2 | 6/2006 | Cognigni |
| 7,073,056 B2 | 7/2006 | Kocher |
| 7,073,063 B2 | 7/2006 | Peinado |
| 7,076,652 B2 | 7/2006 | Ginter |
| 7,080,039 B1 | 7/2006 | Marsh |
| 7,080,043 B2 | 7/2006 | Chase, Jr. et al. |
| 7,089,594 B2 | 8/2006 | Lai et al. |
| 7,095,852 B2 | 8/2006 | Wack |
| 7,096,469 B1 | 8/2006 | Kubala |
| 7,097,357 B2 | 8/2006 | Johnson |
| 7,103,574 B1 | 9/2006 | Peinado et al. |
| 7,107,462 B2 | 9/2006 | Fransdonk |
| 7,113,912 B2 | 9/2006 | Stefik |
| 7,116,969 B2 | 10/2006 | Park |
| 7,117,183 B2 | 10/2006 | Blair |
| 7,120,250 B2 | 10/2006 | Candelore |

(56) References Cited

U.S. PATENT DOCUMENTS

| | | |
|---|---|---|
| 7,121,460 B1 | 10/2006 | Parsons |
| 7,123,608 B1 | 10/2006 | Scott |
| 7,124,938 B1 | 10/2006 | Marsh |
| 7,127,513 B2 | 10/2006 | Karger et al. |
| 7,127,579 B2 | 10/2006 | Zimmer |
| 7,130,951 B1 | 10/2006 | Christie |
| 7,133,846 B1 | 11/2006 | Ginter et al. |
| 7,136,838 B1 | 11/2006 | Peinado et al. |
| 7,136,945 B2 | 11/2006 | Gibbs et al. |
| 7,143,066 B2 | 11/2006 | Shear et al. |
| 7,143,297 B2 | 11/2006 | Buchheit et al. |
| 7,145,919 B2 | 12/2006 | Krishnarajah et al. |
| 7,146,504 B2 | 12/2006 | Parks et al. |
| 7,162,645 B2 | 1/2007 | Iguchi |
| 7,171,539 B2 | 1/2007 | Mansell |
| 7,171,662 B1 | 1/2007 | Misra et al. |
| 7,174,320 B2 | 2/2007 | Rothrock |
| 7,174,452 B2 | 2/2007 | Carr |
| 7,174,457 B1 | 2/2007 | England |
| 7,200,760 B2 | 4/2007 | Riebe |
| 7,203,966 B2 | 4/2007 | Abburi et al. |
| 7,207,039 B2 | 4/2007 | Komarla |
| 7,213,005 B2 | 5/2007 | Mourad et al. |
| 7,213,266 B1 | 5/2007 | Maher |
| 7,216,363 B2 | 5/2007 | Serkowski et al. |
| 7,216,368 B2 | 5/2007 | Ishiguro |
| 7,219,842 B2 | 5/2007 | Wang et al. |
| 7,222,062 B2 | 5/2007 | Goud |
| 7,224,805 B2 | 5/2007 | Hurst |
| 7,228,437 B2 | 6/2007 | Spagna et al. |
| 7,233,948 B1 | 6/2007 | Shamoon |
| 7,234,144 B2 | 6/2007 | Wilt |
| 7,236,455 B1 | 6/2007 | Proudler |
| 7,243,366 B2 | 7/2007 | Medvinsky et al. |
| 7,254,836 B2 | 8/2007 | Alkove |
| 7,260,721 B2 | 8/2007 | Tanaka |
| 7,266,569 B2 | 9/2007 | Cutter et al. |
| 7,266,714 B2 | 9/2007 | Davies et al. |
| 7,275,159 B2 | 9/2007 | Hull et al. |
| 7,278,165 B2 | 10/2007 | Molaro |
| 7,278,168 B1 | 10/2007 | Chaudhury et al. |
| 7,287,280 B2 | 10/2007 | Young |
| 7,296,154 B2 | 11/2007 | Evans |
| 7,296,296 B2 | 11/2007 | Dunbar |
| 7,299,292 B2 | 11/2007 | Morten et al. |
| 7,299,358 B2 | 11/2007 | Chateau |
| 7,308,573 B2 | 12/2007 | Kostal et al. |
| 7,310,732 B2 | 12/2007 | Matsuyama |
| 7,315,941 B2 | 1/2008 | Ramzan |
| 7,319,759 B1 | 1/2008 | Peinado et al. |
| 7,325,139 B2 | 1/2008 | Ishiguro et al. |
| 7,336,791 B2 | 2/2008 | Ishiguro |
| 7,343,496 B1 | 3/2008 | Hsiang |
| 7,353,209 B1 | 4/2008 | Peinado |
| 7,353,402 B2 | 4/2008 | Bourne et al. |
| 7,356,709 B2 | 4/2008 | Gunyakti |
| 7,359,807 B2 | 4/2008 | Frank |
| 7,360,253 B2 | 4/2008 | Frank |
| 7,370,212 B2 | 5/2008 | Bourne et al. |
| 7,376,976 B2 | 5/2008 | Fierstein |
| 7,382,883 B2 | 6/2008 | Cross |
| 7,383,205 B1 | 6/2008 | Peinado |
| 7,392,429 B2 | 6/2008 | Frank |
| 7,395,245 B2 | 7/2008 | Okamoto et al. |
| 7,395,452 B2 | 7/2008 | Nicholson et al. |
| 7,406,446 B2 | 7/2008 | Frank |
| 7,421,413 B2 | 9/2008 | Frank |
| 7,426,752 B2 | 9/2008 | Agrawal |
| 7,441,121 B2 | 10/2008 | Cutter et al. |
| 7,441,246 B2 | 10/2008 | Auerbach |
| 7,451,202 B2 | 11/2008 | Nakahara |
| 7,461,249 B1 | 12/2008 | Pearson |
| 7,464,103 B2 | 12/2008 | Siu |
| 7,475,137 B2 | 1/2009 | Holden et al. |
| 7,484,103 B2 | 1/2009 | Woo et al. |
| 7,490,356 B2 | 2/2009 | Lieblich |
| 7,493,487 B2 | 2/2009 | Phillips |
| 7,494,277 B2 | 2/2009 | Setala |
| 7,500,267 B2 | 3/2009 | McKune |
| 7,502,945 B2 | 3/2009 | Bourne et al. |
| 7,519,816 B2 | 4/2009 | Phillips |
| 7,526,649 B2 | 4/2009 | Wiseman |
| 7,529,927 B2 | 5/2009 | Peinado et al. |
| 7,539,863 B2 | 5/2009 | Phillips et al. |
| 7,540,024 B2 | 5/2009 | Phillips et al. |
| 7,549,060 B2 | 6/2009 | Bourne et al. |
| 7,552,331 B2 | 6/2009 | Evans |
| 7,558,463 B2 | 7/2009 | Jain |
| 7,562,220 B2 | 7/2009 | Frank |
| 7,565,325 B2 | 7/2009 | Lenard |
| 7,568,096 B2 | 7/2009 | Evans |
| 7,584,502 B2 | 9/2009 | Alkove |
| 7,590,841 B2 | 9/2009 | Sherwani |
| 7,596,784 B2 | 9/2009 | Abrams |
| 7,610,631 B2 | 10/2009 | Frank |
| 7,617,401 B2 | 11/2009 | Marsh |
| 7,644,239 B2 | 1/2010 | Ergan |
| 7,653,943 B2 | 1/2010 | Evans |
| 7,665,143 B2 | 2/2010 | Havens |
| 7,669,056 B2 | 2/2010 | Frank |
| 7,676,846 B2 | 3/2010 | Robert et al. |
| 7,680,744 B2 | 3/2010 | Blinn |
| 7,694,153 B2 | 4/2010 | Ahdout |
| 7,703,141 B2 | 4/2010 | Alkove |
| 7,739,505 B2 | 6/2010 | Reneris |
| 7,752,674 B2 | 7/2010 | Evans |
| 7,770,205 B2 | 8/2010 | Frank |
| 7,809,646 B2 | 10/2010 | Rose |
| 7,810,163 B2 | 10/2010 | Evans |
| 7,814,532 B2 | 10/2010 | Cromer |
| 7,856,404 B2 | 12/2010 | Evans |
| 7,877,607 B2 | 1/2011 | Circenis |
| 7,891,007 B2 | 2/2011 | Waxman |
| 7,900,140 B2 | 3/2011 | Mohammed |
| 7,903,117 B2 | 3/2011 | Howell |
| 7,958,029 B1 | 6/2011 | Bobich |
| 7,979,721 B2 | 7/2011 | Westerinen |
| 8,060,923 B2 | 11/2011 | Cutter |
| 8,074,287 B2 | 12/2011 | Barde |
| 2001/0005201 A1 | 6/2001 | Digiorgio et al. |
| 2001/0010076 A1 | 7/2001 | Wray |
| 2001/0011253 A1 | 8/2001 | Coley et al. |
| 2001/0021252 A1 | 9/2001 | Carter |
| 2001/0034711 A1 | 10/2001 | Tashenberg |
| 2001/0044782 A1 | 11/2001 | Hughes |
| 2001/0049667 A1 | 12/2001 | Moribatake et al. |
| 2001/0051996 A1 | 12/2001 | Cooper et al. |
| 2001/0052077 A1 | 12/2001 | Fung et al. |
| 2001/0053223 A1 | 12/2001 | Ishibashi et al. |
| 2001/0056413 A1 | 12/2001 | Suzuki et al. |
| 2001/0056539 A1 | 12/2001 | Pavlin et al. |
| 2002/0002597 A1 | 1/2002 | Morrell, Jr. |
| 2002/0002674 A1 | 1/2002 | Grimes et al. |
| 2002/0004773 A1 | 1/2002 | Xu et al. |
| 2002/0006204 A1 | 1/2002 | England et al. |
| 2002/0007310 A1 | 1/2002 | Long |
| 2002/0007454 A1 | 1/2002 | Tarpenning et al. |
| 2002/0007456 A1 | 1/2002 | Peinado et al. |
| 2002/0013772 A1 | 1/2002 | Peinado |
| 2002/0018566 A1 | 2/2002 | Kawatsura et al. |
| 2002/0019814 A1 | 2/2002 | Ganesan |
| 2002/0023212 A1 | 2/2002 | Proudler |
| 2002/0026574 A1 | 2/2002 | Watanabe et al. |
| 2002/0038231 A1 | 3/2002 | Hasebe |
| 2002/0044654 A1 | 4/2002 | Maeda et al. |
| 2002/0046098 A1 | 4/2002 | Maggio |
| 2002/0048369 A1 | 4/2002 | Ginter et al. |
| 2002/0049679 A1 | 4/2002 | Russell et al. |
| 2002/0055906 A1 | 5/2002 | Katz |
| 2002/0056042 A1 | 5/2002 | van der Kaay |
| 2002/0056747 A1 | 5/2002 | Matsuyama et al. |
| 2002/0063933 A1 | 5/2002 | Maeda et al. |
| 2002/0065781 A1 | 5/2002 | Hillegass et al. |
| 2002/0067767 A1* | 6/2002 | Sugahara .......... 375/240.01 |

(56) References Cited

U.S. PATENT DOCUMENTS

| | | |
|---|---|---|
| 2002/0073068 A1 | 6/2002 | Guha |
| 2002/0083319 A1 | 6/2002 | Ishiguro et al. |
| 2002/0091569 A1 | 7/2002 | Kitaura |
| 2002/0095603 A1 | 7/2002 | Godwin |
| 2002/0107701 A1 | 8/2002 | Batty |
| 2002/0107806 A1 | 8/2002 | Higashi et al. |
| 2002/0108050 A1 | 8/2002 | Raley et al. |
| 2002/0111916 A1 | 8/2002 | Coronna |
| 2002/0112171 A1 | 8/2002 | Ginter et al. |
| 2002/0118835 A1 | 8/2002 | Uemura |
| 2002/0123964 A1 | 9/2002 | Kramer |
| 2002/0123968 A1* | 9/2002 | Okayama et al. ............... 705/57 |
| 2002/0124212 A1 | 9/2002 | Nitschke |
| 2002/0129359 A1 | 9/2002 | Lichner |
| 2002/0138549 A1 | 9/2002 | Urien |
| 2002/0141451 A1 | 10/2002 | Gates |
| 2002/0144131 A1 | 10/2002 | Spacey |
| 2002/0147601 A1 | 10/2002 | Fagan |
| 2002/0147782 A1 | 10/2002 | Dimitrova |
| 2002/0147912 A1 | 10/2002 | Shmueli |
| 2002/0152393 A1 | 10/2002 | Thoma et al. |
| 2002/0156743 A1 | 10/2002 | DeTreville |
| 2002/0157002 A1 | 10/2002 | Messerges et al. |
| 2002/0166056 A1 | 11/2002 | Johnson et al. |
| 2002/0169954 A1 | 11/2002 | Bandini et al. |
| 2002/0169974 A1 | 11/2002 | McKune |
| 2002/0178071 A1 | 11/2002 | Walker |
| 2002/0184482 A1 | 12/2002 | Lacombe |
| 2002/0184508 A1 | 12/2002 | Bialick |
| 2002/0184515 A1 | 12/2002 | Oho et al. |
| 2002/0186843 A1 | 12/2002 | Weinstein et al. |
| 2002/0190876 A1 | 12/2002 | Lai et al. |
| 2002/0193101 A1 | 12/2002 | McAlinden |
| 2002/0194132 A1 | 12/2002 | Pearson |
| 2002/0194474 A1 | 12/2002 | Natsuno et al. |
| 2002/0198845 A1 | 12/2002 | Lao et al. |
| 2002/0198846 A1 | 12/2002 | Lao |
| 2003/0005135 A1 | 1/2003 | Inoue |
| 2003/0005335 A1 | 1/2003 | Watanabe |
| 2003/0014323 A1 | 1/2003 | Scheer |
| 2003/0014496 A1 | 1/2003 | Spencer et al. |
| 2003/0018491 A1 | 1/2003 | Nakahara et al. |
| 2003/0021416 A1 | 1/2003 | Brown |
| 2003/0023564 A1 | 1/2003 | Padhye et al. |
| 2003/0027549 A1 | 2/2003 | Kiel |
| 2003/0028454 A1 | 2/2003 | Oho et al. |
| 2003/0028490 A1 | 2/2003 | Miura et al. |
| 2003/0035409 A1 | 2/2003 | Wang |
| 2003/0037246 A1 | 2/2003 | Goodman |
| 2003/0037261 A1 | 2/2003 | Meffert et al. |
| 2003/0040960 A1 | 2/2003 | Eckmann |
| 2003/0041008 A1 | 2/2003 | Grey et al. |
| 2003/0041257 A1 | 2/2003 | Wee et al. |
| 2003/0046026 A1 | 3/2003 | Levy |
| 2003/0046238 A1 | 3/2003 | Nonaka et al. |
| 2003/0048473 A1 | 3/2003 | Rosen |
| 2003/0053630 A1 | 3/2003 | Elliott et al. |
| 2003/0056107 A1 | 3/2003 | Cammack |
| 2003/0056118 A1 | 3/2003 | Troyansky et al. |
| 2003/0063750 A1 | 4/2003 | Medvinsky |
| 2003/0065918 A1 | 4/2003 | Willey |
| 2003/0069854 A1 | 4/2003 | Hsu et al. |
| 2003/0069981 A1 | 4/2003 | Trovato |
| 2003/0078853 A1 | 4/2003 | Peinado et al. |
| 2003/0079038 A1 | 4/2003 | Robbin et al. |
| 2003/0081592 A1 | 5/2003 | Krishnarajah et al. |
| 2003/0084104 A1 | 5/2003 | Salem |
| 2003/0084278 A1 | 5/2003 | Cromer |
| 2003/0084285 A1 | 5/2003 | Cromer |
| 2003/0084306 A1 | 5/2003 | Abburi et al. |
| 2003/0084337 A1 | 5/2003 | Simionescu |
| 2003/0084352 A1 | 5/2003 | Schwartz |
| 2003/0088500 A1 | 5/2003 | Shinohara |
| 2003/0093694 A1 | 5/2003 | Medvinsky |
| 2003/0097596 A1 | 5/2003 | Muratov |
| 2003/0108164 A1 | 6/2003 | Laurin et al. |
| 2003/0110388 A1 | 6/2003 | Pavlin |
| 2003/0115457 A1 | 6/2003 | Wildish et al. |
| 2003/0115458 A1 | 6/2003 | Song |
| 2003/0120935 A1 | 6/2003 | Teal |
| 2003/0126519 A1 | 7/2003 | Odorcic |
| 2003/0131252 A1 | 7/2003 | Barton |
| 2003/0131353 A1 | 7/2003 | Blom et al. |
| 2003/0133576 A1 | 7/2003 | Grumiaux |
| 2003/0135380 A1 | 7/2003 | Lehr |
| 2003/0149670 A1 | 8/2003 | Cronce |
| 2003/0149671 A1 | 8/2003 | Yamamoto |
| 2003/0154393 A1 | 8/2003 | Young |
| 2003/0156572 A1 | 8/2003 | Hui |
| 2003/0156719 A1 | 8/2003 | Cronce |
| 2003/0161473 A1 | 8/2003 | Fransdonk |
| 2003/0163383 A1 | 8/2003 | Engelhart |
| 2003/0163712 A1 | 8/2003 | LaMothe |
| 2003/0167392 A1 | 9/2003 | Fransdonk |
| 2003/0172345 A1 | 9/2003 | Engelsberg et al. |
| 2003/0172376 A1 | 9/2003 | Coffin, III et al. |
| 2003/0185395 A1 | 10/2003 | Lee |
| 2003/0185399 A1 | 10/2003 | Ishiguro |
| 2003/0187801 A1 | 10/2003 | Chase et al. |
| 2003/0188117 A1* | 10/2003 | Yoshino et al. ............... 711/164 |
| 2003/0188165 A1 | 10/2003 | Sutton, II |
| 2003/0188179 A1 | 10/2003 | Challener |
| 2003/0194092 A1 | 10/2003 | Parks et al. |
| 2003/0194094 A1 | 10/2003 | Lampson et al. |
| 2003/0196102 A1 | 10/2003 | McCarroll |
| 2003/0196106 A1 | 10/2003 | Erfani |
| 2003/0198350 A1 | 10/2003 | Foster et al. |
| 2003/0200336 A1 | 10/2003 | Pal |
| 2003/0204738 A1 | 10/2003 | Morgan |
| 2003/0208338 A1 | 11/2003 | Challener |
| 2003/0208573 A1 | 11/2003 | Harrison |
| 2003/0229702 A1 | 12/2003 | Hensbergen |
| 2003/0233553 A1 | 12/2003 | Parks et al. |
| 2003/0236820 A1 | 12/2003 | Tierney et al. |
| 2003/0236978 A1 | 12/2003 | Evans et al. |
| 2004/0001088 A1 | 1/2004 | Stancil |
| 2004/0001594 A1 | 1/2004 | Krishnaswamy et al. |
| 2004/0003139 A1 | 1/2004 | Cottrille et al. |
| 2004/0003190 A1 | 1/2004 | Childs |
| 2004/0003268 A1 | 1/2004 | Bourne et al. |
| 2004/0003269 A1 | 1/2004 | Waxman et al. |
| 2004/0003270 A1 | 1/2004 | Bourne et al. |
| 2004/0003288 A1 | 1/2004 | Wiseman |
| 2004/0010440 A1 | 1/2004 | Lenard |
| 2004/0010602 A1 | 1/2004 | Van Vleck et al. |
| 2004/0010684 A1 | 1/2004 | Douglas |
| 2004/0019456 A1 | 1/2004 | Circenis |
| 2004/0023636 A1 | 2/2004 | Gurel |
| 2004/0030898 A1 | 2/2004 | Tsuria et al. |
| 2004/0030912 A1 | 2/2004 | Merkle, Jr. |
| 2004/0034816 A1 | 2/2004 | Richard |
| 2004/0039916 A1 | 2/2004 | Aldis et al. |
| 2004/0039924 A1 | 2/2004 | Baldwin |
| 2004/0039932 A1* | 2/2004 | Elazar et al. ................... 713/200 |
| 2004/0039960 A1 | 2/2004 | Kassayan |
| 2004/0042451 A1 | 3/2004 | Takaku |
| 2004/0044629 A1 | 3/2004 | Rhodes |
| 2004/0045027 A1 | 3/2004 | Takamura et al. |
| 2004/0054630 A1 | 3/2004 | Ginter |
| 2004/0054678 A1 | 3/2004 | Okamoto et al. |
| 2004/0054907 A1 | 3/2004 | Chateau |
| 2004/0054908 A1 | 3/2004 | Circenis |
| 2004/0054909 A1 | 3/2004 | Serkowski |
| 2004/0054912 A1 | 3/2004 | Adent et al. |
| 2004/0059937 A1 | 3/2004 | Nakano |
| 2004/0064351 A1 | 4/2004 | Mikurak |
| 2004/0064707 A1 | 4/2004 | McCann |
| 2004/0067746 A1 | 4/2004 | Johnson |
| 2004/0073670 A1 | 4/2004 | Chack |
| 2004/0080541 A1 | 4/2004 | Saiga et al. |
| 2004/0083289 A1 | 4/2004 | Karger et al. |
| 2004/0088541 A1 | 5/2004 | Messerges et al. |
| 2004/0088548 A1 | 5/2004 | Smetters |
| 2004/0093371 A1 | 5/2004 | Burrows |

(56) References Cited

U.S. PATENT DOCUMENTS

| | | |
|---|---|---|
| 2004/0093508 A1 | 5/2004 | Foerstner |
| 2004/0103305 A1 | 5/2004 | Ginter |
| 2004/0107125 A1 | 6/2004 | Guheen |
| 2004/0107356 A1 | 6/2004 | Shamoon |
| 2004/0107359 A1 | 6/2004 | Kawano |
| 2004/0107368 A1 | 6/2004 | Colvin |
| 2004/0111615 A1 | 6/2004 | Nyang |
| 2004/0123127 A1 | 6/2004 | Teicher |
| 2004/0125755 A1 | 7/2004 | Roberts |
| 2004/0125757 A1 | 7/2004 | Mela et al. |
| 2004/0125791 A1 | 7/2004 | Hoffmann |
| 2004/0127196 A1* | 7/2004 | Dabbish et al. .............. 455/411 |
| 2004/0128251 A1 | 7/2004 | Adam |
| 2004/0133794 A1 | 7/2004 | Kocher et al. |
| 2004/0139027 A1 | 7/2004 | Molaro |
| 2004/0139312 A1 | 7/2004 | Medvinsky |
| 2004/0143736 A1 | 7/2004 | Cross et al. |
| 2004/0143760 A1 | 7/2004 | Alkove et al. |
| 2004/0146015 A1 | 7/2004 | Cross |
| 2004/0158709 A1 | 8/2004 | Narin et al. |
| 2004/0158731 A1 | 8/2004 | Narin et al. |
| 2004/0158742 A1 | 8/2004 | Srinivasan |
| 2004/0168073 A1 | 8/2004 | Bourne et al. |
| 2004/0168077 A1 | 8/2004 | Waxman et al. |
| 2004/0184605 A1 | 9/2004 | Soliman |
| 2004/0193919 A1 | 9/2004 | Dabbish |
| 2004/0199769 A1 | 10/2004 | Proudler |
| 2004/0205028 A1 | 10/2004 | Verosub et al. |
| 2004/0205357 A1 | 10/2004 | Kuo et al. |
| 2004/0205510 A1 | 10/2004 | Rising |
| 2004/0210535 A1 | 10/2004 | Erickson |
| 2004/0220858 A1 | 11/2004 | Maggio |
| 2004/0225519 A1 | 11/2004 | Martin |
| 2004/0225894 A1 | 11/2004 | Colvin |
| 2004/0236717 A1 | 11/2004 | Demartini et al. |
| 2004/0243819 A1 | 12/2004 | Bourne et al. |
| 2004/0249759 A1 | 12/2004 | Higashi et al. |
| 2004/0255000 A1 | 12/2004 | Simionescu |
| 2004/0261093 A1 | 12/2004 | Rebaud et al. |
| 2004/0268120 A1 | 12/2004 | Mirtal |
| 2005/0002525 A1 | 1/2005 | Alkove et al. |
| 2005/0005114 A1 | 1/2005 | Medvinsky |
| 2005/0008240 A1 | 1/2005 | Banerji et al. |
| 2005/0010531 A1 | 1/2005 | Kushalnagar et al. |
| 2005/0010536 A1 | 1/2005 | Cochran et al. |
| 2005/0010766 A1 | 1/2005 | Holden et al. |
| 2005/0015343 A1 | 1/2005 | Nagai |
| 2005/0021944 A1 | 1/2005 | Craft |
| 2005/0021989 A1 | 1/2005 | Johnson et al. |
| 2005/0021992 A1 | 1/2005 | Aida |
| 2005/0028000 A1 | 2/2005 | Bulusu |
| 2005/0028151 A1 | 2/2005 | Roth et al. |
| 2005/0033747 A1 | 2/2005 | Wittkotter |
| 2005/0039013 A1 | 2/2005 | Bajikar |
| 2005/0044197 A1 | 2/2005 | Lai |
| 2005/0044397 A1 | 2/2005 | Bjorkengren |
| 2005/0050329 A1 | 3/2005 | Wilding et al. |
| 2005/0050344 A1 | 3/2005 | Hill et al. |
| 2005/0050355 A1 | 3/2005 | Graunke |
| 2005/0060388 A1 | 3/2005 | Tatsumi |
| 2005/0065880 A1 | 3/2005 | Amato |
| 2005/0069039 A1 | 3/2005 | Crinon |
| 2005/0080701 A1 | 4/2005 | Tunney |
| 2005/0081042 A1 | 4/2005 | Venkatesan et al. |
| 2005/0086174 A1 | 4/2005 | Eng |
| 2005/0091104 A1 | 4/2005 | Abraham |
| 2005/0091169 A1 | 4/2005 | Peinado et al. |
| 2005/0097204 A1 | 5/2005 | Horowitz |
| 2005/0102181 A1 | 5/2005 | Scroggie |
| 2005/0108547 A1 | 5/2005 | Sakai |
| 2005/0108564 A1 | 5/2005 | Freeman |
| 2005/0114896 A1 | 5/2005 | Hug et al. |
| 2005/0120125 A1 | 6/2005 | Morten et al. |
| 2005/0120251 A1 | 6/2005 | Fukumori |
| 2005/0125673 A1 | 6/2005 | Cheng |
| 2005/0129296 A1 | 6/2005 | Setala |
| 2005/0132150 A1 | 6/2005 | Jewell |
| 2005/0135613 A1 | 6/2005 | Brandenburg et al. |
| 2005/0138338 A1 | 6/2005 | Sodani et al. |
| 2005/0138357 A1 | 6/2005 | Swenson et al. |
| 2005/0138370 A1 | 6/2005 | Goud |
| 2005/0138388 A1 | 6/2005 | Paganetti |
| 2005/0138389 A1 | 6/2005 | Catherman |
| 2005/0138406 A1 | 6/2005 | Cox |
| 2005/0138423 A1 | 6/2005 | Ranganathan |
| 2005/0141717 A1 | 6/2005 | Cromer |
| 2005/0144099 A1 | 6/2005 | Deb |
| 2005/0149722 A1 | 7/2005 | Wiseman |
| 2005/0149729 A1 | 7/2005 | Zimmer |
| 2005/0163052 A1 | 7/2005 | Savage et al. |
| 2005/0166051 A1 | 7/2005 | Buer |
| 2005/0169444 A1 | 8/2005 | Inon |
| 2005/0169467 A1 | 8/2005 | Risan et al. |
| 2005/0172121 A1 | 8/2005 | Risan |
| 2005/0177875 A1 | 8/2005 | Kamperman et al. |
| 2005/0182921 A1 | 8/2005 | Duncan |
| 2005/0182931 A1 | 8/2005 | Robert et al. |
| 2005/0182940 A1 | 8/2005 | Sutton, II |
| 2005/0188843 A1 | 9/2005 | Edlund |
| 2005/0192099 A1* | 9/2005 | Nguyen et al. ............... 463/42 |
| 2005/0192907 A1 | 9/2005 | Blinn et al. |
| 2005/0198510 A1 | 9/2005 | Robert et al. |
| 2005/0203801 A1 | 9/2005 | Morgenstern |
| 2005/0204391 A1 | 9/2005 | Hunleth et al. |
| 2005/0210252 A1 | 9/2005 | Freeman |
| 2005/0213761 A1 | 9/2005 | Walmsley |
| 2005/0216413 A1 | 9/2005 | Murakami |
| 2005/0216577 A1 | 9/2005 | Durham et al. |
| 2005/0221766 A1 | 10/2005 | Briek et al. |
| 2005/0223415 A1 | 10/2005 | Oho et al. |
| 2005/0226170 A1 | 10/2005 | Relan et al. |
| 2005/0235141 A1 | 10/2005 | Ibrahim |
| 2005/0240533 A1 | 10/2005 | Cutter et al. |
| 2005/0246521 A1 | 11/2005 | Bade |
| 2005/0246525 A1 | 11/2005 | Bade |
| 2005/0246552 A1 | 11/2005 | Bade |
| 2005/0254526 A1 | 11/2005 | Wang et al. |
| 2005/0257073 A1 | 11/2005 | Bade |
| 2005/0265548 A1 | 12/2005 | Tsuchimura |
| 2005/0265555 A1* | 12/2005 | Pippuri ..................... 380/284 |
| 2005/0268115 A1 | 12/2005 | Barde |
| 2005/0268174 A1 | 12/2005 | Kumagai |
| 2005/0275866 A1 | 12/2005 | Corlett |
| 2005/0278519 A1 | 12/2005 | Luebke |
| 2005/0279371 A1 | 12/2005 | Billard |
| 2005/0279827 A1 | 12/2005 | Mascavage |
| 2005/0283601 A1 | 12/2005 | Tahan |
| 2005/0286476 A1 | 12/2005 | Crosswy |
| 2005/0289076 A1 | 12/2005 | Lambert |
| 2005/0289177 A1 | 12/2005 | Hohmann, II |
| 2005/0289343 A1 | 12/2005 | Tahan |
| 2006/0010076 A1 | 1/2006 | Cutter |
| 2006/0010326 A1 | 1/2006 | Bade |
| 2006/0014521 A1 | 1/2006 | Chen et al. |
| 2006/0015717 A1 | 1/2006 | Liu |
| 2006/0015718 A1 | 1/2006 | Liu |
| 2006/0015732 A1 | 1/2006 | Liu |
| 2006/0020554 A1 | 1/2006 | Septon |
| 2006/0020784 A1 | 1/2006 | Jonker |
| 2006/0020821 A1 | 1/2006 | Waltermann |
| 2006/0020860 A1 | 1/2006 | Tardif |
| 2006/0026418 A1 | 2/2006 | Bade |
| 2006/0026419 A1 | 2/2006 | Arndt |
| 2006/0026422 A1 | 2/2006 | Bade |
| 2006/0045267 A1 | 3/2006 | Moore |
| 2006/0047957 A1 | 3/2006 | Helms et al. |
| 2006/0053112 A1 | 3/2006 | Chitkara |
| 2006/0055506 A1 | 3/2006 | Nicolas |
| 2006/0072748 A1 | 4/2006 | Buer |
| 2006/0072762 A1 | 4/2006 | Buer |
| 2006/0074600 A1 | 4/2006 | Sastry |
| 2006/0075014 A1 | 4/2006 | Tharappel |
| 2006/0075223 A1 | 4/2006 | Bade |
| 2006/0085634 A1 | 4/2006 | Jain et al. |

(56) References Cited

U.S. PATENT DOCUMENTS

| | | |
|---|---|---|
| 2006/0085637 A1 | 4/2006 | Pinkas |
| 2006/0085646 A1 | 4/2006 | Cutter, Jr. et al. |
| 2006/0085844 A1 | 4/2006 | Buer |
| 2006/0089917 A1 | 4/2006 | Strom |
| 2006/0090084 A1 | 4/2006 | Buer |
| 2006/0100010 A1 | 5/2006 | Gatto |
| 2006/0104356 A1 | 5/2006 | Crinon |
| 2006/0106845 A1 | 5/2006 | Frank et al. |
| 2006/0106920 A1 | 5/2006 | Steeb |
| 2006/0107306 A1 | 5/2006 | Thirumalai |
| 2006/0107328 A1 | 5/2006 | Frank |
| 2006/0107335 A1 | 5/2006 | Frank |
| 2006/0112267 A1 | 5/2006 | Zimmer |
| 2006/0117177 A1 | 6/2006 | Buer |
| 2006/0129496 A1 | 6/2006 | Chow |
| 2006/0129824 A1 | 6/2006 | Hoff |
| 2006/0130130 A1 | 6/2006 | Kablotsky |
| 2006/0143431 A1 | 6/2006 | Rothman |
| 2006/0149966 A1 | 7/2006 | Buskey |
| 2006/0156416 A1 | 7/2006 | Huotari |
| 2006/0161635 A1 | 7/2006 | Lamkin et al. |
| 2006/0165005 A1 | 7/2006 | Frank |
| 2006/0167814 A1 | 7/2006 | Peinado et al. |
| 2006/0167815 A1 | 7/2006 | Peinado et al. |
| 2006/0167985 A1 | 7/2006 | Albanese et al. |
| 2006/0168451 A1 | 7/2006 | Ishibashi et al. |
| 2006/0168664 A1 | 7/2006 | Frank |
| 2006/0173787 A1 | 8/2006 | Weber |
| 2006/0174110 A1 | 8/2006 | Debique |
| 2006/0184790 A1 | 8/2006 | Oliveira et al. |
| 2006/0193474 A1* | 8/2006 | Fransdonk .................. 380/279 |
| 2006/0206618 A1 | 9/2006 | Zimmer |
| 2006/0212363 A1 | 9/2006 | Peinado et al. |
| 2006/0212945 A1 | 9/2006 | Donlin |
| 2006/0213997 A1 | 9/2006 | Frank |
| 2006/0229990 A1 | 10/2006 | Shimoji et al. |
| 2006/0235798 A1 | 10/2006 | Alkove et al. |
| 2006/0235799 A1 | 10/2006 | Evans et al. |
| 2006/0235801 A1 | 10/2006 | Strom et al. |
| 2006/0242406 A1 | 10/2006 | Barde |
| 2006/0248594 A1 | 11/2006 | Grigorovich et al. |
| 2006/0248596 A1 | 11/2006 | Jain |
| 2006/0265758 A1 | 11/2006 | Khandelwal et al. |
| 2006/0268099 A1 | 11/2006 | Potrebic et al. |
| 2006/0272026 A1 | 11/2006 | Niwano et al. |
| 2006/0282319 A1 | 12/2006 | Maggio |
| 2006/0282899 A1 | 12/2006 | Raciborski |
| 2007/0003064 A1 | 1/2007 | Wiseman et al. |
| 2007/0016594 A1 | 1/2007 | Visharam et al. |
| 2007/0016784 A1 | 1/2007 | Vauclair |
| 2007/0033102 A1 | 2/2007 | Frank |
| 2007/0033419 A1 | 2/2007 | Kocher et al. |
| 2007/0058807 A1 | 3/2007 | Marsh |
| 2007/0078777 A1 | 4/2007 | Demartini et al. |
| 2007/0112681 A1 | 5/2007 | Niwano et al. |
| 2007/0157322 A1 | 7/2007 | Onno |
| 2007/0171903 A1 | 7/2007 | Zeng et al. |
| 2007/0269044 A1 | 11/2007 | Bruestle |
| 2007/0274393 A1 | 11/2007 | Toma et al. |
| 2007/0280422 A1 | 12/2007 | Setala |
| 2007/0288391 A1 | 12/2007 | Nakamura et al. |
| 2008/0075168 A1 | 3/2008 | Toma et al. |
| 2008/0141339 A1 | 6/2008 | Gomez et al. |
| 2008/0187284 A1 | 8/2008 | Ikeda et al. |
| 2008/0298581 A1 | 12/2008 | Murase et al. |
| 2008/0301440 A1 | 12/2008 | Plouffe et al. |
| 2008/0301468 A1 | 12/2008 | Murase et al. |
| 2009/0070454 A1 | 3/2009 | McKinnon, II et al. |
| 2009/0132815 A1 | 5/2009 | Ginter |
| 2009/0158036 A1 | 6/2009 | Barde |
| 2010/0177891 A1 | 7/2010 | Keidar |
| 2010/0280954 A1 | 11/2010 | Khandelwal |
| 2011/0128290 A1 | 6/2011 | Howell |
| 2012/0036562 A1 | 2/2012 | Cutter et al. |
| 2012/0137127 A1 | 5/2012 | Jain |

FOREIGN PATENT DOCUMENTS

| | | |
|---|---|---|
| CN | 1531673 | 9/2004 |
| EP | 0085480 | 8/1983 |
| EP | 0409397 | 1/1991 |
| EP | 0613073 | 8/1994 |
| EP | 0635790 | 1/1995 |
| EP | 0665486 | 8/1995 |
| EP | 0387599 | 9/1995 |
| EP | 0679978 | 11/1995 |
| EP | 0709760 | 5/1996 |
| EP | 0715245 | 6/1996 |
| EP | 0715246 | 6/1996 |
| EP | 0715247 | 6/1996 |
| EP | 0752663 | 1/1997 |
| EP | 0768774 | 4/1997 |
| EP | 778512 | 6/1997 |
| EP | 0798892 | 10/1997 |
| EP | 0843249 | 5/1998 |
| EP | 0843449 | 6/1998 |
| EP | 0849658 | 6/1998 |
| EP | 0874300 | 10/1998 |
| EP | 0887723 | 12/1998 |
| EP | 0907120 | 4/1999 |
| EP | 1061465 | 12/2000 |
| EP | 1085396 | 3/2001 |
| EP | 1120967 | 8/2001 |
| EP | 01041823 | 10/2002 |
| EP | 01287636 | 3/2003 |
| EP | 0679980 | 6/2003 |
| EP | 0735719 | 6/2003 |
| EP | 0725512 | 9/2003 |
| EP | 1346755 | 9/2003 |
| EP | 1363424 | 11/2003 |
| EP | 0137881 | 1/2004 |
| EP | 01376307 | 1/2004 |
| EP | 1387237 | 2/2004 |
| EP | 1429224 | 6/2004 |
| EP | 1223722 | 8/2004 |
| EP | 1460514 | 9/2004 |
| EP | 1376307 | 11/2004 |
| EP | 01477879 | 11/2004 |
| EP | 01494425 | 1/2005 |
| EP | 1233337 | 8/2005 |
| EP | 01292065 | 12/2008 |
| EP | 01378812 | 3/2010 |
| EP | 1594034 | 4/2010 |
| EP | 1259863 | 5/2013 |
| EP | 1166562 | 6/2013 |
| GB | 2359969 | 9/2001 |
| GB | 2378780 | 2/2003 |
| GB | 2381898 | 5/2003 |
| JP | 2060859 | 3/1990 |
| JP | 2291043 | 11/1990 |
| JP | 02291043 | 11/1990 |
| JP | 3241950 | 10/1991 |
| JP | 05-35461 | 2/1993 |
| JP | 5073580 | 3/1993 |
| JP | 06-035718 | 2/1994 |
| JP | 07-036559 | 2/1995 |
| JP | 07-141153 | 6/1995 |
| JP | 09-069044 | 8/1995 |
| JP | 08-006729 | 1/1996 |
| JP | 09-006880 | 1/1997 |
| JP | 01-526550 | 5/1997 |
| JP | 09-185504 | 7/1997 |
| JP | 09-251494 | 9/1997 |
| JP | 11-110294 | 4/1999 |
| JP | 11-187013 | 7/1999 |
| JP | 11-219329 | 8/1999 |
| JP | 2000-113066 | 4/2000 |
| JP | 2000-215165 | 8/2000 |
| JP | 00-293369 | 10/2000 |
| JP | 2000-293439 | 10/2000 |
| JP | 2000-347566 | 12/2000 |
| JP | 2000-516743 | 12/2000 |
| JP | 01-051742 | 2/2001 |
| JP | 03-510684 | 3/2001 |
| JP | 2001-067408 | 3/2001 |

(56) References Cited

FOREIGN PATENT DOCUMENTS

| | | |
|---|---|---|
| JP | 01-101033 | 4/2001 |
| JP | 03-510713 | 4/2001 |
| JP | 11-175605 | 6/2001 |
| JP | 2001-175605 | 6/2001 |
| JP | 01-184472 | 7/2001 |
| JP | 01-290780 | 10/2001 |
| JP | 01-312325 | 11/2001 |
| JP | 01-325387 | 11/2001 |
| JP | 01-331229 | 11/2001 |
| JP | 01-338233 | 12/2001 |
| JP | 2001-344437 | 12/2001 |
| JP | 2002-072876 | 3/2002 |
| JP | 2002-077149 | 3/2002 |
| JP | 02-108478 | 4/2002 |
| JP | 02-108870 | 4/2002 |
| JP | 02-164880 | 6/2002 |
| JP | 2002-169719 | 6/2002 |
| JP | 2002-169726 | 6/2002 |
| JP | 2002-183352 | 6/2002 |
| JP | 2002-207426 | 7/2002 |
| JP | 2002-215465 | 8/2002 |
| JP | 2002-297816 | 10/2002 |
| JP | 2002-324170 | 11/2002 |
| JP | 02-374327 | 12/2002 |
| JP | 2002-359616 | 12/2002 |
| JP | 2003-030150 | 1/2003 |
| JP | 03-507785 | 2/2003 |
| JP | 2003-101526 | 4/2003 |
| JP | 03-140761 | 5/2003 |
| JP | 03-140762 | 5/2003 |
| JP | 03-157335 | 5/2003 |
| JP | 3 421 950 | 6/2003 |
| JP | 2003-173381 | 6/2003 |
| JP | 03-208314 | 7/2003 |
| JP | 03-248522 | 9/2003 |
| JP | 03-296487 | 10/2003 |
| JP | 2003-309545 | 10/2003 |
| JP | 2003-323224 | 11/2003 |
| JP | 02-182562 | 1/2004 |
| JP | 04-038974 | 2/2004 |
| JP | 04-062561 | 2/2004 |
| JP | 2004-054937 | 2/2004 |
| JP | 2004-056794 | 2/2004 |
| JP | 2004-062890 | 2/2004 |
| JP | 04-118327 | 4/2004 |
| JP | 2004-102789 | 4/2004 |
| JP | 2004-507124 | 4/2004 |
| JP | 04-164491 | 6/2004 |
| JP | 04-295846 | 10/2004 |
| JP | 04-304755 | 10/2004 |
| JP | 2004-534291 | 11/2004 |
| JP | 07-525774 | 9/2007 |
| JP | 08-054952 | 2/2011 |
| KR | 239865 | 1/2000 |
| KR | 2001/0000805 | 1/2001 |
| KR | 239 865 | 10/2001 |
| KR | 2002/0037453 | 5/2002 |
| KR | 2005/0008439 | 1/2005 |
| KR | 2005/0021782 | 3/2005 |
| NZ | 286 668 | 10/1996 |
| RU | 2147790 | 4/2000 |
| WO | 93/01550 | 1/1993 |
| WO | WO 93/01550 | 1/1993 |
| WO | 96/13013 | 5/1996 |
| WO | WO 96/23013 | 5/1996 |
| WO | 96/24092 | 8/1996 |
| WO | 96/27155 | 9/1996 |
| WO | WO 97/21162 | 6/1997 |
| WO | 97/25798 | 7/1997 |
| WO | 97/43761 | 11/1997 |
| WO | WO 98/02793 | 1/1998 |
| WO | 98/09209 | 3/1998 |
| WO | 98/10381 | 3/1998 |
| WO | WO 98//10381 | 3/1998 |
| WO | WO 98/11478 | 3/1998 |
| WO | 98/21679 | 5/1998 |
| WO | WO 98/21683 | 5/1998 |
| WO | 98/24037 | 6/1998 |
| WO | WO 98/33106 | 7/1998 |
| WO | 98/37481 | 8/1998 |
| WO | 98/58306 | 8/1998 |
| WO | 98/42098 | 9/1998 |
| WO | WO 98/42098 | 9/1998 |
| WO | WO 98/47259 | 10/1998 |
| WO | 9858306 | 12/1998 |
| WO | WO 99/04328 | 1/1999 |
| WO | 99/15970 | 4/1999 |
| WO | WO 99/15970 | 4/1999 |
| WO | 99/53689 | 10/1999 |
| WO | WO 99/53689 | 10/1999 |
| WO | 00/08909 | 2/2000 |
| WO | 00/15221 | 3/2000 |
| WO | 00/21239 | 4/2000 |
| WO | 00/42492 | 7/2000 |
| WO | WO 00/54126 | 9/2000 |
| WO | WO 00/57637 | 9/2000 |
| WO | 00/58811 | 10/2000 |
| WO | 00/59150 | 10/2000 |
| WO | WO 00/57684 | 10/2000 |
| WO | WO 00/58810 | 10/2000 |
| WO | WO 00/58859 | 10/2000 |
| WO | WO 00/59152 | 10/2000 |
| WO | 00/68763 | 11/2000 |
| WO | WO 01/43342 | 1/2001 |
| WO | 01/22268 | 3/2001 |
| WO | 01/22651 | 3/2001 |
| WO | 01/33867 | 5/2001 |
| WO | WO 01/35293 | 5/2001 |
| WO | 01/44908 | 6/2001 |
| WO | 01/46783 | 6/2001 |
| WO | WO 01/45012 | 6/2001 |
| WO | 01/52021 | 7/2001 |
| WO | WO 01/52018 | 7/2001 |
| WO | WO 01/52020 | 7/2001 |
| WO | WO 01/63512 | 8/2001 |
| WO | WO 01/77795 | 10/2001 |
| WO | WO 01/78303 | 10/2001 |
| WO | WO 01/93461 | 12/2001 |
| WO | 02/01335 | 1/2002 |
| WO | WO 02/08969 | 1/2002 |
| WO | 02/23314 | 3/2002 |
| WO | 02/23315 | 3/2002 |
| WO | WO 02/19598 | 3/2002 |
| WO | 02/37371 | 5/2002 |
| WO | WO 02/056155 | 7/2002 |
| WO | 02/073378 | 9/2002 |
| WO | 02/86684 | 10/2002 |
| WO | WO 02/080442 | 10/2002 |
| WO | 02/097693 | 12/2002 |
| WO | WO 02/103495 | 12/2002 |
| WO | WO 03/009115 | 1/2003 |
| WO | WO 03/030434 | 4/2003 |
| WO | WO 03/073688 | 9/2003 |
| WO | WO 03/079269 | 9/2003 |
| WO | 03/090101 | 10/2003 |
| WO | WO03090101 | 10/2003 |
| WO | WO 03/107585 | 12/2003 |
| WO | WO 03/107588 | 12/2003 |
| WO | 2004/023717 | 3/2004 |
| WO | 2004/030364 | 4/2004 |
| WO | WO 2004/092886 | 10/2004 |
| WO | WO 2005/109202 | 11/2005 |
| WO | 2005/122047 | 12/2005 |
| WO | 2006/065012 | 6/2006 |
| WO | WO 2007/032974 | 3/2007 |

OTHER PUBLICATIONS

India Application 914/DEL/2005, First Examination Report mailed Nov. 26, 2013, 2 pages.
U.S. Appl. No. 10/971,346, Final Office Action mailed Nov. 7, 2013, 22 pages.
U.S. Appl. No. 11/107,014, Amendment and Response filed Dec. 5, 2013, 13 pages.

(56) References Cited

OTHER PUBLICATIONS

U.S. Appl. No. 11/353,321, Final Office Action mailed Dec. 5, 2013, 15 pages.
U.S. Appl. No. 11/107,014, Notice of Allowance mailed Dec. 23, 2013, 6 pages.
U.S. Appl. No. 12/053,090, Notice of Allowance mailed Nov. 18, 2013, 9 pages.
U.S. Appl. No. 12/832,831, Notice of Allowance mailed Dec. 6, 2013, 9 pages.
U.S. Appl. No. 13/367,198, Final Office Action mailed Oct. 25, 2013, 15 pages.
Australian Examination Response filed Aug. 21, 2009, In Australian Application No. 200400461 (26 pgs).
Australian First Report on Patent Action mailed May 22, 2009, in Australian Application No. 200400461 (2 pgs).
Australian Notice of Acceptance mailed Sep. 4, 2009, in Australian Application No. 2004200461 (3 pgs).
Chinese Notice on First Office Action mailed Feb. 6, 2009, in Chinese Application No. 200410007610 (11 pgs).
Chinese Notice on the First Action mailed Nov. 23, 2011, in Chinese Application No. 200910139429.8 (7 pgs).
European Communication mailed Jun. 8, 2006, in European Application No. 04003033.0 (3 pgs).
European Search Report mailed Sep. 26, 2005, in European Application No. 04003033.0 (4 pgs).
Evans, P. "DRM: Is the Road to Adoption Fraught with Potholes?" Seybold Reporting Analyzing Publishing Technologies, 2001, 1(14), 32.
*Features of Windows Media DRM.* www.microsoft.com/windows/windowsmedia/drm/features.aspx.
Fowler, T.B. "Technology's Changing Role in Intellectual Property Rights", IT Professional(IEEE), 2002, 4(2), 39-44.
Gable, J. "The Digital Rights Conundrum", Transform Magazine, 2001, 10(11), 27.
Griswold, G.N. "A Method for Protecting Copyright on Networks", IMA Intellectual Property Project Proceedings, 1994, 1(1), 169-178.
Gunter, C.A., et al. "Models and Languages for Digital Rights", Proceedings of the 34.sup.th Annual Hawaii International Conference on System Sciences, 2001, 1-5.
Hwang, C. et al., "Protection of Digital Contents on Distributed Multimedia Environment", Proceedings of the IASTED International Conference, Internet and Multimedia Systems and Applications, Nov. 19-23, 2000, Las Vegas, Nevada, USA, pp. 127-132.
India First Examination Report mailed Aug. 30, 2011, in India Application No. 167/MUM/2004 (3 pgs).
Japanese Notice of Allowance mailed Oct. 18, 2010, in Japanese Patent Application No. 2004-050478 (6 pgs).
Japanese Notice of Rejection mailed on May 28, 2010, in Japanese Application No. 2004-050478 (5 pgs).
Japanese Notice of Rejection mailed on Sep. 17, 2010, in Japanese Application No. 2004-050478 (3 pgs).
Kahn, R.E. "Deposit, Registration and Recordation in an Electronic Copyright Management System", IMA Intellectual Property Project Proceedings, 1994, 1(1), 111-120.
*Managing digital rights in online publishing.* Information Management & Technology, 2001, 34(4), 168-169.
Peinado, M. "Digital rights management in a multimedia environment", SMPTE Journal, 2002, 111(3), 159-163.
*Protecting Content with Digital Rights Management.* www.intelligraphics.com/articles/WDMaudiodesign_article.html.
*Rights Management Comes to the Enterprise: Rights Management Beyond Digital Media,* by Matt Rosoff, posted Mar. 17, 2003 http://directionsonmicrosoft.com/sample/DOMIS/update/2003/04apr/0403rmctte.htm.
Royan, B. Content creation and rights management; experiences of SCRAN(the Scottish Cultural Resources Access Network), Program, 2000, 34(2), 131-142.
Taiwan Notice of Allowance mailed Jul. 28, 2010, in Taiwanese Application No. 9310448 (4 pgs).
United States Advisory Action mailed Dec. 1, 2006, in U.S. Appl. No. 10/364,627.
United States Advisory Action mailed Feb. 12, 2009, in U.S. Appl. No. 11/108,038 (3 pgs).
United States Advisory Action mailed Jul. 9, 2007, in U.S. Appl. No. 10/373,621 (3 pgs).
United States Advisory Action mailed Jun. 26, 2009, in U.S. Appl. No. 11/107,709.
United States Advisory Office Action mailed Dec. 4, 2006, in U.S. Appl. No. 10/185,278.
United States Amendment After Notice of Allowance to Feb. 10, 2009 action, filed Mar. 16, 2009 in U.S. Appl. No. 10/185,278 (8 pgs).
United States Final Office Action mailed Apr. 16, 2008, in U.S. Appl. No. 11/179,206 (7 pgs).
United States Final Office Action mailed Apr. 18, 2007, in U.S. Appl. No. 10/373,621 (10 pgs).
United States Final Office Action mailed Aug. 24, 2007, in U.S. Appl. No. 10/185,278.
United States Final Office Action mailed Aug. 30, 2007, in U.S. Appl. No. 10/364,627.
United States Final Office Action mailed Feb. 12, 2009, in U.S. Appl. No. 11/107,014.
United States Final Office Action mailed Feb. 4, 2010, in U.S. Appl. No. 11/108,038.
United States Final Office Action mailed Jul. 12, 2011, in U.S. Appl. No. 12/053,090 (15 pgs).
United States Final Office Action mailed Mar. 16, 2010, in U.S. Appl. No. 11/107,709.
United States Final Office Action mailed Mar. 5, 2009, in U.S. Appl. No. 11/107,709.
United States Final Office Action mailed May 13, 2010, in U.S. Appl. No. 11/107,014.
United States Final Office Action mailed Nov. 19, 2008, in U.S. Appl. No. 11/108,038.
United States Final Office Action mailed Nov. 19, 2009, in U.S. Appl. No. 11/134,719 (12 pgs).
United States Final Office Action mailed Sep. 1, 2006, in U.S. Appl. No. 10/364,627.
United States Final Office Action mailed Sep. 15, 2011, in U.S. Appl. No. 11/107,014.
United States Final Office Action mailed Sep. 19, 2006, in U.S. Appl. No. 10/185,278.
United States Non-Final Office Action mailed Apr. 14, 2008, in U.S. Appl. No. 10/793,997.
United States Non-Final Office Action mailed Aug. 18, 2006, in U.S. Appl. No. 10/373,458.
United States Non-Final Office Action mailed Aug. 18, 2008, in U.S. Appl. No. 11/107,709.
United States Non-Final Office Action mailed Aug. 7, 2008, in U.S. Appl. No. 11/108,038.
United States Non-Final Office Action mailed Aug. 9, 2007, in U.S. Appl. No. 11/179,206 (6 pgs).
United States Non-Final Office Action mailed Feb. 27, 2007, in U.S. Appl. No. 10/185,278.
United States Non-Final Office Action mailed Feb. 28, 2006, in U.S. Appl. No. 10/185,278.
United States Non-Final Office Action mailed Jan. 10, 2008, in U.S. Appl. No. 10/185,278.
United States Non-Final Office Action mailed Jan. 31, 2007, in U.S. Appl. No. 10/373,458.
United States Non-Final Office Action mailed Jan. 8, 2008, in U.S. Appl. No. 10/364,627.
United States Non-Final Office Action mailed Jul. 17, 2008, in U.S. Appl. No. 10/185,278.
United States Non-Final Office Action mailed Jul. 27, 2009, in U.S. Appl. No. 11/108,038.
United States Non-Final Office Action mailed Jun. 6, 2006, in U.S. Appl. No. 10/373,621 (14 pgs).
United States Non-Final Office Action mailed Apr. 1, 2011, in U.S. Appl. No. 11/107,014.
United States Non-Final Office Action mailed Mar. 16, 2010, in U.S. Appl. No. 11/952,093 (5 pgs).

(56) References Cited

OTHER PUBLICATIONS

United States Non-Final Office Action mailed Mar. 31, 2008, in U.S. Appl. No. 11/107,014.
United States Non-Final Office Action mailed May 15, 2007, in U.S. Appl. No. 10/364,627.
United States Non-Final Office Action mailed May 30, 2006, in U.S. Appl. No. 10/364,627.
United States Non-Final Office Action mailed Nov. 15, 2006, in U.S. Appl. No. 10/644,359.
United States Non-Final Office Action mailed Nov. 2, 2006, in U.S. Appl. No. 10/373,621 (9 pgs).
United States Non-Final Office Action mailed Oct. 1, 2007, in U.S. Appl. No. 10/793,997.
United States Non-Final Office Action mailed Oct. 31, 2008, in U.S. Appl. No. 11/179,206 (8 pgs).
United States Non-Final Office Action mailed Sep. 1, 2010, in U.S. Appl. No. 12/053,090 (14 pgs).
United States Non-Final Office Action mailed Sep. 18, 2008, in U.S. Appl. No. 10/364,627.
United States Non-Final Office Action mailed Sep. 23, 2009, in U.S. Appl. No. 11/107,709.
United States Non-Final Office Action mailed Sep. 3, 2009, in U.S. Appl. No. 11/107,010.
United States Notice of Allowance mailed Dec. 26, 2007, in U.S. Appl. No. 10/373,621 (6 pgs).
United States Notice of Allowance mailed Feb. 10, 2009, in U.S. Appl. No. 10/185,278.
United States Notice of Allowance mailed Jul. 31, 2007, in U.S. Appl. No. 10/373,458.
United States Notice of Allowance mailed Jun. 1, 2007, in U.S. Appl. No. 10/644,359.
United States Notice of Allowance mailed May 11, 2009, in U.S. Appl. No. 10/364,627.
United States Notice of Allowance mailed May 14, 2009, in U.S. Appl. No. 11/179,206 (6 pgs).
United States Notice of Allowance mailed Oct. 29, 2008, in U.S. Appl. No. 10/793,997.
United States Notice of Allowance mailed Sep. 1, 2010, in U.S. Appl. No. 11/107,709.
United States Response to Apr. 1, 2011 action, filed Jun. 28, 2011 in U.S. Appl. No. 11/107,014 (11 pgs).
United States Response to Apr. 14, 2008 action, filed Jul. 15, 2008 in U.S. Appl. No. 10/793,997 (11 pgs).
United States Response to Apr. 16, 2008 office action, in U.S. Appl. No. 11/179,206, filed Oct. 15, 2008 (15 pgs).
United States Response to Apr. 18, 2007 office action, in U.S. Appl. No. 10/373,621, filed Jun. 18, 2007 (10 pgs).
United States Response to Apr. 18, 2007 office action, in U.S. Appl. No. 10/373,621, filed Sep. 17, 2007 (10 pgs).
United States Response to Aug. 18, 2006 action, filed Nov. 9, 2006 in U.S. Appl. No. 10/373,458 (19 pgs).
United States Response to Aug. 18, 2008 action, filed Nov. 18, 2008 in U.S. Appl. No. 11/107,709 (13 pgs).
United States Response to Aug. 24, 2007 action, filed Oct. 24, 2007 in U.S. Appl. No. 10/185,278 (8 pgs).
United States Response to Aug. 30, 2007 action, filed Oct. 16, 2007 in U.S. Appl. No. 10/364,627 (14 pgs).
United States Response to Aug. 7, 2008 office action, in U.S. Appl. No. 11/108,038, filed Nov. 6, 2008 (11 pgs).
United States Response to Aug. 9, 2007 office action, in U.S. Appl. No. 11/179,206, filed Jan. 9, 2008 (16 pgs).
United States Response to Feb. 12, 2009 action, filed Aug. 11, 2009 in U.S. Appl. No. 11/107,014 (11 pgs).
United States Response to Feb. 27, 2007 action, filed May 25, 2007 in U.S. Appl. No. 10/185,278 (9 pgs).
United States Response to Feb. 28, 2006 action, filed May 3, 2006 in U.S. Appl. No. 10/185,278 (20 pgs).
United States Response to Feb. 4, 2010 office action, in U.S. Appl. No. 11/108,038, filed May, 11 2010 (7 pgs).
United States Response to Jan. 10, 2008 action, filed Apr. 9, 2008 in U.S. Appl. No. 10/185,278 (11 pgs).
United States Response to Jan. 31, 2007 action, filed Apr. 30, 2007 in U.S. Appl. No. 10/373,458 (19 pgs).
United States Response to Jan. 8, 2008 action, filed May 8, 2008 in U.S. Appl. No. 10/364,627 (21 pgs).
United States Response to Jul. 12, 2011 office action, in U.S. Appl. No. 12/053,090, filed Nov. 14, 2011 (25 pgs).
United States Response to Jul. 17, 2008 action, filed Nov. 14, 2008 in U.S. Appl. No. 10/185,278 (14 pgs).
United States Response to Jul. 27, 2009 office action, in U.S. Appl. No. 11/108,038, filed Nov. 13, 2009 (8 pgs).
United States Response to Jun. 6, 2006 office action, in U.S. Appl. No. 10/373,621, filed Aug. 11, 2006 (16 pgs).
United States Response to Mar. 16, 2009 action, filed Jun. 7, 2010 in U.S. Appl. No. 11/107,709 (13 pgs).
United States Response to Mar. 31, 2008 action, filed Sep. 29, 2008 in U.S. Appl. No. 11/107,014 (11 pgs).
United States Response to Mar. 5, 2009 action, filed Jun. 5, 2009 in U.S. Appl. No. 11/107,709 (13 pgs).
United States Response to May 13, 2010 action, filed Sep. 13, 2010 in U.S. Appl. No. 11/107,014 (11 pgs).
United States Response to May 15, 2007 action, filed Aug. 15, 2007 in U.S. Appl. No. 10/364,627 (14 pgs).
United States Response to May 30, 2006 action, filed Aug. 11, 2006 in U.S. Appl. No. 10/364,627 (22 pgs).
United States Response to Nov. 15, 2006 action, filed Feb. 15, 2007 in U.S. Appl. No. 10/644,359 (10 pgs).
United States Response to Nov. 19, 2008 office action, in U.S. Appl. No. 11/108,038, filed Jan. 23, 2009 (10 pgs).
United States Response to Nov. 19, 2008 office action, in U.S. Appl. No. 11/108,038, filed May 12, 2009 (6 pgs).
United States Response to Nov. 2, 2006 office action, in U.S. Appl. No. 10/373,621, filed Feb. 2, 2007 (9 pgs).
United States Response to Oct. 1, 2007 action, filed Dec. 28, 2007 in U.S. Appl. No. 10/793,997 (8 pgs).
United States Response to Oct. 31, 2008 office action, in U.S. Appl. No. 11/179,206, filed Mar. 31, 2009 (16 pgs).
United States Response to Sep. 1, 2006 action, filed Feb. 28, 2007 in U.S. Appl. No. 10/364,627 (17 pgs).
United States Response to Sep. 1, 2006 action, filed Oct. 27, 2006 in U.S. Appl. No. 10/364,627 (10 pgs).
United States Response to Sep. 1, 2010 office action, in U.S. Appl. No. 12/053,090, filed Dec. 1, 2010 (20 pgs).
United States Response to Sep. 18, 2008 action, filed Mar. 18, 2009 in U.S. Appl. No. 10/364,627 (21 pgs).
United States Response to Sep. 19, 2006 action, filed Jan. 19, 2007 in U.S. Appl. No. 10/185,278 (8 pgs).
United States Response to Sep. 19, 2006 action, filed Nov. 10, 2006 in U.S. Appl. No. 10/185,278 (16 pgs).
United States Response to Sep. 23, 2009 action, filed Dec. 21, 2009 in U.S. Appl. No. 11/107,709 (12 pgs).
United States Response to Sep. 3, 2009 action, filed Mar. 3, 2010 in U.S. Appl. No. 11/107,014 (10 pgs).
United States Supplemental Notice of Allowance mailed Oct. 16, 2007, in U.S. Appl. No. 10/373,458.
Valimaki, M. et al., "Digital rights management on open and semi-open networks", WIAPP, 2001, 154-155.
Yu, H. "Digital multimedia at home and content rights management", IEEE Proceedings 2002 IEEE 4.sup.th International Workshop on Networked Appliances, 2002, 49-56.
Adams, C. et al. "Internet X.509 Public Key Infrastructure Certificate Management Protocols". Internet Engineering Task Force, Network Working Group, Mar. 1999, 1-72, XP-002284791.
*Aladdin acquires the assets of Micro Macro Technologies*. Business Wire, 1999 http://www.findarticles.com.
*Aladdin Knowledge Systems Partners with Rights Exchange, Inc. to Develop a Comprehensive Solution for Electronic Software Distribution*. Aug. 3, 1988, 5 pages.
Armati, D., "Tools and standards for protection, control and presentation of data," Apr. 3, 1996, 17 pages.

(56) References Cited

OTHER PUBLICATIONS

Arsenault, A. et al. "InternetX.509 Public Key Infrastructure: Roadmap". PKIX Working Group Internet Draft, Jul. 2002, 1-55, XP-002284790.
Australian Examiners First Report mailed Jan. 14, 2010, in Australian Patent Application No. 2005201602 (1 pgs).
Australian Examiners First Report mailed Jan. 15, 2010, in Australian Patent Application No. 2005201572 (2 pgs).
Australian Examiners First Report mailed Jan. 22, 2010, in Australian Patent Application No. 2004288593 (2 pgs).
Australian Examiners First Report mailed May 26, 2009, in Application No. 2004200454 (4 pgs).
Australian Examiners First Report mailed Sep. 2, 2009, in Application No. 2004200468 (2 pgs).
Australian Examiners Second Report mailed Jun. 7, 2010, in Australian Patent Application No. 2005201572 (2 pgs).
Australian Notice of Acceptance mailed Dec. 16, 2009, in Application No. 2004200468 (3 pgs).
Australian Notice of Acceptance mailed May 7, 2010, in Australian Patent Application No. 2005201602 (3 pgs).
Australian Notice of Acceptance mailed Oct. 14, 2010, in Australian Patent Application No. 2005201572 (3 pgs).
Australian Response to Examiner's First Report mailed Jan. 14, 2010, in Australian Patent Application No. 2005201602, filed Apr. 14, 2010 (6 pgs).
Australian Response to Examiner's First Report mailed Jan. 15, 2010, in Australian Patent Application No. 2005201572, filed May 11, 2010 (24 pgs).
Australian Response to Examiner's First Report mailed May 26, 2009, in Application No. 2004200454, filed Sep. 8, 2009 (36 pgs).
Australian Response to Examiner's First Report mailed Sep. 2, 2009, in Application No. 2004200468, filed Dec. 2, 2009 (40 pgs).
Australian Response to Examiners Second Report mailed Jun. 7, 2010, in Australian Patent Application No. 2005201572, filed Sep. 22, 2010 (19 pgs).
Benjamin, R. et al., "Electronic markets and virtual value chains on the information superhighway," Sloan Management Rev., Winter, 1995, 62-72.
*Black box crypton defies the hackers*, Electronic Weekly, 1985, 1257, p. 26 (from DialogClassic Web.TM. file 275, Accession No. 01116377).
*BreakerTech joins copyright management market*. From http://www.findarticles.com, Computer International, 1999.
Cassidy, "A Web developers guide to content encapsulation technology," Apr. 1997, 5 pages.
Chinese First Office Action mailed Jun. 27, 2008, in Chinese Application No. 200510004173.1 (17 pgs).
Chinese First Office Action mailed Mar. 8, 2010, in Chinese Application No. 200680025291.3 (13 pgs).
Chinese Notice on First Office Action mailed Apr. 17, 2009, in Chinese Patent Application No. 200410005381.9 (11 pgs).
Chinese Notice on First Office Action mailed Apr. 6, 2007, in Chinese Patent Application No. 200410033028.1 (6 pgs).
Chinese Notice on First Office Action mailed Jan. 16, 2009, in Chinese Patent Application No. 200480011309.5 (10 pgs).
Chinese Notice on First Office Action mailed Nov. 30, 2007, in Chinese Patent Application No. 200510066707.3 (8 pgs).
Chinese Notice on Grant of Patent Right for Invention mailed Jan. 15, 2010, in Chinese Patent Application No. 200410033028.1 (4 pgs).
Chinese Notice on Grant of Patent Right for Invention mailed Mar. 12, 2010, in Chinese Patent Application No. 200410005381.9 (4 pgs).
Chinese Notice on Grant of Patent Right for Invention mailed Mar. 17, 2011, in Chinese Patent Application No. 200680025291.3 (4 pgs).
Chinese Notice on Grant of Patent Right for Invention mailed Oct. 16, 2009, in Chinese Patent Application No. 200510065993 (4 pgs).
Chinese Notice of Grant of Patent Right for Invention mailed Sep. 27, 2011, in Chinese Patent Application No. 200510004173.1 (4 pgs).
Chinese Notice on Grant of Patent Right to Invention mailed Aug. 8, 2008, in Chinese Patent Application No. 200510066707.3 (4 pgs).
Chinese Notice on Second Office Action mailed Aug. 28, 2009, in Chinese Patent Application No. 200410033028.1 (7 pgs).
Chinese Notice on Second Office Action mailed Sep. 18, 2009, in Chinese Patent Application No. 200410005381.9 (9 pgs).
Chinese Notice on Grant of Patent Right for Invention mailed Sep. 23, 2011, in Chinese Patent Application No. 200480011309.5 (4 pgs).
Chinese Response to Second Office Action mailed Nov. 5, 2010, in Chinese Application No. 200680025291.3, filed Jan. 13, 2011 (7 pgs).
Chinese Response to Telephone Conversation mailed Jan. 30, 2011, in Chinese Application No. 200680025291.3 (6 pgs).
Chinese Response to First Office Action mailed Jun. 27, 2008, in Chinese Application No. 200510004173.1, filed Jan. 12, 2009 (19 pgs).
Chinese Response to First Office Action mailed Mar. 8, 2010, in Chinese Application No. 200680025291.3, filed Jun. 3, 2010 (8 pgs).
Chinese Response to Notice on First Office Action mailed Apr. 17, 2009, in Chinese Patent Application No. 200410005381.9, filed Jul. 30, 2009 (27 pgs).
Chinese Response to Notice on First Office Action mailed Jan. 16, 2009, in Chinese Patent Application No. 200480011309.5, filed Jun. 24, 2010 (12 pgs). [No Translation].
Chinese Response to Notice on First Office Action mailed Nov. 30, 2007, in Chinese Patent Application No. 200510066707.3, filed Apr. 15, 2008 (52 pgs).
Chinese Response to Second Office Action mailed Feb. 12, 2010, in Chinese Application No. 200510004173.1, filed Apr. 15, 2010 (17 pgs).
Chinese Second Office Action mailed Feb. 12, 2010, in Chinese Application No. 200510004173.1 (16 pgs).
Chinese Second Office Action mailed Nov. 5, 2010, in Chinese Application No. 200680025291.3 (9 pgs).
Cox, B., "Superdistribution," Idees Fortes, Sep. 1994, 2 pages.
Cox, B., "What if There is a Silver Bullet," J. Object Oriented Program, Jun. 1992, 8-9 and 76.
Curet, et al., "RTP Payload Format for MPEG-4 FlexMultiplexed Streams", Internet Engineering Task Force, Internet Draft, XP-001075015, Nov. 8, 2001, 15 pages.
European Communication mailed Apr. 14, 2010, in Application No. 04779484 (4 pgs).
European Communication dated Dec. 17, 2004, in European Application No. 04003418.3 (7 pgs).
European Communication dated Dec. 4, 2006, in European Application No. 03013557.8 (5 pgs).
European Communication dated Feb. 15, 2006, in European Application No. 03013557.8 (6 pgs).
European Communication dated Feb. 17, 2005, in European Application No. 03013557.8 (4 pgs).
European Communication dated Mar. 6, 2006, in European Application No. 04003418.3 (5 pgs).
European Communication dated Sep. 19, 2005, in European Application No. 04003418.3 (12 pgs).
European Communication mailed Aug. 25, 2006, in Application No. 04001953 (4 pgs).
European Communication mailed Mar. 2, 2007, in Application No. 05102768 (7 pgs).
European Communication mailed Nov. 19, 2007, in Application No. 05102765 (7 pgs).
European Communication mailed Oct. 14, 2008, in Application No. 00913629 (5 pgs).
European Communication mailed Oct. 15, 2008, in Application No. 00915912 (7 pgs).
European Decision dated Nov. 16, 2009, in European Application No. 03013557.8 (20 pgs).
European Decision to Grant dated Feb. 19, 2009, in Application No. 04001953 (2 pgs).
European Decision to Grant dated Sep. 13, 2007, in European Application No. 04003418.3 (2 pgs).
European Decision to Grant mailed Mar. 11, 2010, in Application No. 05102768 (2 pgs).

(56) References Cited

OTHER PUBLICATIONS

European Reply filed Feb. 25, 2009, in Application No. 00915912 (27 pgs).
European Reply to Communication mailed Aug. 25, 2006, in Application No. 04001953, filed Mar. 5, 2007 (33 pgs).
European Reply to Communication mailed Nov. 19, 2007, in Application No. 05102765, filed May 26, 2008 (20 pgs).
European Reply to Communication mailed Oct. 14, 2008, in Application No. 00913629, filed Feb. 24, 2009 (38 pgs).
European Response to Additional Telephone Interview, in Application No. 05102768, filed Nov. 18, 2008 (7 pgs).
European Response to Communication mailed Apr. 14, 2010, in Application No. 04779484, filed Aug. 2, 2010 (15 pgs).
European Response to Communication dated Dec. 17, 2004, in European Application No. 04003418.3, filed May 20, 2005 (12 pgs).
European Response to Communication dated Dec. 4, 2006, in European Application No. 03013557.8, filed Jun. 14, 2007 (15 pgs).
European Response to Communication dated Feb. 15, 2006, in European Application No. 03013557.8, filed Aug. 25, 2006 (16 pgs).
European Response to Communication dated Feb. 17, 2005, in European Application No. 03013557.8, filed Jun. 27, 2005 (23 pgs).
European Response to Communication dated Mar. 6, 2006, in European Application No. 04003418.3, filed Sep. 7, 2006 (12 pgs).
European Response to Communication dated Sep. 19, 2005, in European Application No. 04003418.3, filed Jan. 30, 2006 (13 pgs).
European Response to Communication mailed Mar. 2, 2007, in Application No. 05102768, filed Nov. 12, 2007 (26 pgs).
European Response to Result of Consultation of Nov. 10, 2008, in Application No. 05102768 (22 pgs).
European Response to Summons dated May 13, 2009, in European Application No. 03013557.8, filed Sep. 25, 2009 (18 pgs).
European Response to Telephone Interview, in Application No. 05102768, filed Nov. 14, 2008 (21 pgs).
European Response to the Invitation dated Nov. 28, 2008, in Application No. 05102768, filed Jan. 29, 2009 (7 pgs).
European Response to the Summons to Attend Oral Proceedings mailed Jul. 17, 2008, in Application No. 05102768, filed Oct. 15, 2008 (17 pgs).
European Search Report and Written Opinion in PCT/US2006/031185, date of mailing Jan. 16, 2007, p. 12.
European Search Report dated Aug. 2, 2004, in European Application No. 03013557.8 (4 pgs).
European Search Report dated Jul. 20, 2004, in European Application No. 04003418.3 (5 pgs).
European Search Report filed Aug. 2, 2005, in Application No. 04001953 (4 pgs).
European Search Report mailed Aug. 24, 2006, in Application No. 05102768 (3 pgs).
European Search Report mailed Mar. 23, 2012, in Application No. 05101183 (4 pgs).
European Search Report mailed Nov. 2, 2006, in Application No. 04779484 (3 pgs).
European Search Report mailed Nov. 8, 2007, in Application No. 06774628 (3 pgs).
European Search Report mailed Oct. 13, 2006, in Application No. 05102765 (3 pgs).
European Search Report mailed Sep. 26, 2002, in Application No. 00915912 (3 pgs).
European Summons to Attend Oral Proceedings dated May 13, 2009, in European Application No. 03013557.8 (7 pgs).
European Summons to Attend Oral Proceedings mailed Jul. 17, 2008, in Application No. 05102768 (8 pgs).
European Supplemental Search report filed Feb. 8, 2010, in Application No. 04779484 (3 pgs).
*Free On-Line Dictionary of Computing Concatenate.* Dec. 22, 1995.
Gold, S. "Finland—Data fellows secures ICSA certification", Newsbytes, 1998, (from DialogClassic Web(TM), File 9, Accession No. 01451058, 2 pages).
Handley, et al., "SDP: Session Description Protocol," The Internet Society, 1998, pp. 1-42.

Hauser, R.C., "Does licensing require new access control techniques?" Aug. 1993, 9 pages.
Hong, S. et al., "On the construction of a powerful distributed authentication server without additional key management", Computer Communications, 2000, 23, 1638-1644.
Housley, R. et al. "RFC 3280: Internet X.509 Public Key infrastructure Certificate and CRL Profile (w/o Annexes)" RFC 3280, Apr. 2002, XP002279343.
Hudgins-Bonafield, C. "Selling Knowledge on the Net," Network Computing, Jun. 1, 1995, 102-109.
*IBM spearheading intellectual property protection technology for information on the Internet.* May 1996, 3 pages.
India First Examination Report mailed Jul. 27, 2011, in India Application No. 136/MUM/2004 (4 pgs).
Indonesia Notice of the Results of Substantive Examination mailed Dec. 19, 2007, in Indonesia Patent Application No. P-00 2004 00074 (4 pgs).
International Preliminary Examination Report on Patentability as issued in International Application No. PCT/US2000/04946 completed Oct. 23, 2002 (2 pgs).
International Preliminary Examination Report on Patentability as issued in International Application No. PCT/US2000/04947 completed Aug. 27, 2002 (2 pgs).
International Preliminary Examination Report on Patentability as issued in International Application No. PCT/US2000/04948 completed Oct. 23, 2002 (2 pgs).
International Preliminary Examination Report on Patentability as issued in International Application No. PCT/US2000/04949 Oct. 23, 2002 (2 pgs).
International Preliminary Examination Report on Patentability as issued in International Application No. PCT/US2000/04972 Sep. 4, 2002 (2 pgs).
International Preliminary Examination Report on Patentability as issued in International Application No. PCT/US2000/04983 Oct. 31, 2002 (2 pgs).
International Preliminary Examination Report on Patentability as issued in International Application No. PCT/US2000/05091 Apr. 12, 2002 (2 pgs).
International Preliminary Examination Report on Patentability as issued in International Application No. PCT/US2004/024439 Nov. 1, 2006 (7 pgs).
International Preliminary Examination Report on Patentability as issued in International Application No. PCT/US2006/026913 Jan. 16, 2008 (4 pgs).
International Search Report as mailed Jul. 22, 2002 in International Application No. PCT/US2000/04949 (5 pgs).
International Search Report as mailed Jul. 24, 2002 in International Application No. PCT/US2000/04946 (5 pgs).
International Search Report as mailed Jul. 24, 2002 in International Application No. PCT/US2000/04948 (5 pgs).
International Search Report as mailed Jul. 26, 2002 in International Application No. PCT/US2000/05091 (5 pgs).
International Search Report as mailed Jul. 30, 2002 in International Application No. PCT/US2000/04983 (5 pgs).
International Search Report as mailed Sep. 18, 2007 in International Application No. PCT/US2006/026913 (3 pgs).
International Search Report as mailed Sep. 6, 2006 in International Application No. PCT/US2004/024439 (3 pgs).
Jakobsson, M. et al., "Proprietary Certificates", Topics in Cryptology, 2002, 164-181.
Kaplan, M.A., "IBM Cryptolopes.TM., SuperDistribution and Digital Rights Management", http://www.research.ibm.com, 1996, pp. 1-10.
Kent, S.T., "Protecting externally supplied software in small computers," Sep. 1980, 1-42 and 250-252.
Klemets, "RTP Payload Format for Video Codec 1 (VC-1)," Microsoft, Feb. 2006, pp. 1-36.
Kohl, U. et al., "Safeguarding Digital Library Contents and Users; Protecting Documents Rather Than Channels," D-Lib Magazine, Sep. 1997, 9 pages.
Kumik, P. "Digital Rights Management", Computers and Law, 2000, 11(4), 14-15.

(56) References Cited

OTHER PUBLICATIONS

*LicensIt: kinder, gentler copyright? Copyright management system links content, authorship information.* Seybold Report on Desktop Publishing, 1996, 10(11), 2 pages.
Linn, R.J., "Copyright and Information Services in the Context of the National Research and Education Network," IMA Intell. Property Project Proceedings, Jan. 1994, 1(1), 1 and 10-20.
Managing Digital Rights in Online Publishing, "How two publishing houses maintain control of copyright" Information Management & Technology, 2001, 34(4), 168-169.
Maurer, Ueli, "Modeling a Public-Key Infrastructure," XP002212747, Sep. 1999.
McNab, L., "Super-distribution works better in practical applications," Mar. 2, 1998, 2 pages.
Menezes et al. Handbook of Applied Cryptography 1997 CRC Press pp. 31-32.
Moeller, M., "IBM takes charge of E-commerce; Plans client, server apps based on SET," Apr. 1996, 4 pages.
Moeller, M., "NetTrust lets Cyberspace Merchants Take Account," PC Week, Nov. 20, 1995, 12(48), 1 page.
Myers, et al. "Certificate Management Messages over CMS. Internet Engineering Task Force", Network Working Group, Apr. 2000, 1-47, XP-002284794.
Myers, M. et al., "Internet X.509 Certificate Request Message Format", Internet X.509, Mar. 1999, http://www.rfc.net/rfc2511.html, 24 pages.
Nafaa, A. et al, "RTP4mux: A Novel MPEG-4 RTP Payload for Multicast Video Communications over Wireless IP", Retrieved from the Internet Mar. 22, 2005: URL:http//www.polytech.uiv-nantes. PDF.
Olson, M., et al., "Concurrent access licensing," UNIX Review, 1988, 6(9), 67-72 (from Dialog Accession No. 01254918).
*Optimising license checkouts from a floating license server*, ARM the Architecture for the Digital World, http://www.arm.com/support/faqdev/1391.html.
Pemberton, J., "An ONLINE Interview with Jeff Crigler at IBM InfoMarket," Jul. 1996, 6 pages.
Proposed SMPTE Standard for Television: VC-1 Compressed Video Bitstream "Format and Decoding Process," The Society of Motion Picture and Television Engineers, Aug. 23, 2005, pp. 1-480.
Ramanujapuram, A. et al., "Digital Content & Intellectual Property Rights: A specification language and tools for rights management," Dec. 1998, 20-23 and 26.
*Rights Management in the Digital Age: Trading in Bits, Not Atoms.* Spring, 1997, 4, 3 pages.
Rouvroy, G. et al. "Reconfigurable hardware solutions for the digital rights management of digital cinema", Oct. 2004, DRM '04: Proceedings of the 4th ACM workshop on Digital rights management, ACM, pp. 40-53.
*RTP Payload Format for MPEG-4 Streams.* Internet Engineering Task Force, Internet Draft, XP-001033580, Jul. 2001, 41 pages.
Schneier, B., "Applied Cryptography Passage", Applied Cryptography, Protocols, Algorithms and Source Code in C, 1996, 2.sup.nd edition, 585-587, XP 000863833.
Schneier, B., "Applied Cryptography", Applied Cryptography, Protocols, Algorithms and Source Code in C, 1996, 183-187 & 574-577, XP-002954321.
Schulzrinne, et al., "RTP: A Transport Protocol for Real-Time Applications," The Internet Society, 2003, pp. 1-104.
Schulzrinne, H. "RTP Profile for Audio and Video Conferences with Minimal Control". RFC 1890, available at [[http://faqs.org/rfcs/rfc1890.html]], accessed Jan. 7, 2004, 14 pages.
Sibert, O. et al., "Securing the Content, Not the Wire, for Information Commerce," Jul. 1995, 1-11.
Sibert, O. et al., "The DigiBox: A Self-protecting Container for Information Commerce," First USENIX Workshop on Electronic Commerce, Jul. 11-12, 1995, 171-183.
*SMPTE Standard for Television, Audio and Film—Time and Control Code.* The Society of Motion Picture and Television Engineers, Sep. 12, 1995.
Solution for piracy, Which Computer, 1983, p. 29 (from DialogClassic Web.TM. file 275, Accession No. 01014280).
*Sony develops copyright protection solutions for digital music content.* PR Newswire, 1999, http://www.findarticles.com.
Stefik, M., "Shifting the Possible: How Trusted Systems and Digital Property Rights Challenge Us to Rethink Digital Publishing," Technical Perspective, 1997, 137-159.
Stefik, M., "Trusted Systems," Mar. 1997, 8 pages.
*Technological Solutions Rise to Complement Law's Small Stick Guarding Electronic Works.* Information Law Alert, Jun. 16, 1995, 3-4 and 7.
*The Directory Public-Key Attribute Certificate Frameworks.* International Telecommunication Union, ITU-T Telecommunication Standardization Sector of ITU. Mar. 2000, XP-002284793.
Thompson, C.W., et al., "Digital licensing," IEEE Internet Computing, 2005, 9(4).
Torrubia, A. et al., "Cryptography regulations for E-commerce and digital rights management", Computers & Security, 2001, 20(8), 724-738.
Weber, R., "Digital Right Management Technologies," Oct. 1995, 35 pages.
White, S.R. et al., "Abyss: A trusted architecture for software protection," IEEE Symposium on Security and Privacy, Apr. 27-29, 1987, 38-51.
White, S.R. et al., "Abyss: An Architecture for Software Protection," IEEE Trans. on Software Engineering, Jun. 1990, 16(6), 619-629.
Windows Media, "A Technical Overview of Windows Media DRM 10 for Devices," Microsoft Corp. Sep. 2004.
Won-Ho Kim, "Design and Implementation of MPEG-2/DVB Scrambler Unit and VLSI Chip" 1997 International Conference on Consumer Electronics vol. 43 No. 3. pp. 320-321 Jun. 1997.
Written Opinion of the International Searching Authority as completed Apr. 29, 2006 in International Application No. PCT/US2004/024439 (6 pgs).
Written Opinion of the International Searching Authority as completed Jul. 26, 2007 in International Application No. PCT/US2006/026913 (3 pgs).
Zwollo, K. "Digital document delivery and digital rights management", Information Services & Use, 2001, 9-11.
"Digital Media Solutions: Secure Streaming", OmniWeb, http://www.omniweb.com/dms.html#stream, 3 pgs.
Kington, "Manage digital rights with the OMA," IBM, Jul. 27, 2004, http://www-106.ibm.com/developerworks/wireless/library/wi-drm.html, 4 pgs.
"Realnetworks Announces Helix Drm—The First Major Digital Rights Management Platform for Both Standards-Based and Internet Formats", http://www.realnetworks.com/company/press/releases/2003/helixdrm.html, 3 pgs.
Rosoff, "Rights Management Comes to the Enterprise: Right Management Beyond Digital Media", posted Mar. 17, 2003, http://directionsonmicrosoft.com/sample/DOMIS/update/2003/04apr/0403rmctte.htm, 5 pgs.
How Windows Rights Management Works (Illustration), posted Mar. 17, 2003, http://directinsmicrosoft.com/sample/DOMIS/update/2003/04apr/0403rmctte_illo.htm, 5 pgs.
Office Action dated Jan. 14, 2009 issued in U.S. Appl. No. 11/134,719, 14 pgs.
Response to Office Action dated Jul. 14, 2009 filed in U.S. Appl. No. 11/134,719, 11 pgs.
Office Action dated Nov. 19, 2009 issued in U.S. Appl. No. 11/134;719, 13 pgs.
Response to Office Action dated Jan. 19, 2010 flied in U.S. Appl. No. 11/134,719, 13 pgs.
Canadian Application 2456400, Office Action mailed Jan. 17, 2013 (2 pages).
Canadian Application 2456400, Office Action mailed Sep. 5, 2012 (2 pages).
Canadian Application 2456592, Office Action mailed Aug. 29, 2012 (5 pages).
Canadian Application 2457291, Office Action mailed Oct. 30, 2012 (6 pages).
Canadian Application 2457938, Office Action mailed Apr. 24, 2012 (3 pages).

(56) References Cited

OTHER PUBLICATIONS

Canadian Application 2504677, Office Action mailed Aug. 31, 2012 (2 pages).
Canadian Application 2505295, Office Action mailed Mar. 29, 2012 (4 pages).
Chinese Notice on the Second Action mailed Aug. 3, 2012, in Chinese Application No. 200910139429.8 (11 pgs).
Chinese Notice on the Third Action mailed Feb. 21, 2013, in Chinese Application No. 200910139429.8 (8 pgs).
European Application 02014340.0, Search Report mailed Aug. 11, 2005 (3 pages).
India Application 135/MUM/2004, First Examination Report mailed Apr. 25, 2012 (2 pages).
Japanese Application 2002-186967, Decision to Grant a Patent mailed on Oct. 31, 2008 (6 pages).
Japanese Application 2002-186967, Official Notice of Rejection mailed Feb. 29, 2008 (12 pages).
Japanese Application 2002-186968, Notice of Allowance mailed Oct. 9, 2009 (6 pages).
Japanese Application 2002-186968, Notice of Rejection mailed Jun. 12, 2009 (7 pages).
Japanese Application 2002-186968, Official Notice of Rejection mailed Dec. 9, 2008 (33 pages).
Japanese Application 2004-035810, Decision to Decline the Amendment mailed Apr. 17, 2012 (14 pages).
Japanese Application 2004-035810, Interrogation mailed Sep. 2, 2011 (6 pages).
Japanese Application 2004-035810, Notice of Rejection mailed Apr. 17, 2012 (33 pages).
Japanese Application 2004-035810, Written Appeal mailed Jan. 21, 2011 (9 pages).
PCT Application PCT/US00/22972, Publication and International Search Report mailed Nov. 27, 2000 (128 pages).
PCT Application PCT/US00/23105, Publication and International Search Report mailed Dec. 21, 2000 (134 pages).
PCT Application PCT/US00/23106, Publication and International Search Report mailed Feb. 19, 2001 (130 pages).
PCT Application PCT/US00/23107, Publication and International Search Report mailed Nov. 22, 2000 (133 pages).
PCT Application PCT/US00/23108, Publication and International Search Report mailed Dec. 14, 2000 (131 pages).
SDMI Portable Device Specification Part 1 Version 1.0, Secure Digital Music Initiate, 1999 (35 pages).
U.S. Appl. No. 11/107,014, Amendment and Response filed Feb. 21, 2013 (15 pages).
U.S. Appl. No. 11/107,014, Amendment and Response filed Aug. 14, 2012 (13 pages).
U.S. Appl. No. 11/107,014, Amendment and Response filed Dec. 15, 2011 (11 pages).
U.S. Appl. No. 11/107,014, Final Rejection mailed Nov. 21, 2012 (10 pages).
U.S. Appl. No. 11/107,014, Non-Final Rejection mailed Mar. 14, 2012 (10 pages).
U.S. Appl. No. 09/525,509, Advisory Action mailed Aug. 10, 2005 (2 pages).
U.S. Appl. No. 09/525,509, Amendment After Notice of Allowance filed Jun. 12, 2007 (3 pages).
U.S. Appl. No. 09/525,509, Amendment and Response filed Jan. 7, 2005 (10 pages).
U.S. Appl. No. 09/525,509, Amendment and Response filed Feb. 27, 2006 (18 pages).
U.S. Appl. No. 09/525,509, Amendment and Response filed Jul. 22, 2005 (22 pages).
U.S. Appl. No. 09/525,509, Final Rejection mailed May 20, 2005 (24 pages).
U.S. Appl. No. 09/525,509, Non-Final Rejection mailed Oct. 6, 2004 (24 pages).
U.S. Appl. No. 09/525,509, Non-Final Rejection mailed Nov. 18, 2005 (22 pages).
U.S. Appl. No. 09/525,509, Notice of Allowance mailed Apr. 4, 2007 (7 pages).
U.S. Appl. No. 09/525,510, Advisory Action mailed Feb. 20, 2004 (2 pages).
U.S. Appl. No. 09/525,510, Advisory Action mailed Dec. 8, 2006 (2 pages).
U.S. Appl. No. 09/525,510, Amendment After Final filed May 2, 2003 (11 pages).
U.S. Appl. No. 09/525,510, Amendment After Notice of Allowance filed Jun. 12, 2007 (3 pages).
U.S. Appl. No. 09/525,510, Amendment and Response Sep. 22, 2003 (7 pages).
U.S. Appl. No. 09/525,510, Amendment and Response filed Jan. 10, 2005 (9 pages).
U.S. Appl. No. 09/525,510, Amendment and Response filed Jan. 26, 2004 (7 pages).
U.S. Appl. No. 09/525,510, Amendment and Response filed Apr. 25, 2006 (8 pages).
U.S. Appl. No. 09/525,510, Amendment and Response filed Jul. 8, 2005 (16 pages).
U.S. Appl. No. 09/525,510, Amendment and Response filed Nov. 4, 2002 (7 pages).
U.S. Appl. No. 09/525,510, Amendment and Response filed Nov. 13, 2006 (13 pages).
U.S. Appl. No. 09/525,510, Amendment and Response filed Dec. 16, 2005 (17 pages).
U.S. Appl. No. 09/525,510, Appeal Brief filed Jul. 12, 2004 (38 pages).
U.S. Appl. No. 09/525,510, Final Rejection filed Jan. 29, 2003 (12 pages).
U.S. Appl. No. 09/525,510, Final Rejection mailed Jul. 7, 2006 (13 pages).
U.S. Appl. No. 09/525,510, Final Rejection mailed Nov. 13, 2003 (12 pages).
U.S. Appl. No. 09/525,510, Non-Final Rejection mailed Jan. 23, 2006 (12 pages).
U.S. Appl. No. 09/525,510, Non-Final Rejection mailed Apr. 26, 2005 (11 pages).
U.S. Appl. No. 09/525,510, Non-Final Rejection mailed Jun. 5, 2003 (11 pages).
U.S. Appl. No. 09/525,510, Non-Final Rejection mailed Sep. 3, 2002 (12 pages).
U.S. Appl. No. 09/525,510, Non-Final Rejection mailed Sep. 16, 2005 (12 pages).
U.S. Appl. No. 09/525,510, Non-Final Rejection mailed Oct. 12, 2004 (11 pages).
U.S. Appl. No. 09/525,510, Notice of Allowance mailed Apr. 3, 2007 (8 pages).
U.S. Appl. No. 09/892,298, Advisory Action mailed Nov. 2, 2005 (6 pages).
U.S. Appl. No. 09/892,298, Amendment After Final filed Oct. 11, 2005 (14 pages).
U.S. Appl. No. 09/892,298, Amendment and Response filed May 27, 2005 (17 pages).
U.S. Appl. No. 09/892,298, Final Rejection mailed Aug. 11, 2005 (16 pages).
U.S. Appl. No. 09/892,298, Non-Final Rejection mailed Mar. 16, 2005 (17 pages).
U.S. Appl. No. 09/892,298, Pre-Brief Appeal Conference Decision mailed Mar. 10, 2006 (2 pages).
U.S. Appl. No. 09/892,298, Pre-Brief Conference Request mailed Nov. 16, 2005 (6 pages).
U.S. Appl. No. 09/892,329, Advisory Action mailed Oct. 12, 2005 (3 pages).
U.S. Appl. No. 09/892,329, Amendment and Response filed Feb. 2, 2005 (13 pages).
U.S. Appl. No. 09/892,329, Amendment and Response filed Apr. 17, 2006 (23 pages).
U.S. Appl. No. 09/892,329, Amendment and Response filed Jul. 13, 2005 (20 pages).
U.S. Appl. No. 09/892,329, Amendment and Response filed Oct. 3, 2005 (24 pages).

(56) References Cited

OTHER PUBLICATIONS

U.S. Appl. No. 09/892,329, Amendment and Response filed Nov. 7, 2006 (19 pages).
U.S. Appl. No. 09/892,329, Final Rejection mailed Jul. 7, 2006 (14 pages).
U.S. Appl. No. 09/892,329, Final Rejection mailed Aug. 10, 2005 (13 pages).
U.S. Appl. No. 09/892,329, Non-Final Rejection mailed Jan. 18, 2006 (12 pages).
U.S. Appl. No. 09/892,329, Non-Final Rejection mailed Apr. 20, 2005 (12 pages).
U.S. Appl. No. 09/892,329, Non-Final Rejection mailed Nov. 2, 2004 (28 pages).
U.S. Appl. No. 09/892,329, Notice of Allowance mailed Jan. 16, 2007 (7 pages).
U.S. Appl. No. 09/892,371, Advisory Action mailed Nov. 3, 2005 (3 pages).
U.S. Appl. No. 09/892,371, Amendment and Response filed May 20, 2005 (20 pages).
U.S. Appl. No. 09/892,371, Amendment and Response filed Oct. 11, 2005 (25 pages).
U.S. Appl. No. 09/892,371, Final Rejection mailed Aug. 23, 2005 (15 pages).
U.S. Appl. No. 09/892,371, Non-Final Rejection mailed Mar. 8, 2005 (14 pages).
U.S. Appl. No. 09/892,371, Notice of Allowance mailed Feb. 10, 2006 (11 pages).
U.S. Appl. No. 10/980,743, Amendment and Response filed Jul. 8, 2008 (15 pages).
U.S. Appl. No. 10/980,743, Non-Final Rejection mailed Apr. 11, 2008 (14 pages).
U.S. Appl. No. 10/980,743, Notice of Allowance mailed Mar. 10, 2009 (7 pages).
U.S. Appl. No. 10/980,743, Notice of Allowance mailed Oct. 24, 2008 (7 pages).
U.S. Appl. No. 10/981,846, Amendment and Response filed Apr. 28, 2008 (10 pages).
U.S. Appl. No. 10/981,846, Non-Final Rejection mailed Jan. 28, 2008 (7 pages).
U.S. Appl. No. 10/981,846, Notice of Allowance mailed Jun. 2, 2008 (6 pages).
U.S. Appl. No. 10/982,105, Notice of Allowance mailed Dec. 2, 2005 (7 pages).
U.S. Appl. No. 10/982,578, Amendment and Response filed Feb. 24, 2010 (15 pages).
U.S. Appl. No. 10/982,578, Amendment and Response filed Feb. 25, 2009 (13 pages).
U.S. Appl. No. 10/982,578, Amendment and Response filed Jul. 14, 2010 (11 pages).
U.S. Appl. No. 10/982,578, Amendment and Response filed Jul. 23, 2009 (14 pages).
U.S. Appl. No. 10/982,578, Amendment and Response filed Sep. 11, 2008 (14 pages).
U.S. Appl. No. 10/982,578, Amendment After Notice of Allowance filed Dec. 17, 2010 (3 pages).
U.S. Appl. No. 10/982,578, Final Rejection mailed Nov. 24, 2009 (24 pages).
U.S. Appl. No. 10/982,578, Final Rejection mailed Nov. 25, 2008 (17 pages).
U.S. Appl. No. 10/982,578, Non-Final Rejection mailed Apr. 14, 2010 (13 pages).
U.S. Appl. No. 10/982,578, Non-Final Rejection mailed Apr. 23, 2009 (13 pages).
U.S. Appl. No. 10/982,578, Non-Final Rejection mailed May 13, 2008 (16 pages).
U.S. Appl. No. 10/982,578, Notice of Allowance mailed Apr. 18, 2011 (9 pages).
U.S. Appl. No. 10/982,578, Notice of Allowance mailed Oct. 14, 2010 (7 pages).
U.S. Appl. No. 10/983,040, Advisory Action mailed Mar. 11, 2009 (3 pages).
U.S. Appl. No. 10/983,040, Amendment After Final filed Feb. 24, 2009 (12 pages).
U.S. Appl. No. 10/983,040, Amendment and Response filed Jan. 30, 2008 (10 pages).
U.S. Appl. No. 10/983,040, Amendment and Response filed Aug. 18, 2008 (10 pages).
U.S. Appl. No. 10/983,040, Amendment and Response filed Nov. 23, 2009 (10 pages).
U.S. Appl. No. 10/983,040, Final Rejection mailed Nov. 25, 2008 (11 pages).
U.S. Appl. No. 10/983,040, Non-Final Rejection mailed Apr. 17, 2008 (14 pages).
U.S. Appl. No. 10/983,040, Non-Final Rejection mailed May 28, 2009 (13 pages).
U.S. Appl. No. 10/983,040, Non-Final Rejection mailed Oct. 30, 2007 (10 pages).
U.S. Appl. No. 10/983,040, Notice of Allowance mailed Mar. 11, 2010 (6 pages).
U.S. Appl. No. 10/983,040, Notice of Allowance mailed Mar. 30, 2010 (6 pages).
U.S. Appl. No. 11/094,097, Advisory Action mailed Mar. 31, 2008 (3 pages).
U.S. Appl. No. 11/094,097, Amendment and Response filed Mar. 7, 2008 (13 pages).
U.S. Appl. No. 11/094,097, Amendment and Response filed Apr. 21, 2009 (9 pages).
U.S. Appl. No. 11/094,097, Amendment and Response filed Sep. 28, 2007 (13 pages).
U.S. Appl. No. 11/094,097, Amendment and Response filed Oct. 28, 2008 (11 pages).
U.S. Appl. No. 11/094,097, Final Rejection mailed Dec. 13, 2007 (17 pages).
U.S. Appl. No. 11/094,097, Non-Final Rejection mailed Jun. 28, 2007 (17 pages).
U.S. Appl. No. 11/094,097, Non-Final Rejection mailed Jul. 28, 2008 (20 pages).
U.S. Appl. No. 11/094,097, Notice of Allowance mailed Jul. 13, 2009 (12 pages).
U.S. Appl. No. 11/094,097, Supplemental Response filed Dec. 11, 2008 (14 pages).
U.S. Appl. No. 11/107,513, Amendment After Final filed Jun. 23, 2009 (7 pages).
U.S. Appl. No. 11/107,513, Amendment After Notice of Allowance filed Aug. 13, 2009 (6 pages).
U.S. Appl. No. 11/107,513, Amendment and Response filed Dec. 17, 2008 (12 pages).
U.S. Appl. No. 11/107,513, Final Rejection mailed Mar. 23, 2009 (8 pages).
U.S. Appl. No. 11/107,513, Non-Final Rejection mailed Sep. 19, 2008 (8 pages).
U.S. Appl. No. 11/107,513, Notice of Allowance mailed Jul. 9, 2009 (7 pages).
U.S. Appl. No. 11/108,038, Amendment and Response filed Apr. 9, 2012 (11 pages).
U.S. Appl. No. 11/108,038, Amendment and Response filed Sep. 4, 2012 (14 pages).
U.S. Appl. No. 11/108,038, Final Rejection mailed Jun. 4, 2012 (11 pages).
U.S. Appl. No. 11/108,038, Non-Final Rejection mailed Dec. 7, 2011 (9 pages).
U.S. Appl. No. 11/116,884, Notice of Allowance mailed Mar. 6, 2013 (8 pages).
U.S. Appl. No. 11/116,884, Notice of Allowance mailed Dec. 20, 2012 (8 pages).
U.S. Appl. No. 11/132,677, Advisory Action mailed Jan. 9, 2009 (3 pages).
U.S. Appl. No. 11/132,677, Amendment After Final filed Dec. 29, 2008 (17 pages).
U.S. Appl. No. 11/132,677, Amendment and Response filed Mar. 2, 2009 (14 pages).

(56) References Cited

OTHER PUBLICATIONS

U.S. Appl. No. 11/132,677, Amendment and Response filed Aug. 8, 2008 (17 pages).
U.S. Appl. No. 11/132,677, Final Rejection mailed Oct. 1, 2008 (10 pages).
U.S. Appl. No. 11/132,677, Non-Final Rejection mailed Apr. 8, 2008 (9 pages).
U.S. Appl. No. 11/132,677, Notice of Allowance mailed May 7, 2009 (6 pages).
U.S. Appl. No. 11/132,677, Notice of Allowance mailed Sep. 23, 2009 (6 pages).
U.S. Appl. No. 11/134,719, Amendment and Response filed Apr. 18, 2012 (8 pages).
U.S. Appl. No. 11/134,719, Final Rejection mailed May 3, 2012 (12 pages).
U.S. Appl. No. 11/134,719, Non-Final Rejection mailed Jan. 19, 2012 (10 pages).
U.S. Appl. No. 11/353,321, Amendment and Response filed Apr. 30, 2013 (22 pages).
U.S. Appl. No. 11/353,321, Final Rejection mailed Jan. 31, 2013 (13 pages).
U.S. Appl. No. 11/432,276, Amendment and Response filed Jan. 30, 2008 (7 pages).
U.S. Appl. No. 11/432,276, Amendment and Response filed Sep. 14, 2007 (11 pages).
U.S. Appl. No. 11/432,276, Non-Final Rejection mailed Jun. 14, 2007 (14 pages).
U.S. Appl. No. 11/432,276, Non-Final Rejection mailed Oct. 30, 2007 (8 pages).
U.S. Appl. No. 11/432,276, Notice of Allowance mailed Mar. 28, 2008 (4 pages).
U.S. Appl. No. 11/754,856, Amendment After Final filed Jun. 23, 2011 (8 pages).
U.S. Appl. No. 11/754,856, Amendment and Response filed Jan. 10, 2011 (10 pages).
U.S. Appl. No. 11/754,856, Amendment and Response filed Jun. 18, 2010 (10 pages).
U.S. Appl. No. 11/754,856, Amendment and Response filed Dec. 29, 2009 (9 pages).
U.S. Appl. No. 11/754,856, Final Rejection mailed Mar. 10, 2010 (14 pages).
U.S. Appl. No. 11/754,856, Final Rejection mailed Apr. 8, 2011 (5 pages).
U.S. Appl. No. 11/754,856, Non-Final Rejection mailed Sep. 29, 2009 (13 pages).
U.S. Appl. No. 11/754,856, Non-Final Rejection mailed Oct. 14, 2010 (14 pages).
U.S. Appl. No. 11/754,856, Notice of Allowance mailed Jul. 14, 2011 (7 pages).
U.S. Appl. No. 11/866,041, Advisory Action mailed Dec. 2, 2011 (3 pages).
U.S. Appl. No. 11/866,041, Amendment and Response filed Feb. 8, 2011 (9 pages).
U.S. Appl. No. 11/866,041, Amendment and Response filed Oct. 27, 2011 (9 pages).
U.S. Appl. No. 11/866,041, Final Rejection mailed Aug. 24, 2011 (12 pages).
U.S. Appl. No. 11/866,041, Non-Final Rejection mailed Oct. 12, 2010 (17 pages).
U.S. Appl. No. 12/014,081, Amendment and Response filed Jun. 23, 2010 (15 pages).
U.S. Appl. No. 12/014,081, Amendment and Response filed Nov. 18, 2010 (17 pages).
U.S. Appl. No. 12/014,081, Final Rejection mailed Aug. 20, 2010 (23 pages).
U.S. Appl. No. 12/014,081, Non-Final Rejection mailed Mar. 23, 2010 (20 pages).
U.S. Appl. No. 12/014,081, Non-Final Rejection mailed Oct. 11, 2012 (5 pages).
U.S. Appl. No. 12/053,090, Amendment and Response mailed Nov. 14, 2011 (25 pages).
U.S. Appl. No. 12/135,944, Amendment and Response filed Dec. 1, 2009 (2 pages).
U.S. Appl. No. 12/135,944, Non-Final Rejection mailed Sep. 1, 2009 (4 pages).
U.S. Appl. No. 12/135,944, Notice of Allowance mailed Dec. 24, 2009 (6 pages).
U.S. Appl. No. 12/832,831, Amendment and Response filed Dec. 17, 2012 (15 pages).
U.S. Appl. No. 12/832,831, Non-Final Rejection mailed Apr. 22, 2013 (10 pages).
U.S. Appl. No. 12/832,831, Non-Final Rejection mailed Aug. 15, 2012 (13 pages).
U.S. Appl. No. 13/274,217, Notice of Allowance mailed Jan. 8, 2013 (10 pages).
U.S. Appl. No. 13/367,198, Non-Final Rejection mailed Feb. 25, 2013 (13 pages).
United States Advisory Action mailed Jan. 19, 2007, in U.S. Appl. No. 09/482,843 (4 pages).
United States Advisory Action mailed Feb. 15, 2005, in U.S. Appl. No. 09/482,840 (3 pages).
United States Advisory Action mailed Mar. 21 2006, in U.S. Appl. No. 11/117,590 (3 pages).
United States Advisory Action mailed Apr. 27, 2005, in U.S. Appl. No. 09/482,932 (2 pages).
United States Advisory Action mailed May 16, 2007, in U.S. Appl. No. 11/117,590 (3 pages).
United States Advisory Action mailed Aug. 1, 2008, in U.S. Appl. No. 10/831,280 (2 pages).
United States Advisory Action mailed Sep. 23, 2011, in U.S. Appl. No. 10/971,346 (4 pages).
United States Advisory Action mailed Nov. 25, 2003, in U.S. Appl. No. 09/482,932 (3 pages).
United States Amendment filed Jan. 10, 2005, in U.S. Appl. No. 09/482,725 (11 pages).
United States Amendment filed Jan. 11, 2008, in U.S. Appl. No. 11/353,321 (13 pages).
United States Amendment filed Jan. 11, 2011, in U.S. Appl. No. 10/831,280 (18 pages).
United States Amendment filed Jan. 16, 2008, in U.S. Appl. No. 10/831,280 (16 pages).
United States Amendment filed Jan. 18, 2011, in U.S. Appl. No. 11/116,884 (12 pages).
United States Amendment filed Jan. 20, 2004, in U.S. Appl. No. 09/482,928 (20 pages).
United States Amendment filed Jan. 21, 2005, in U.S. Appl. No. 09/482,840 (13 pages).
United States Amendment filed Jan. 21, 2009, in U.S. Appl. No. 11/018,095 (9 pages).
United States Amendment filed Jan. 22, 2008, in U.S. Appl. No. 10/831,281 (15 pages).
United States Amendment filed Jan. 22, 2009, in Application No. 11/116,884 (10 pages).
United States Amendment filed Feb. 1, 2007, in U.S. Appl. No. 10/830,632 (9 pages).
United States Amendment filed Feb. 6, 2009, in U.S. Appl. No. 11/117,590 (10 pages).
United States Amendment filed Feb. 16, 2006, in U.S. Appl. No. 11/117,590 (20 pages).
United States Amendment filed Feb. 17, 2011, in U.S. Appl. No. 10/971,346 (31 pages).
United States Amendment filed Feb. 22, 2005, in U.S. Appl. No. 09/482,843 (14 pages).
United States Amendment filed Feb. 23, 2004, in U.S. Appl. No. 09/290,363 (34 pages).
United States Amendment filed Feb. 23, 2009, in U.S. Appl. No. 11/388,403 (14 pages).
United States Amendment filed Feb. 25, 2010, in U.S. Appl. No. 11/116,884 (13 pages).
United States Amendment filed Mar. 2, 2009, in U.S. Appl. No. 10/831,281 (26 pages).

(56) References Cited

OTHER PUBLICATIONS

United States Amendment filed Mar. 11, 2008, in U.S. Appl. No. 10/976,463 (13 pages).
United States Amendment filed Mar. 14, 2005, in U.S. Appl. No. 10/208,139 (9 pages).
United States Amendment filed Mar. 22, 2006, in U.S. Appl. No. 09/290,363 (31 pages).
United States Amendment filed Mar. 24, 2009, in U.S. Appl. No. 11/353,321 (20 pages).
United States Amendment filed Mar. 26, 2012, in U.S. Appl. No. 10/971,346 (18 pages).
United States Amendment filed Mar. 28, 2011, in U.S. Appl. No. 11/018,095 (10 pages).
United States Amendment filed Apr. 9, 2008, in U.S. Appl. No. 11/048,194 (7 pages).
United States Amendment filed Apr. 11, 2005, in U.S. Appl. No. 09/482,932 (19 pages).
United States Amendment filed Apr. 15, 2011, in U.S. Appl. No. 11/116,884 (13 pages).
United States Amendment filed Apr. 21, 2003, in U.S. Appl. No. 09/482,840 (15 pages).
United States Amendment filed Apr. 22, 2003, in U.S. Appl. No. 09/290,363 (46 pages).
United States Amendment filed Apr. 27, 2005, in U.S. Appl. No. 09/482,840 (20 pages).
United States Amendment filed Apr. 27, 2007, in U.S. Appl. No. 11/117,590 (13 pages).
United States Amendment filed Apr. 28, 2008, in U.S. Appl. No. 11/353,321 (14 pages).
United States Amendment filed May 4, 2009, in U.S. Appl. No. 10/831,280 (16 pages).
United States Amendment filed May 5, 2009, in U.S. Appl. No. 11/018,095 (10 pages).
United States Amendment filed May 12, 2005, in U.S. Appl. No. 09/482,932 (19 pages).
United States Amendment filed May 12, 2010, in U.S. Appl. No. 10/971,346 (12 pages).
United States Amendment filed May 15, 2003, in U.S. Appl. No. 09/482,932 (4 pages).
United States Amendment filed May 17, 2010, in U.S. Appl. No. 11/018,095 (10 pages).
United States Amendment filed May 21, 2003, in U.S. Appl. No. 09/482,843 (13 pages).
United States Amendment filed May 27, 2004, in U.S. Appl. No. 09/482,725 (40 pages).
United States Amendment filed Jun. 13, 2007, in U.S. Appl. No. 10/976,463 (17 pages).
United States Amendment filed Jun. 13, 2008, in U.S. Appl. No. 10/968,462 (11 pages).
United States Amendment filed Jun. 15, 2007, in U.S. Appl. No. 11/117,590 (12 pages).
United States Amendment filed Jun. 25, 2008, in U.S. Appl. No. 11/018,095 (10 pages).
United States Amendment filed Jun. 29, 2010, in U.S. Appl. No. 10/831,280 (18 pages).
United States Amendment filed Jul. 8, 2005, in U.S. Appl. No. 09/482,725 (48 pages).
United States Amendment filed Jul. 9, 2008, in U.S. Appl. No. 11/388,365 (18 pages).
United States Amendment filed Jul. 13, 2009, in U.S. Appl. No. 11/116,884 (13 pages).
United States Amendment filed Jul. 16, 2008, in U.S. Appl. No. 10/831,280 (16 pages).
United States Amendment filed Jul. 17, 2006, in U.S. Appl. No. 09/482,843 (17 pages).
United States Amendment filed Jul. 26, 2004, in U.S. Appl. No. 09/482,840 (9 pages).
United States Amendment filed Jul. 28, 2005, in U.S. Appl. No. 09/482,840 (22 pages).
United States Amendment filed Aug. 6, 2008, in U.S. Appl. No. 10/831,281 (20 pages).
United States Amendment filed Aug. 11, 2004, in U.S. Appl. No. 09/482,843 (10 pages).
United States Amendment filed Aug. 11, 2010, in U.S. Appl. No. 11/116,884 (13 pages).
United States Amendment filed Aug. 20, 2009, in U.S. Appl. No. 11/117,590 (2 pages).
United States Amendment filed Aug. 31, 2005, in U.S. Appl. No. 09/482,932 (21 pages).
United States Amendment filed Sep. 6, 2011, in U.S. Appl. No. 10/971,346 (48 pages).
United States Amendment filed Sep. 9, 2008, in U.S. Appl. No. 10/976,463 (14 pages).
United States Amendment filed Sep. 9, 2011, in U.S. Appl. No. 11/018,095 (11 pages).
United States Amendment filed Sep. 15, 2009, in U.S. Appl. No. 10/971,346 (12 pages).
United States Amendment filed Sep. 20, 2010, in U.S. Appl. No. 10/971,346 (39 pages).
United States Amendment filed Sep. 22, 2003, in U.S. Appl. No. 09/482,928 (20 pages).
United States Amendment filed Sep. 24, 2004, in U.S. Appl. No. 09/482,932 (12 pages).
United States Amendment filed Sep. 25, 2006, in U.S. Appl. No. 11/117,590 (14 pages).
United States Amendment filed Sep. 26, 2005, in U.S. Appl. No. 11/117,590 (17 pages).
United States Amendment filed Sep. 26, 2011, in U.S. Appl. No. 10/971,346 (10 pages).
United States Amendment filed Oct. 3, 2001, in U.S. Appl. No. 09/290,363 (26 pages).
United States Amendment filed Oct. 8, 2010, in U.S. Appl. No. 11/018,095 (7 pages).
United States Amendment filed Oct. 9, 2009, in U.S. Appl. No. 11/353,321 (22 pages).
United States Amendment filed Oct. 14, 2008, in U.S. Appl. No. 10/831,280 (16 pages).
United States Amendment filed Oct. 24, 2007, in U.S. Appl. No. 10/976,463 (13 pages).
United States Amendment filed Oct. 30, 2003, in U.S. Appl. No. 09/482,932 (25 pages).
United States Amendment filed Nov. 6, 2003, in U.S. Appl. No. 09/482,843 (16 pages).
United States Amendment filed Nov. 18, 2005, in U.S. Appl. No. 09/290,363 (31 pages).
United States Amendment filed Nov. 20, 2007, in U.S. Appl. No. 09/482,843 (9 pages).
United States Amendment filed Nov. 23, 2009, in U.S. Appl. No. 10/831,280 (18 pages).
United States Amendment filed Dec. 3, 2008, in U.S. Appl. No. 10/971,346 (12 pages).
United States Amendment filed Dec. 5, 2011, in U.S. Appl. No. 11/018,095 (9 pages).
United States Amendment filed Dec. 6, 2011, in U.S. Appl. No. 11/116,884 (11 pages).
United States Amendment filed Dec. 7, 2007, in U.S. Appl. No. 11/117,590 (16 pages).
United States Amendment filed Dec. 26, 2006, in U.S. Appl. No. 09/482,843 (13 pages).
United States Amendment filed Apr. 26, 2010, in U.S. Appl. No. 11/353,321 (22 pages).
United States Final Office Action mailed Jan. 11, 2005, in U.S. Appl. No. 09/482,932 (21 pages).
United States Final Office Action mailed Jan. 26, 2009, in U.S. Appl. No. 11/353,321 (11 pages).
United States Final Office Action mailed Jan. 26, 2010, in U.S. Appl. No. 11/353,321 (13 pages).
United States Final Office Action mailed Feb. 3, 2009, in U.S. Appl. No. 11/388,365 (13 pages).
United States Final Office Action mailed Feb. 28, 2007, in U.S. Appl. No. 11/117,590 (12 pages).

(56) References Cited

OTHER PUBLICATIONS

United States Final Office Action mailed Mar. 15, 2010, in U.S. Appl. No. 11/018,095 (8 pages).
United States Final Office Action mailed Mar. 18, 2009, in U.S. Appl. No. 10/971,346 (14 pages).
United States Final Office Action mailed Apr. 16, 2008, in U.S. Appl. No. 10/831,280 (21 pages).
United States Final Office Action mailed Apr. 22, 2011, in U.S. Appl. No. 10/971,346 (22 pages).
United States Final Office Action mailed May 24, 2005, in U.S. Appl. No. 10/208,139 (7 pages).
United States Final Office Action mailed Jun. 9, 2011, in U.S. Appl. No. 11/018,095 (10 pages).
United States Final Office Action mailed Jun. 10, 2009, in U.S. Appl. No. 11/388,403 (9 pages).
United States Final Office Action mailed Jun. 30, 2008, in U.S. Appl. No. 10/976,463 (20 pages).
United States Final Office Action mailed Jul. 8, 2008, in U.S. Appl. No. 11/048,194 (7 pages).
United States Final Office Action mailed Jul. 8, 2011, in U.S. Appl. No. 11/116,884 (15 pages).
United States Final Office Action mailed Jul. 22, 2010, in U.S. Appl. No. 10/971,346 (16 pages).
United States Final Office Action mailed Jul. 30, 2003, in U.S. Appl. No. 09/482,932 (22 pages).
United States Final Office Action mailed Aug. 7, 2008, in U.S. Appl. No. 11/117,590 (10 pages).
United States Final Office Action mailed Aug. 12, 2003, in U.S. Appl. No. 09/482,843 (26 pages).
United States Final Office Action mailed Aug. 20, 2009, in U.S. Appl. No. 10/831,280 (26 pages).
United States Final Office Action mailed Aug. 24, 2007, in U.S. Appl. No. 10/976,463 (26 pages).
United States Final Office Action mailed Sep. 15, 2010, in U.S. Appl. No. 10/831,280 (19 pages).
United States Final Office Action mailed Oct. 21, 2008, in U.S. Appl. No. 11/018,095 (12 pages).
United States Final Office Action mailed Oct. 24, 2006, in U.S. Appl. No. 09/482,843 (15 pages).
United States Final Office Action mailed Oct. 28, 2004, in U.S. Appl. No. 09/482,840 (19 pages).
United States Final Office Action mailed Oct. 28, 2010, in U.S. Appl. No. 11/116,884 (14 pages).
United States Final Office Action mailed Nov. 7, 2005, in U.S. Appl. No. 09/290,363 (6 pages).
United States Final Office Action mailed Nov. 16, 2004, in U.S. Appl. No. 09/482,843 (4 pages).
United States Final Office Action mailed Nov. 25, 2011, in U.S. Appl. No. 10/971,346 (19 pages).
United States Final Office Action mailed Nov. 27, 2009, in U.S. Appl. No. 11/116,884 (17 pages).
United States Final Office Action mailed Dec. 2, 2008, in U.S. Appl. No. 10/831,281 (11 pages).
United States Final Office Action mailed Dec. 20, 2005, in U.S. Appl. No. 11/117,590 (13 pages).
United States Non-Final Office Action mailed Jun. 13, 2008, in U.S. Appl. No. 10/971,346 (9 pages).
United States Non-Final Office Action mailed Jan. 9, 2008, in U.S. Appl. No. 11/048,194 (7 pages).
United States Non-Final Office Action mailed Jan. 16, 2003, in U.S. Appl. No. 09/482,840 (17 pages).
United States Non-Final Office Action mailed Feb. 3, 2009, in U.S. Appl. No. 10/831,280 (25 pages).
United States Non-Final Office Action mailed Feb. 4, 2011, in U.S. Appl. No. 11/116,884 (13 pages).
United States Non-Final Office Action mailed Feb. 5, 2009, in U.S. Appl. No. 11/018,095 (13 pages).
United States Non-Final Office Action mailed Feb. 13, 2003, in U.S. Appl. No. 09/482,932 (22 pages).
United States Non-Final Office Action mailed Feb. 14, 2008, in U.S. Appl. No. 11/388,365 (14 pages).
United States Non-Final Office Action mailed Feb. 19, 2003, in U.S. Appl. No. 09/482,843 (16 pages).
United States Non-Final Office Action mailed Mar. 13, 2007, in U.S. Appl. No. 10/976,463 (11 pages).
United States Non-Final Office Action mailed Mar. 18, 2008, in U.S. Appl. No. 10/968,462 (10 pages).
United States Non-Final Office Action mailed Mar. 25, 2008, in U.S. Appl. No. 11/018,095 (14 pages).
United States Non-Final Office Action mailed Mar. 29, 2010, in U.S. Appl. No. 10/831,280 (16 pages).
United States Non-Final Office Action mailed Apr. 14, 2005, in U.S. Appl. No. 09/482,725 (9 pages).
United States Non-Final Office Action mailed Apr. 14, 2009, in U.S. Appl. No. 11/116,884 (12 pages).
United States Non-Final Office Action mailed Apr. 19, 2006, in U.S. Appl. No. 09/482,843 (23 pages).
United States Non-Final Office Action mailed May 6, 2008, in U.S. Appl. No. 10/831,281 (11 pages).
United States Non-Final Office Action mailed May 11, 2004, in U.S. Appl. No. 09/482,843 (19 pages).
United States Non-Final Office Action mailed May 12, 2010, in U.S. Appl. No. 11/116,884 (13 pages).
United States Non-Final Office Action mailed May 16, 2012, in U.S. Appl. No. 11/353,321 (15 pages).
United States Non-Final Office Action mailed May 18, 2004, in U.S. Appl. No. 09/482,840 (18 pages).
United States Non-Final Office Action mailed May 27, 2003, in U.S. Appl. No. 09/482,928 (11 pages).
United States Non-Final Office Action mailed May 29, 2012, in U.S. Appl. No. 13/274,217 (11 pages).
United States Non-Final Office Action mailed May 31, 2005, in U.S. Appl. No. 09/482,932 (20 pages).
United States Non-Final Office Action mailed Jun. 20, 2007, in U.S. Appl. No. 09/482,843 (6 pages).
United States Non-Final Office Action mailed Jun. 21, 2004, in U.S. Appl. No. 09/482,932 (23 pages).
United States Non-Final Office Action mailed Jun. 30, 2006, in U.S. Appl. No. 11/117,590 (13 pages).
United States Non-Final Office Action mailed Jul. 5, 2005, in U.S. Appl. No. 11/117,590 (12 pages).
United States Non-Final Office Action mailed Jul. 8, 2010, in U.S. Appl. No. 11/018,095 (9 pages).
United States Non-Final Office Action mailed Jul. 9, 2009, in U.S. Appl. No. 11/353,321 (12 pages).
United States Non-Final Office Action mailed Aug. 19, 2009, in U.S. Appl. No. 11/018,095 (10 pages).
United States Non-Final Office Action mailed Sep. 7, 2007, in U.S. Appl. No. 11/117,590 (13 pages).
United States Non-Final Office Action mailed Sep. 27, 2011, in U.S. Appl. No. 11/018,095 (5 pages).
United States Non-Final Office Action mailed Oct. 5, 2007, in U.S. Appl. No. 11/353,321 (9 pages).
United States Non-Final Office Action mailed Oct. 13, 2004, in U.S. Appl. No. 09/482,725 (9 pages).
United States Non-Final Office Action mailed Oct. 16, 2007, in U.S. Appl. No. 10/831,280 (19 pages).
United States Non-Final Office Action mailed Oct. 18, 2007, in U.S. Appl. No. 10/831,281 (12 pages).
United States Non-Final Office Action mailed Oct. 21, 2008, in U.S. Appl. No. 11/388,403 (8 pages).
United States Non-Final Office Action mailed Oct. 22, 2008, in U.S. Appl. No. 11/116,884 (10 pages).
United States Non-Final Office Action mailed Nov. 1, 2006, in U.S. Appl. No. 10/830,632 (21 pages).
United States Non-Final Office Action mailed Nov. 12, 2009, in U.S. Appl. No. 10/971,346 (14 pages).
United States Non-Final Office Action mailed Nov. 26, 2010, in U.S. Appl. No. 10/971,346 (14 pages).
United States Non-Final Office Action mailed Dec. 11, 2007, in U.S. Appl. No. 10/976,463 (22 pages).

(56) References Cited

OTHER PUBLICATIONS

United States Non-Final Office Action mailed Dec. 14, 2004, in U.S. Appl. No. 10/208,139 (6 pages).
United States Non-Final Office Action mailed Dec. 27, 2010, in U.S. Appl. No. 11/018,095 (8 pages).
United States Non-Final Rejection mailed Jan. 17, 2003, in U.S. Appl. No. 09/290,363 (23 pages).
United States Non-Final Rejection mailed Apr. 24, 2001, in U.S. Appl. No. 09/290,363 (28 pages).
United States Notice of Allowance mailed Feb. 14, 2002, in U.S. Appl. No. 09/290,363 (8 pages).
United States Notice of Allowance mailed Feb. 17, 2010, in U.S. Appl. No. 11/117,590 (2 pages).
United States Notice of Allowance mailed Mar. 7, 2012, in U.S. Appl. No. 11/116,884 (8 pages).
United States Notice of Allowance mailed Mar. 22, 2006, in U.S. Appl. No. 09/290,363 (8 pages).
United States Notice of Allowance mailed Mar. 23, 2009, in U.S. Appl. No. 10/831,281 (8 pages).
United States Notice of Allowance mailed Mar. 31, 2005, in U.S. Appl. No. 09/482,928 (9 pages).
United States Notice of Allowance mailed Apr. 2, 2008, in U.S. Appl. No. 09/482,843 (6 pages).
United States Notice of Allowance mailed Apr. 6, 2006, in U.S. Appl. No. 09/482,725 (7 pages).
United States Notice of Allowance mailed May 3, 2007, in U.S. Appl. No. 10/830,632 (13 pages).
United States Notice of Allowance mailed Jun. 11, 2009, in U.S. Appl. No. 11/117,590 (15 pages).
United States Notice of Allowance mailed Jun. 27, 2011, in U.S. Appl. No. 10/831,280 (7 pages).
United States Notice of Allowance mailed Jun. 27, 2012, in U.S. Appl. No. 11/018,095 (7 pages).
United States Notice of Allowance mailed Jul. 24, 2008, in U.S. Appl. No. 10/968,462 (10 pages).
United States Notice of Allowance mailed Sep. 26, 2008, in U.S. Appl. No. 10/976,463 (8 pages).
United States Notice of Allowance mailed Dec. 2, 2005, in U.S. Appl. No. 09/482,725 (6 pages).
United States Notice of Allowance mailed Dec. 6, 2005, in U.S. Appl. No. 09/482,932 (8 pages).
United States Notice of Allowance mailed Dec. 9, 2005, in U.S. Appl. No. 09/482,840 (11 pages).
United States Notice of Allowance mailed Dec. 14, 2011, in U.S. Appl. No. 11/116,884 (7 pages).
United States Notice of Allowance mailed Dec. 30, 2011, in U.S. Appl. No. 11/018,095 (10 pages).
United States Supplemental Amendment filed Jan. 21, 2005, in U.S. Appl. No. 09/482,725 (5 pages).
United States Supplemental Amendment filed Jan. 31, 2008, in U.S. Appl. No. 11/117,590 (18 pages).
United States Supplemental Amendment filed Jun. 16, 2003, in U.S. Appl. No. 09/482,725 (3 pages).
United States Supplemental Amendment filed Sep. 12, 2005, in U.S. Appl. No. 09/482,843 (5 pages).
United States Supplemental Amendment filed Nov. 16, 2006, in U.S. Appl. No. 11/117,590 (14 pages).
United States Supplemental Amendment filed Dec. 10, 2003, in U.S. Appl. No. 09/482,725 (51 pages).
U.S. Appl. No. 09/525,509, filed Mar. 2000, Peinado.
U.S. Appl. No. 60/260,543, filed Jan. 2001, Thomas et al.
*A Unveil security system*, Multichannel News, 1995, 18(3) p. 45 (from DialogClassic Web™, file 9, acc. No. 00864754).
*Achieving Peak Performance: Insights from a Global Survey on Credit Risk and Collections Practices*, GCI Group Pamphlet, (2002, 2004), 12 pages.
Anderson, R et al., "Tamper Resistance—A Cautionary Note," Proc. of the 2nd USENIX Workshop on Electronic Commerce, Oakland, California, Nov. 1996, 1-11.

Arbaugh, "A Secure and Reliable Bootstrap Architecture", IEEE Symposium on Security and Privacy, May 1997, pp. 65-71.
AU Examiners First Report, Application No. 2006220489, Jan. 25, 2010 (2 pages).
AU Examiners First Report, Application No. 2006220489, Sep. 15, 2009 (2 pages).
Bajikar, S., "Trusted Platform Module (TPM) based Security on Notebook PCs—White Paper", Mobile Platforms Group Intel Corporation; XP002259678; http://www.intel.com/design/mobile/platform/downloads/Trusted Platform Module White Paper.pdf, (Jun. 20, 2002).
*Bankard set to into virtual shopping in Philippines*, Newsbytes News Network, 1997 (from DialogClassic Web™, file 9, acc. No. 01235815.
Bird, R., et al., "The KryptoKnight family of light-weight protocols for authentification and key distribution, "IEEE, 1995, 31-41.
*Black box crypton defies the hackers*, Electronics Weekly, 1985, n1257 p. 26 (from DialogClassic Weekly, 1985, n1257 (from DialogClassic Web™, File 275, Acc. No. 011163377).
Blissmer, "Next Step is Encryption: Data Security May be Bundled with Next's Operating System", Electronic Engineering Times, Feb. 3, 1992.
Boyl, J.P., et al. "The ESPRIT Project CAFÉ' High Security digital payment systems, "ESORICs, LNCS 875, 1994, 217-230.
*Breaker Tech Joins Copyright Management Market*, Computergram International, Aug. 5, 1999, 2 pages.
Canadian Application 2457291, Office Action mailed Aug. 27, 2013, 2 pages.
Canadian Application 2457938, Notice of Allowance mailed Jul. 23, 2013, 2 pages.
Cante, T.M. , et al., "Challenges to combining general-purpose and multimedia processors, " IEEE, Dec. 1997,33-37.
Chabaud, D., "Programmation des cartes VGA, " Micro-Systems, 1990, 173-178 (no English abstract available).
Chinese Application 200910139429.8, Decision on Rejection mailed Jul. 31, 2013, 6 pages.
Choudhury et al. "Copyright Protection for Electronic Publishing over Computer Networks", IEEE Network Magazine, Jun. 1994, 1-18.
Clark, P. et al., "Bits: A Smartcard Protected Operating System, "Comm of the ACM, Nov. 1994, 37(11)m 66-70 and 94.
Clarke, Roger et al. "Technological Protections for Digital Copyright objects," [Online] Jul. 2000, Retrieved from the Internet: http://www.anu.edu.au/people/Roger.Clarke/II/TPDCO.html [retrieved on Jul. 28, 2005].
Comino, N. et al., "A Novel Data Distribution Technique for Host-Client Type Parallel Applications", IEEE Transactions on Parallel and Distributed Systems, 2002, 13(2), 97-110.
*Content Protection System Architecture A Comprehensive Framework for Content Protection*, Content Protection Architecture: XP02259679; http://4centity.com/data/tech/cpsa/cpsa081.pdf, (Feb. 17, 2000).
*CYLINK: Public-Key Security Technology Granted to the Public*; Cylink Announces the Reowned Diffie-Hellman Public-Key Technology Has Entered the Public Domain:, Business Wire, Sep. 16, 1997.
*CyoLicence*, Version 1.3.0, Released Mar. 5, 2005, cyotec.com, Printed Sep. 7, 2005.
Davida, George I., et al., "UNIX Guardians: Active User Intervention in Data Protection", Aerospace Computer Security Applications Conference, Fourth Dec. 12-16, 1988, 6 pages.
*DMOD WorkSpace OEM Unique Features*, www.dmod.com/oem/features, Retrieved from the Internet on Jan. 12, 2005, 3 pages.
EP Communication for Application No. 05823253.9-2212/1815322 PCT/US2005040942, Reference FBI18697, Aug. 13, 2010.
EP Communication for application No. 05851550.3-1243/ 1825391 PCT/US2005040967, Reference FBI18698, Jul. 5, 2012.
EP Communication for Application No. 05854752.2-1245/ 1829274 PCT/US2005046091, Reference FBI18701,Dec. 21, 2011.
*Equifax Business Solutions—Manage Your Customers*, Retrieved from the Internet from http://www.equifax.com/sitePages/biz/small Biz/?sitePage=manageCustomers on Oct. 14, 2005, 3 pages.

(56) References Cited

OTHER PUBLICATIONS

Eren, H. et al., Fringe-Effect Capacitive Proximity Sensors for Tamper Proof Enclosures, Proceedings of 2005 Sensors for Industry Conference (Feb. 2005), pp. 22-25.
European Application 12002880.8, Communication mailed Feb. 18, 2013 (4 pages).
European Application 12002880.8, Search Report mailed Jul. 10, 2012 (5 pages).
Europe Application 03013556.0, Summons to Attend Oral Proceedings mailed Sep. 3, 2013, 8 pages.
European Application 02011478.1, Communication mailed Jan. 18, 2011 (4 pages).
European Application 02011478.1, Search Report mailed Apr. 16, 2010 (7 pages).
European Application 02014340.0, Communication mailed Jul. 9, 2009 (4 pages).
European Application 02014340.0, Communication mailed Dec. 19, 2006 (6 pages).
European Application 02014340.0, Communication mailed Dec. 21, 2007 (5 pages).
European Application 02014340.0, Means of Redress mailed Nov. 9, 2011 (15 pages).
European Application 02014340.0, Results of Consultation mailed Nov. 7, 2011 (8 pages).
European Application 02014340.0, Summons to Attend Oral Proceedings mailed Jun. 21, 2011 (9 pages).
European Application 12002881.6, Communication mailed Feb. 18, 2013 (4 pages).
European Application 12002881.6, Search Report mailed Jul. 10, 2012 (5 pages).
European Extended Search Report mailed Oct. 8, 2013, in Application No. 06774628 (7 pgs).
Examiner's First Report on Application mailed Jun. 4, 2010, AU Application No. 2005222507, 2 pages.
*Finland—Data fellows secures ICSA Certification*, Newbytes, 1988 (from DialogClass Web™) File 9, Acc. No. 01451058, 2 pages.
Finnie et al., "*Suppliers cashing in on the internet*", Communications Week International, 1994, N134, p. 36 (from DialogClassic Web, file 9, acc. No. 00564878), Nov. 14, 1994, 2 pages.
*First Special Feature, Security Oriented Web Application Development, Part 3, Method for Realizing Secure Session Management*, N+1 Network Guide (vol. 4, No. 1, Serial No. 32) Softbank Publishing Inc., (Jan. 2004), pp. 47-59.
*Flonix: USB Desktop OS Solutions Provider*, http://www.flonix.com, Retrieved from the Internet Jun. 1, 2005, (Copyright 2004), 2 pages.
*Forward Solutions Unveils Industry's Most Advanced Portable Personal Computing system on USB Flash Memory Device:*, Proquest, PR Newswire, http://proquest.umi.com/pqdweb?index=20&did=408811931&SrchMode=1&sid=6&Fmt=3. Retrieved from the Internet Feb. 15, 2008, (Sep. 22, 2003), 3 pages.
Gao, Jerry et al., "Online Advertising—Taxonomy and Engineering Perspectives", http://www.engr.sjsu.edu/gaojerry/report/OnlineAdvertising%20.pdf, (2002), 33 pages.
Gilmont, T. et al., "An Architecture of Security Management Unit for Safe Hosting of Multiple Agents," IS&T/SPIE Conf. on Security and Watermarking of Multimedia Contents, San Jose, California, Jan. 1999, SPIE vol. 3657, 472-483.
Goering, Richard "Web Venture Offers Metered Access to EDA Packages—Startup Winds Clocks by the Hour Tools (E*CAD Will Launch Web Site That Provides Pay-Per-Use and Pay-Per-Hour Access to Range of Chip Design Software)", Electronic Engineering Times (Nov. 6, 2000), 3 pages.
Hartung F. et al. "Digital Rights Management and Watermarking of Multimedia Content for M-Commerce Applications," IEEE Communications Magazine, IEEE Service Center. Piscatawy, N.J., vol. 38, No. 11, Nov. 2000, pp. 78-84.
Housley, R. et al., "Metering: a Pre-Pay Technique", Proceedings of the SPIE—The International Society for Optical Engineering, 1997, 3022, 527-531.

India Application 228/DEL/2004, First Examination Report mailed May 29, 2013, 2 pages.
India Application 892/DEL/2005, First Examination Report mailed Sep. 13, 2013, 2 pages.
*Internet Dynamics: Internet Dynamics First to Ship Integrated Security Solution for Enterprise Intranets and Extranets; Conclave Accelerates Enterprise Deployment of Secure, High-Value Intranets and Extranets*, Business Wire, Sep. 15, 1997.
*Is Your Computer Secure?*, Which Computer?—The Business Computer Magazine, Nov. 1983, 3 pages.
Ishii, S., et al., "2,048-bit public-key encryption processor," NTT Human Interface Labs., 998, 259-267 (Abstract on p. 261).
JP Final Rejection for Application No. 2000-608539, Dec. 24, 2009.
JP Notice of Rejection for Application No. 2005-301957, Jun. 8, 2012.
Kim, S. et al., "A Secure and Efficient Metering Scheme for Internet Advertising", Journal of Kiss: Computer Systems and Theory, 2002, 29(3-4) 153-160.
KR Preliminary Rejection for Application No. 10-2007-7012294, Reference 310476.07, Jul. 4, 2012.
Kwok, Sai H., "Digital Rights Management for the Online Music Business", ACM SIGecom Exchanges, vol. 3, No. 3, (Aug. 2002), pp. 17-24.
Lampson, Butler et al., "Authentication in Distributed Systems: Theory and Practice", ACM Transactions on Computer Systems, v10, 265 (1992), 18 pages.
Linn, "Privacy Enhancement for Internet Email—Part I: Message Encryption and Authentication Procedures", RFC 1421, pp. 1-37, (Feb. 1993).
Looi, "A Note on Supplying a Trusted Clock via a Secure Device", Computers & Security, Sep. 7, 1994.
Lotspiech, "Broadcast Encryption's Bright Future", IEEE Computer, Aug. 2002.
*Magic Desktop Automation Suite for the Small and Mid-Sized Business*, printed from www.remedy.com/soultions/magic_it_suite.htm on Sep. 7, 2005 (Copyright 2005), 4 pages.
Malamud, "Network-Based Authentification: The Key to Security," Network Computing, Jun. 1991, 98-100.
Memon, "Protecting Digital Media Content", Communications of the ACT Jul. 1998.
*Migo by Power House Technologies Group*, http://www.4migo.com, Retrieved from the Internet Jun. 1, 2005, (Copyright 2003), 3 pages.
Monitor Spearheads Call Logging Entry, Electronics Weekly, Mar. 6, 1985, 1 page.
Morales, Tatiana "Understanding Your Credit Score", http://www.cbsnews.com/stories/2003/04/29/earlyshow/contributors/raymartin/main55152.shtml retrieved from the Internet on Apr. 23, 2009, (Apr. 30, 2003), 3 pages.
Mufti, Dr. Muid et al., "Design and Implementation of a Secure Mobile IP Protocol", Networking and Communication, INCC 204, International Conference on Jun. 11-13, 2004, (2004), 5 pages.
MX Office Action for Application No. MX/a2007005660, Jul. 7, 2009.
Nakajima, "Do You really Know It? Basics of Windowsa2000XP, Network, 4th Installment, What id Logon Like? "Nikkei Windows for IT Professional, Nikkei Business Publication, Inc. Jan. 1, 2004.
*Next step is Encryption: data security many be bundled with next's operating system*, Electronic Times, 1992, p. 18 (from DialogClassic Web™, file 16, acc. No. 02103190).
Notice of Acceptance mailed Oct. 14, 2010, AU Application No. 2005222507, 3 pages.
Ogata, "Provably Secure Metering Scheme", ASIACRYPT 2000, Dec. 3, 2000.
Olson, M. et al., Concurrent access licensing, pp. 67-72, UNIX Review, vol. 6 No. 9 Sep. 1988 (from DIALOG acc. No. 01254918.
*Optimizing license checkouts from a floating license server*, Arm the Architecture for the Digital World, from http://www.arm.com/support/faqdev/1391.html.
PCT International Search Report and Written Opinion for Application No. PCT/US05/40965, reference 311052 02, Apr. 25, 2007.
*Postal service announce plan to put postmarks on electronic mail*, San Jose Mercury Mews. 1995, (from DialogClassic Web, file 9, acc. No. 00618375.

(56) References Cited

OTHER PUBLICATIONS

Schneck, P.B., "Persistent Access Control to Prevent Piracy of Digital Information,", Proc. of the IEEE, Jul. 1999, 87(7), 1239-1250.
Schubert, "Radios Controlled Standard Clock Uses Digital Correlation", Elektronik, 1997. (English language abstract provided).
Shen, "A New Digital Watermarking Technique for Video", ACM, Visual '02, Nov. 13, 2002.
Shi, Changgui et al., "A Fast MPEG Video Encryption Algorithm", 1998, Bristol, UK; pp. 81-88.
Slusallek, "Vision—An Architecture for Global Inllumination Calculation", IEEE Transactions on Visualization and Computer Graphics, vol. 1, No. 1, Mar. 1995, pp. 77-96.
*Sony Develops Copyright Protection Solutions for Digital Music Content*, PR Newswire, Feb. 25, 1999, 4 pages.
Steinebach, "Digital Watermaking Basics—Applications—Limits", NFD Information—Wissenschaft and Praxis, Jul. 2002.
Takura, "A Secure and Trusted Time Stamping Authority", IWS 1999, IEEE, Feb. 18, 1999.
*TCG Specification Architecture Overview*, Revision 1.2, (Apr. 28, 2004), 55 pages.
*Technological Solutions Rise to Complement Law's Small Stick Guarding Electronic Works*, Information Law Alert, Jun. 16, 1995-, 3-4 and 7.
*The New Network: Planning and Protecting Intranet Electronic Commerce*, Informationweek, Dec. 2, 1996, 2 pages.
Thompson, C. et al., Digital Licensing, IEEE Internet Computing, Jul./Aug. 2005 (vol. 9 No. 4).
Tyler, L. Chin "Reaching out physicians, " Health Data Management, 1998, 6(9), pp. 36,38,40 (from DialogClassic Web™, file 13, acc. No. 00588764).
U.S. Appl. No. 09/449,106, Amendment and Response filed Jan. 29, 2003, pages.
U.S. Appl. No. 09/449,106, Amendment and Response filed Jul. 23, 2002, pages.
U.S. Appl. No. 09/449,106, Non-Final Office Action mailed Mar. 26, 2002, pages.
U.S. Appl. No. 09/449,106, Non-Final Office Action mailed Apr. 8, 2003, pages.
U.S. Appl. No. 09/449,106, Non-Final Office Action mailed Oct. 22, 2002, pages.
U.S. Appl. No. 09/449,106, Notice of Allowance mailed Jan. 3, 2004, pages.
U.S. Appl. No. 09/526,290, Amendment and Response filed Jan. 29, 2003, 12 pages.
U.S. Appl. No. 09/526,290, Non-Final Office Action mailed Oct. 22, 2002, 10 pages.
U.S. Appl. No. 09/526,290, Notice of Allowance mailed Jan. 30, 2004, 11 pages.
U.S. Appl. No. 09/526,291, Amendment and Response filed Apr. 15, 2004, 24 pages.
U.S. Appl. No. 09/526,291, Non-Final Office Action mailed Nov. 25, 2003, 17 pages.
U.S. Appl. No. 09/526,291, Notice of Allowance mailed Jul. 13, 2004, 4 pages.
U.S. Appl. No. 09/526,292, Amendment and Response filed Jan. 26, 2004, pages.
U.S. Appl. No. 09/526,292, Non-Final Office Action mailed Nov. 17, 2003, pages.
U.S. Appl. No. 09/526,292, Notice of Allowance mailed Jun. 9, 2004, pages.
U.S. Appl. No. 09/645,887, Final Office Action mailed Aug. 10, 2005, 11 pages.
U.S. Appl. No. 09/645,887, Non- Final Office Action filed Feb. 9, 2005, 10 pages.
U.S. Appl. No. 09/645,887, Non-Final Office Action mailed Mar. 25, 2004, 11 pages.
U.S. Appl. No. 09/645,887, Notice of Allowance mailed Nov. 30, 2005, 7 pages.
U.S. Appl. No. 10/971,346, Final Rejection mailed Jul. 16, 2013, 17 pages.
U.S. Appl. No. 11/107,014, Non-Final Rejection mailed Sep. 5, 2013, 12 pages.
U.S. Appl. No. 11/353,321, Amendment and Response filed Aug. 20, 2013, 21 pages.
U.S. Appl. No. 11/353,321, Non-Final Rejection mailed May. 21, 2013, 15 pages.
U.S. Appl. No. 11/866,041, Non-Final Rejection mailed Jun. 14, 2013, 9 pages.
U.S. Appl. No. 12/053,090, Notice of Allowance mailed Sep. 23, 2013, 14 pages.
U.S. Appl. No. 12/832,831, Amendment and Response filed Jul. 22, 2013, 12 pages.
U.S. Appl. No. 12/832,831, Notice of Allowance mailed Oct. 3, 2013, 14 pages.
U.S. Appl. No. 13/367,198, Amendment and Response filed Jul. 9, 2013, 12 pages.
*Using Windows Media Rights Manager to Protect and Distribute Digital Rights Media*, Windows Media Technologies (Online): XP002307161; http://msdn.microsoft/msdnmag/issues/01/12/DRM/print.asp, (Dec. 1, 2001).
Utagawa, Mari et al., "Creation of Card Application by IC Card OS 'MULTOS' Which Can Rewrite Application", Interface, vol. 29, No. 3. ISSN: 0387-9569, CQ Publishing Co. Ltd., (Mar. 1, 2003), pp. 46-55.
Vernon, P., "Improved identification schemes based on error-correcting codes, " AAECC, 1997, 57-69.
*WDM Audio Design Considerations*, Copyright 2004, intelligraphics.com, Intelligraphics Device Drivers, Printed Apr. 15, 2005.
*WebServUSB Quick Start, ItWorks*,, http://www.webservusb.com, Retrieved from the Internet Jun. 1, 2005 (Copyright 2004), 16 pages.
Yue, Wei T., et al., "The Reward Based Online Shopping Community", Routledge, vol. 10, No. 4, (Oct. 1, 2000), 2 pages.
Zemao, Chen et al., "*A Malicious Code Immune Model Based on Program Encryption*", IEEE—Wireless Communication, Networking and Mobile Computing, WICOM '08, 4th International Conference on Oct. 12-14, 2008 (2008), 5 pages.
Zhao, Hua "A New Watermarking Scheme for CAD Engineering Drawings", 9th Intl. Conf. Computer-Aided Industrial Design and Conceptual Design: CAID/CD 2008; Nov. 22-25, 2008.
"License Management is Fundamental, DRM Acts as an Impregnable Defense, the Last Stronghold is a Dedicated-Viewer," Nikkei Internet Technology, Nikkei Business Publications, Inc., Dec. 2001 issue, pp. 34 to 39, Japan, Nov. 22, 2001 (9 pgs).
Australian Notice of Acceptance mailed Nov. 12, 2009, in Australian Application No. 2004200471 (3 pgs).
Australian Office Action mailed Aug. 27, 2009, in Australian Application No. 2004200471 (2 pgs).
Chinese Notice on First Office Action mailed Feb. 6, 2009, in Chinese Patent Application No. 200410005380.4 (9 pgs).
Chinese Notice on Grant of Patent Right for Invention mailed Jul. 24, 2009, in Chinese Patent Application No. 200410005380.4 (4 pgs).
Chinese Response to First Office Action mailed Feb. 6, 2009, in Chinese Patent Application No. 200410005380.4, filed Jun. 5, 2009 (12 pgs).
European Communication mailed Feb. 17, 2005, in European Patent Application No. 03013569.3 (4 pgs).
European Communication mailed Feb. 15, 2006, in European Patent Application No. 03013569.3 (7 pgs).
European Communication mailed Jan. 17, 2011, in European Application No. 03013556 (4 pgs).
European Communication mailed Jun. 6, 2007, in European Application No. 03013556 (4 pgs).
European Communication mailed Mar. 18, 2005, in European Application No. 04001954.9 (3 pgs).
European Decision to Refuse a European Patent Application mailed Apr. 4, 2006, in European Application No. 04001954.9 (31 pgs).
European Decision to Refuse European Patent Application mailed Apr. 25, 2007, in European Patent Application No. 03013569.3 (21 pgs).
European Letter in Response to the Summons dated Nov. 22, 2006 to Attend Oral Proceedings, mailed Feb. 22, 2007, in European Patent Application No. 03013569.3 (22 pgs).

(56) References Cited

OTHER PUBLICATIONS

European Partial Search Report filed Feb. 20, 2006, in European Application No. 03013556 (5 pgs).
European Reply to Communication filed May 24, 2011, in European Application No. 03013556 (16 pgs).
European Reply to Communication filed Oct. 16, 2007, in European Application No. 03013556 (25 pgs).
European Response to Communication dated Mar. 18, 2005, in European Application No. 04001954.9, filed May 24, 2005 (17 pgs).
European Response to Official Communication dated Feb. 15, 2006, filed Aug. 25, 2006 in European Patent Application No. 03013569.3 (18 pgs).
European Response to Official Communication dated Feb. 17, 2005, filed Jun. 27, 2005 in European Patent Application No. 03013569.3 (27 pgs).
European Response to Summons dated Sep. 23, 2010, in European Application No. 04001954.9. filed Dec. 14, 2010 (14 pgs).
European Response to Summons to Attend Oral Proceedings mailed Oct. 4, 2005, in European Application No. 04001954.9, filed Nov. 17, 2005 (5 pgs).
European Search Report dated Jul. 27, 2004 in European Application No. 04001954.9 (2 pgs).
European Search Report filed Aug. 2, 2004, in European Application No. 03013569.3 (4 pgs).
European Search Report filed Oct. 25, 2006, in European Application No. 03013556 (7 pgs).
European Summons to Attend Oral Proceedings mailed Oct. 4, 2005, in European Application No. 04001954.9 (30 pgs).
Japanese Amendment filed Mar. 5, 2009, in Japanese Patent Application No. 2003-183597 (9 pgs).
Japanese Final Rejection mailed on Sep. 21, 2010, in Japanese Patent Application No. 2004-035810 (4 pgs).
Japanese Notice of Allowance mailed May 13, 2011, in Japanese Patent Application No. 2003-183597 (6 pgs).
Japanese Notice of Allowance mailed Oct. 30, 2009, in Japanese Patent Application No. 2003-183597 (6 pgs).
Japanese Notice of Rejection mailed Dec. 1, 2009, in Japanese Patent Application No. 2003-183596 (7 pgs).
Japanese Notice of Rejection mailed Dec. 10, 2010, in Japanese Patent Application No. 2003-183596 (8 pgs).
Japanese Notice of Rejection mailed on Jun. 1, 2010, in Japanese Patent Application No. 2004-035810 (5 pgs).
Japanese Official Notice of Rejection mailed on Dec. 5, 2008, in Japanese Patent Application No. 2003-183597 (143 pgs).
Japanese Response filed Apr. 22, 2011, in Japanese Patent Application No. 2003-183596 (30 pgs).
Japanese Response filed Mar. 1, 2010, in Japanese Patent Application No. 2003-183596 (18 pgs).
Korean Amendment filed Jan. 31, 2011, in Korean Patent Application No. 10-2004-0009030 (20 pgs.).
Oda, Hiroharu; "The Basics and Application of Security IC Cards—Passport to an e-business-", 1st Ed., pp. 143-144, etc., C.media Co., Ltd., Apr. 27, 2000. [Partial English Translation].
Russian Official Action mailed Dec. 12, 2007, in Russian Patent Application No. 2004103872 (5 pgs).
United States Advisory Action mailed Dec. 3, 2008, in U.S. Appl. No. 10/185,511 (3 pgs).
United States Advisory Action mailed Dec. 5, 2006, in U.S. Appl. No. 10/185,527 (3 pgs).
United States Advisory Action mailed Nov. 10, 2008, in U.S. Appl. No. 10/364,115 (3 pgs).
United States Advisory Action mailed Nov. 28, 2006, in U.S. Appl. No. 10/185,511 (3 pgs).
United States Advisory Action mailed Nov. 9, 2007, in U.S. Appl. No. 10/364,115 (3 pgs).
United States Final Office Action mailed Aug. 20, 2007, in U.S. Appl. No. 10/364,115 (10 pgs).
United States Final Office Action mailed Aug. 21, 2007, in U.S. Appl. No. 10/185,511 (18 pgs).
United States Final Office Action mailed Aug. 22, 2008, in U.S. Appl. No. 10/185,511 (16 pgs).
United States Final Office Action mailed Nov. 12, 2009, in U.S. Appl. No. 10/185,511 (26 pgs).
United States Final Office Action mailed Nov. 24, 2009, in U.S. Appl. No. 10/364,115 (17 pgs).
United States Final Office Action mailed Sep. 26, 2006, in U.S. Appl. No. 10/185,527 (16 pgs).
United States Final Office Action mailed Sep. 27, 2006, in U.S. Appl. No. 10/185,511 (15 pgs).
United States Final Office Action mailed Sep. 3, 2008, in U.S. Appl. No. 10/364,115 (13 pgs).
United States Non-Final Office Action mailed Feb. 10, 2009, in U.S. Appl. No. 10/364,115 (13 pgs).
United States Non-Final Office Action mailed Feb. 28, 2006, in U.S. Appl. No. 10/185,527 (18 pgs).
United States Non-Final Office Action mailed Jan. 28, 2008, in U.S. Appl. No. 10/185,511 (15 pgs).
United States Non-Final Office Action mailed Mar. 30, 2009, in U.S. Appl. No. 10/185,511 (16 pgs).
United States Non-Final Office Action mailed Mar. 6, 2007, in U.S. Appl. No. 10/185,511 (17 pgs).
United States Non-Final Office Action mailed Mar. 7, 2008, in U.S. Appl. No. 10/364,115 (9 pgs).
United States Non-Final Office Action mailed Mar. 8, 2007, in U.S. Appl. No. 10/364,115 (9 pgs).
United States Non-Final Office Action mailed Mar. 9, 2006, in U.S. Appl. No. 10/185,511 (16 pgs).
United States Non-Final Office Action mailed May 11, 2010, in U.S. Appl. No. 10/185,511 (16 pgs).
United States Non-Final Office Action mailed May 18, 2007, in U.S. Appl. No. 10/185,527 (15 pgs).
United States Non-Final Office Action mailed Sep. 24, 2006, in U.S. Appl. No. 10/364,115 (10 pgs).
United States Notice of Allowance mailed Oct. 29, 2007, in U.S. Appl. No. 10/185,527 (13 pgs).
United States Notice of Allowance mailed Sep. 24, 2010, in U.S. Appl. No. 10/185,511 (7 pgs).
United States Response to Aug. 20, 2007 office action, in U.S. Appl. No. 10/364,115, filed Oct. 22, 2007 (8 pgs).
United States Response to Aug. 21, 2007 action, filed Oct. 26, 2007 in U.S. Appl. No. 10/185,511 (15 pgs).
United States Response to Aug. 22, 2006 action, filed Nov. 19, 2008 in U.S. Appl. No. 10/185,511 (18 pgs).
United States Response to Feb. 10, 2009 office action, in U.S. Appl. No. 10/364,115, filed Jul. 7, 2009 (9 pgs).
United States Response to Jan. 28, 2008 action, filed May 28, 2008 in U.S. Appl. No. 10/185,511 (16 pgs).
United States Response to Mar. 30, 2009 action, filed Jun. 30, 2009 in U.S. Appl. No. 10/185,511 (18 pgs).
United States Response to Mar. 6, 2007 action, filed Jun. 5, 2007 in U.S. Appl. No. 10/185,511 (14 pgs).
United States Response to Mar. 7, 2008 office action, in U.S. Appl. No. 10/364,115, filed Jun. 9, 2008 (8 pgs).
United States Response to Mar. 8, 2007 office action, in U.S. Appl. No. 10/364,115, filed Jun. 8, 2007 (8 pgs).
United States Response to Mar. 9, 2006 action, filed Jun. 7, 2006 in U.S. Appl. No. 10/185,511 (20 pgs).
United States Response to May 11, 2010 action, filed Jul. 2, 2010 in U.S. Appl. No. 10/185,511 (22 pgs).
United States Response to Nov. 12, 2009 action, filed Mar. 12, 2010 in U.S. Appl. No. 10/185,511 (19 pgs).
United States Response to Office Action dated Feb. 28, 2006, filed May 10, 2006 in U.S. Appl. No. 10/185,527 (20 pgs).
United States Response to Office Action dated May 18, 2007, filed Aug. 20, 2007 in U.S. Appl. No. 10/185,527 (13 pgs).
United States Response to Office Action dated Sep. 26, 2006, filed Feb. 22, 2007 in U.S. Appl. No. 10/185,527 (24 pgs).
United States Response to Office Action dated Sep. 26, 2006, filed Nov. 14, 2006 in U.S. Appl. No. 10/185,527 (11 pgs).
United States Response to Sep. 27, 2006 action, filed Jan. 19, 2007 in U.S. Appl. No. 10/185,511 (16 pgs).

(56) References Cited

OTHER PUBLICATIONS

United States Response to Sep. 27, 2006 action, filed Nov. 8, 2006 in U.S. Appl. No. 10/185,511 (15 pgs).
United States Response to Sep. 27, 2006 office action, in U.S. Appl. No. 10/364,115, filed Dec. 27, 2006 (4 pgs).
United States Response to Sep. 3, 2008 office action, in U.S. Appl. No. 10/364,115, filed Nov. 3, 2008 (9 pgs).
Ahuja, Gautama. "The Key to Keys," DataQuest (India), 1997, (from DialogClassic WebTM, file 619, Acc. No. 05010091).
Amdur, D. "Metering Online Copyright," Jan. 16, 1996, 2 pages.
Amdur, D. (ed), "Intertrust Challenges IBM Digital Content Metering," Report of Electronic Commerce, Jul. 23, 1996, 3(15), 1-2 and 6-18.
Backman, D. "Smartcards: The Intelligent Way to Security," Network Computing, 1998, 9(9), 168-171.
*Bankard Set to Into Virtual Shopping in Philippines*, Newsbytes News Network, Apr. 16, 1997, (from DialogClassic WebTM file 9, acc. No. 01235815.
*Boxing Up Bytes*, 2 pages.
Chin, T.L., "Reaching Out to Physicians," Health Data Management, Sep. 1998, 6(9).
Clark, T. "Software Secures Digital Content on Web," Interactive Week, 1995, 1 page.
Craig, W. et al. "Digital Licensing," IEEE Internet Computing, Jul./Aug. 2005, 9(4).
Discussion from microsoft.public.access.security, "? How to Prevent copying DB Application to Other Machines," response from Dec. 22, 1998.
Hidgins-Bonafield, C. "Selling Knowledge on the Net," Network Computing, 1995, 102-109.
Kaliski, Privacy Enhancement for Internet email-Part IV: Key Certification and Related Services, RFC 1424, 1993, 1-8.
Kopeikin, R. "Secure Trading on the NET," Telecommunications International Edition, 1996, 30(10), 89-94.
Misra, R.B. et al., "Tamper Detection Using Neuro-Fuzzy Logic," Ninth International Conference on Metering and Tariffs for Energy Supply, Conference Publication 462, May 25-28, 1999, 101-108.
*MS to Upgrade Browser Security*, Cnet News.com, Mar. 20, 1997.
*Network-based Authentication: The Key to Security*, Network Computing, 1991, 98.
*Next Step is Encryption: Data Security may be Bundled with Next's Operating System*, Electronic Engineering Times, 1992, Dialog Classic Web 9tm, file 16, acc No. 02103190.
*Postal Service Announce Plan to Postmarks on Electronic Mail*, San Jose Mercury News, Apr. 19, 1995, DialogClassic Web file 9, acc No. 00618375.
*S-A Unveil Security System*, Multichannel News, 1996, 18(3), 45 + file 9, acc No. 00864754.
Smith, M.G. et al. "A New Set of Rules for Information Commerce," Electronic Commerce, 1995, 34-35.
Stallings, W. Network and Internetwork Security Principles and Practice, 1995, 3 pages.
Stevens, M.G. "How Secure is Your Computer System?," Practical Accountant, 1998, 31(1), 24-32.
*Suppliers Cashing in on the Internet*, Communications Week International, Nov. 14, 1994, 134, 36 Dialog Classic Web file 9, acc No. 00564878.
Tarter, J. "The Superdistribution Model," Soft Trends, 1996, 3(6), 1-6.
*The Key to Keys*, DataQuest, 1997.
*The New Network: Planning and Protecting Intranet Electronic Commerce*, Information Week, 1996, 608, Dialog Classic WebTM file 13, acc No. 00528101.
United States Amendment filed Jul. 30, 2012, in U.S. Appl. No. 13/274,217 (15 pages).
United States Amendment filed Aug. 16, 2012, in U.S. Appl. No. 11/353,321 (24 pages).
United States Notice of Allowance mailed Nov. 6, 2012, in U.S. Appl. No. 11/018,095 (8 pages).
USPTO Office Action, mailed Mar. 26, 2002, cited in U.S. Appl. No. 09/449,106.
USPTO Office Action, mailed Oct. 22, 2002, cited in U.S. Appl. No. 09/449,106.
Japanese Notice of Rejection mailed Feb. 9, 2010, in Application No. 2001-050480 (12 pages).
Japanese Notice of Allowance mailed May 25, 2010, in Application No. 2004-050480 (6 pages).
Malaysia Substantive Examination mailed Apr. 23, 2008, in Application No. PI20040481 (2 pages).
Malaysia Notice of Allowance mailed Sep. 30, 2011, in Application No. PI20040481 (2 pages).
Malaysia Substantive Examination mailed Oct. 2, 2009, in Application No. PI20051703 (2 pages).
Malaysia Notice of Allowance mailed May 14, 2010, in Application No. PI20051703 (2 pages).
Polish Notice mailed Jan. 23, 2009, in Application No. P365549 (4 pages).
Polish Notice mailed Sep. 9, 2009, in Application No. P365549 (3 pages).
Philippines Office Action mailed Oct. 26, 2007, in Application No. 1-2004-000078 (1 page).
Russian Office Action mailed Jan. 25, 2008, in Application No. 2004105509 (8 pages).
Russian Decision on Grant mailed Jul. 24, 2008, in Application No. 2004105509 (13 pages).
Russian Office Action mailed Mar. 5, 2008, in Application No. 2004103871 (9 pages).
Russian Decision on Grant mailed Jun. 27, 2008, in Application No. 2004103871 (20 pages).
Russian Office Action mailed Apr. 22, 2009, in Application No. 2005112059 (3 pages).
Russian Decision to Grant mailed Jul. 16, 2009, in Application No. 2005112059 (20 pages).
Russian Decision to Grant mailed Mar. 16, 2009, in Application No. 2005112105 (18 pages).
Russian Decision to Grant mailed Aug. 13, 2008, in Application No. 2005120670 (6 pages).
Russian Decision to Grant mailed Oct. 6, 2010, in Application No. 2008101456 (22 pages).
Japanese Notice of Rejection mailed on Feb. 12, 2010, in Application No. 2004-035808 (7 pages).
Japanese Notice of Rejection mailed Jul. 23, 2010, in Application No. 2004-035808 (4 pages).
Japanese Notice of Allowance mailed Nov. 2, 2010, in Application No. 2004-035808 (6 pages).
Japanese Notice of Rejection mailed Dec. 3, 2010, in Application No. 2005-006781 (9 pages).
Japanese Final Rejection mailed on Apr. 22, 2011, in Application No. 2005-006781 (7 pages).
Japanese Written Appeal filed Aug. 22, 2011, in Application No. 2005-006781 (23 pages).
Japanese Notice of Allowance mailed Oct. 7, 2011, in Application No. 2005-006781 (6 pages).
Japanese Notice of Rejection mailed Dec. 10, 2010, in Application No. 2005-124814 (11 pages).
Japanese Notice of Allowance mailed Apr. 26, 2011, in Application No. 2005-124814 (6 pages).
Japanese Notice of Rejection mailed May 20, 2011, in Application No. 2008-521533 (4 pages).
Japanese Notice of Allowance mailed Oct. 14, 2011, in Application No. 2008-521533 (6 pages).
U.S. Appl. No. 09/525,509, filed Mar. 2000, Peinado, et al.
U.S. Appl. No. 09/526,290, filed Mar. 2000, Peinado, et al.
U.S. Appl. No. 11/866,041, Notice of Allowance mailed Jan. 10, 2014, 8 pages.
U.S. Appl. No. 11/866,041, Amendment filed Feb. 21, 2014, 3 pages.
U.S. Appl. No. 11/108,038, Notice of Allowance mailed Jan. 6, 2014, 19 pages.
U.S. Appl. No. 12/053,090, Amendment filed Dec. 31, 2013, 4 pages.
U.S. Appl. No. 12/832,831, Amendment filed Dec. 31, 2013, 4 pages.

(56) References Cited

OTHER PUBLICATIONS

U.S. Appl. No. 13/367,198, Letter Restarting Period for Response mailed Feb. 10, 2014, 18 pages.
Canadian Application 2457291, Notice of Allowance mailed Jan. 31, 2014, 2 pages.
European Application 03013556.0, Decision to Refuse a European Patent Application mailed Feb. 10, 2014, 6 pages.
India Application 167/MUM/2004, Hearing Notice mailed Jan. 6, 2014, 1 page.

* cited by examiner

| Field Name | Field Type | Size (bits) | Value | Notes |
|---|---|---|---|---|
| Header Constant 502 | DWORD | 32 | 0x584D5200 | Checked to make sure the buffer starts with a header structure. Corresponds to "XMR 0" in ASCII. |
| XMR Version 504 | DWORD | 32 | 0x00000001 | V1.0 |
| Rights ID 506 | GUID | 128 | Random | Uniquely identifies license. This field is also known as the License ID (LID). |

Header 500

FIG. 5

| Field Name | Field Type | Size (bits) | Value | Notes |
|---|---|---|---|---|
| Flags 602 | WORD | 16 | 0x0001 and/or 0x0002 | 0x0001 = Must Understand<br>0x0002 = Container object |
| Object Type 604 | WORD | 16 | | The Object Type value is defined for each specific object that is represented by an XMR base object. |
| Object Length 608 | DWORD | 32 | 8 + nested data length | Length includes this structure and all nested children. |
| Object Data 610 | Variable | Variable | variable | Data specific to this object including nested children objects |

XMR Container Object
600

FIG. 6

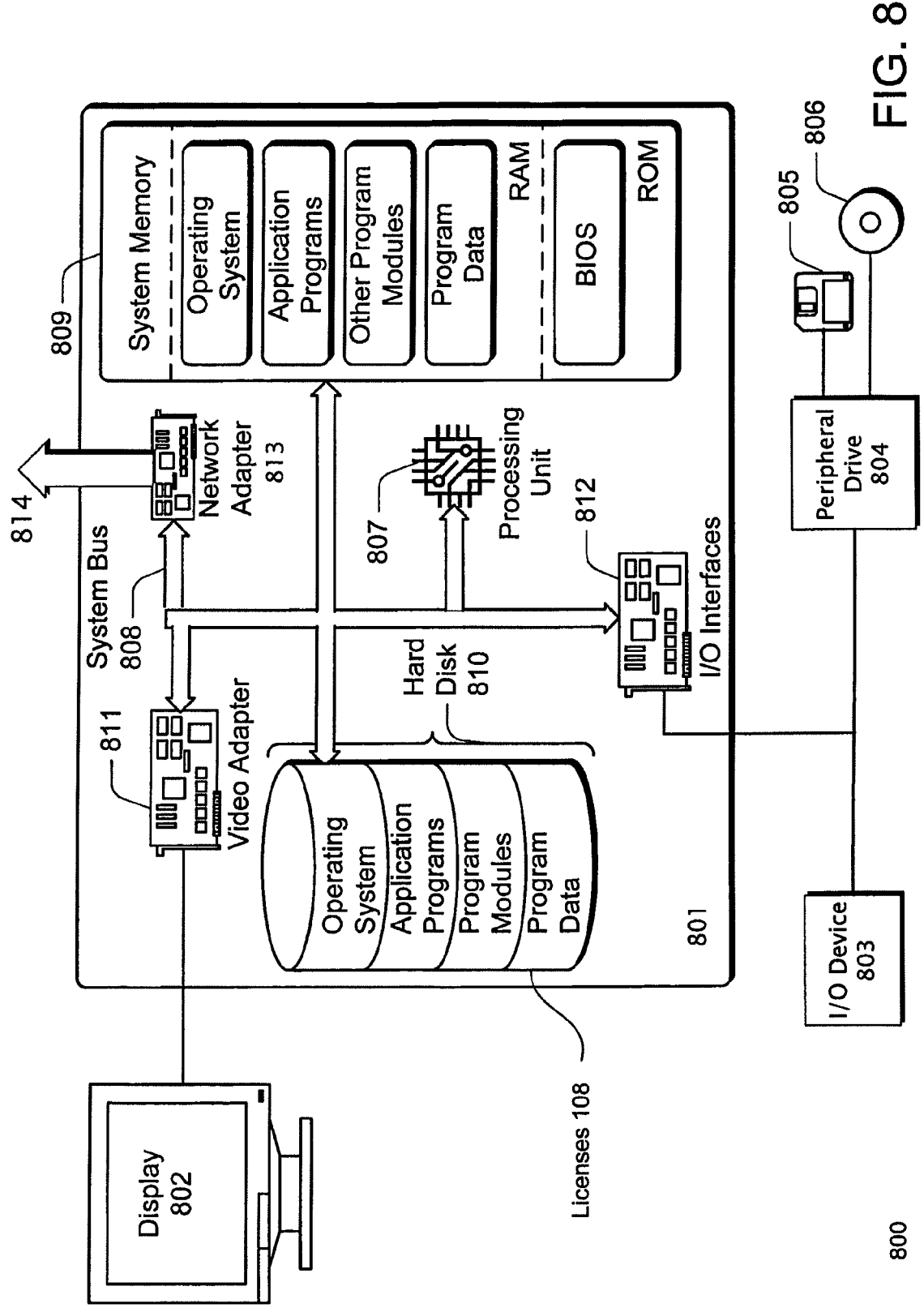

US 8,781,969 B2

EXTENSIBLE MEDIA RIGHTS

CROSS-REFERENCE TO RELATED APPLICATIONS

This application is a continuation application and claims priority to U.S patent application Ser. No. 11/134,719, now abandoned, filed May 20, 2005, entitled "Extensible Media Rights," which application is incorporated herein by reference in its entirety.

DESCRIPTION OF THE DRAWINGS

The present description will be better understood from the following detailed description read in light of the accompanying drawings, wherein:

FIG. 5 shows the details of an XMR header object.

FIG. 6 shows the details of an XMR container object.

FIG. 8 is a block diagram showing a computer processor capable of processing an XMR structure.

Like reference numerals are used to designate like parts in the accompanying drawings.

DETAILED DESCRIPTION

The detailed description provided below of extensible media rights in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Extensible media rights may include a way of constructing a license that is used to govern the use of digital media. Although the present examples of extensible media rights ("XMR") are described and illustrated herein as being implemented in a license of a digital rights management ("DRM") system, the DRM system described is provided as an example and not a limitation. As those skilled in the art will appreciate, the present examples are suitable for application in a variety of different types of data exchange systems such as clients and servers.

Conventional binary systems that may be used for representing digital rights tend to have limitations. CCI systems utilize two bits and are typically capable of only conveying four states.

Extensible Media Rights ("XMR") typically provide a binary system that may be used to convey media usage rights and restrictions, such as in a license that may be found in a digital rights management ("DRM") system. The framework established by XMR typically allows extensions to be introduced in a backwards-compatible fashion. XMR typically uses an object framework, nesting structure, and binary representation to convey media usage rights in the form of a license. The format of an XMR license may include some aspects of RIFF and ASF files, both of which may use nested objects or structures that may have systems for providing different types or lengths.

Figure 1:
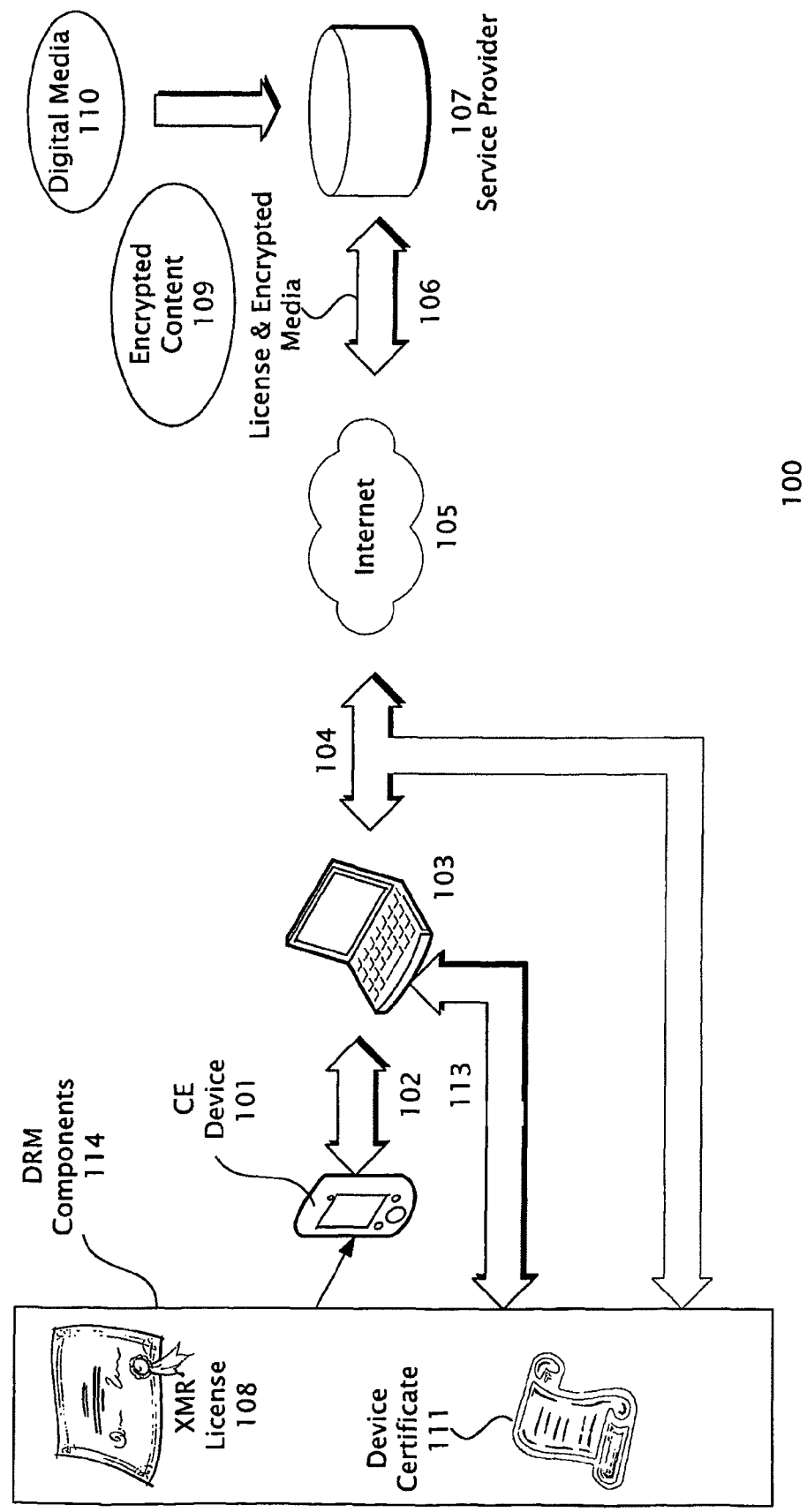
FIG. 1 is a block diagram of a typical digital rights management system utilizing an XMR DRM license.

FIG. 1 is a block diagram of a typical digital rights management system utilizing an XMR DRM license. Although the present examples are described and illustrated as being implemented in a consumer electronics ("CE") device system, the system described is provided as an example and not a limitation. CE devices may include pocket PCs, set top boxes, portable media centers, cell phones, music players, PCs, software constructed media players, high fidelity components, and the like. In fact PCs are a common device that may be provided with DRM enabling software to function as a CE device. PCs may be used as docking stations for a user to store content on, and then download some or all of it to another CE device, such as an MP3 player. These CE devices are typically configured to operate in a system that includes the internet, PCs and the like to facilitate license and media content transfer.

DRM system 100 typically provides a collection of processes for the secure distribution of multimedia content 110 from a service provider 107 coupled 106 to an insecure channel, such as the Internet 105. Digital media content for viewing or playback would typically include music files, picture files, video files, documents, and other protected content, in short anything that a service provider wishes to transmit securely over an unsecured channel.

In particular content may be anything that a provider desires to protect such as music, video, multimedia, pictures and the like. Content is typically regulated to prevent its unauthorized use by providing licenses. Content may be audio, video, textual, encrypted, unencrypted, compressed, uncompressed or otherwise manipulated. In a DRM system the content, (or equivalently media, media files, files, or the like) to be played, can typically be freely transferred. Transfer of encrypted content is typically over unsecured channels such as the internet. In a DRM system the playback of the content is controlled, or allowed, by a license that may be typically stored on a specific CE device. Those skilled in the art will realize that the term "play" as used herein may also be construed to mean consumed, or other equivalent terms that indicate that there are limits placed upon accessing the media file governed by the license. Digital media file 110 is typically encrypted by service provider 107 prior to transmission, and is typically decrypted into an unencrypted media file 109 at the CE device 101 or 103

A personal computer 103 may be used to couple 104 to the internet 105 as a CE device. The computer may also be used to transfer content and licenses from the service provider 107 to another more portable consumer electronics device 101 via the path 102 shown. The personal computer and the CE devices may operate utilizing any number of suitable operating systems known to those skilled in the art to implement the desired DRM processes being activated. The instructions for implementing the functions described in this application may exist as software, hardware (for example instructions burned into an ASIC), or a combination of both.

The PC may act as a main storage location and have a large number of licenses and media files stored on it. Protocols for transferring information to the PC 103, and to the CE device 101 over paths 102 and 104 may be achieved by conventional connections such as Ethernet, USB, infrared, Bluetooth, MTP and the like. These pathways may be useful for transmitting licenses and content.

A CE device 101 may be as previously noted a variety of devices equipped with a processor. As shown here 101 the CE device may be a portable personal electronics device such as a digital juke box, MP3 player, or the like.

In alternative embodiments a consumer electronics device 101 may be coupled 104 to a service provider 107 without using the personal computer 103 as an intermediary. In this example the CE device 101 operates to download media and licenses directly from the internet.

A DRM capable device, such as a CE device 101, or a PC 103, typically includes a number of DRM components 114 utilized by a DRM system. The components 114 are typical, but not limiting, of DRM components. A similar set of components may be associated with the PC 103, but are omitted to simplify the figure. Typical DRM components may include one or more licenses 102. Also shown as part of a typical DRM system is a device certificate 111 that may uniquely identify the CE device 101 to the DRM system 100. Device certificates may provide cryptographical hand shake information that may facilitate the transfer of information, such as a master clock signal 110 from a trusted time authority 116.

In a typical application, DRM system 100 protects contents 110 by providing encrypted data files 109. Since files 109 are encrypted, the data itself is protected. Thus, the files 109 may be moved, archived, copied, or distributed without restriction. There is no need to hide files or make them inaccessible, or to put special protection in place when files are transmitted from system to system. However, copying a file and giving it to a friend will not enable that friend to use the file. In order to be able to use an encrypted file, users must obtain an XMR license 108. This license 108, that typically includes a grace period 115, is a way of exercising control over the encrypted file 110 and the unencrypted version 109 of the file. An XMR license 108 is typically granted to a single machine 101, and even if copied, it will not tend to function on other machines.

An example of a Digital Rights Management system that may be capable of utilizing Grace Periods is described in U.S. patent application Ser. No. 09/290,363, filed Apr. 12, 1999, U.S. patent application Ser. Nos. 10/185,527, 10/185,278, and 10/185,511, each filed on Jun. 28, 2002 which are hereby incorporated by reference in its entirety.

A typical licensing system is a digital rights management ("DRM") system. As those skilled in the art will appreciate, the present example is suitable for application in a variety of different types of systems that operate under a license.

Figure 2:
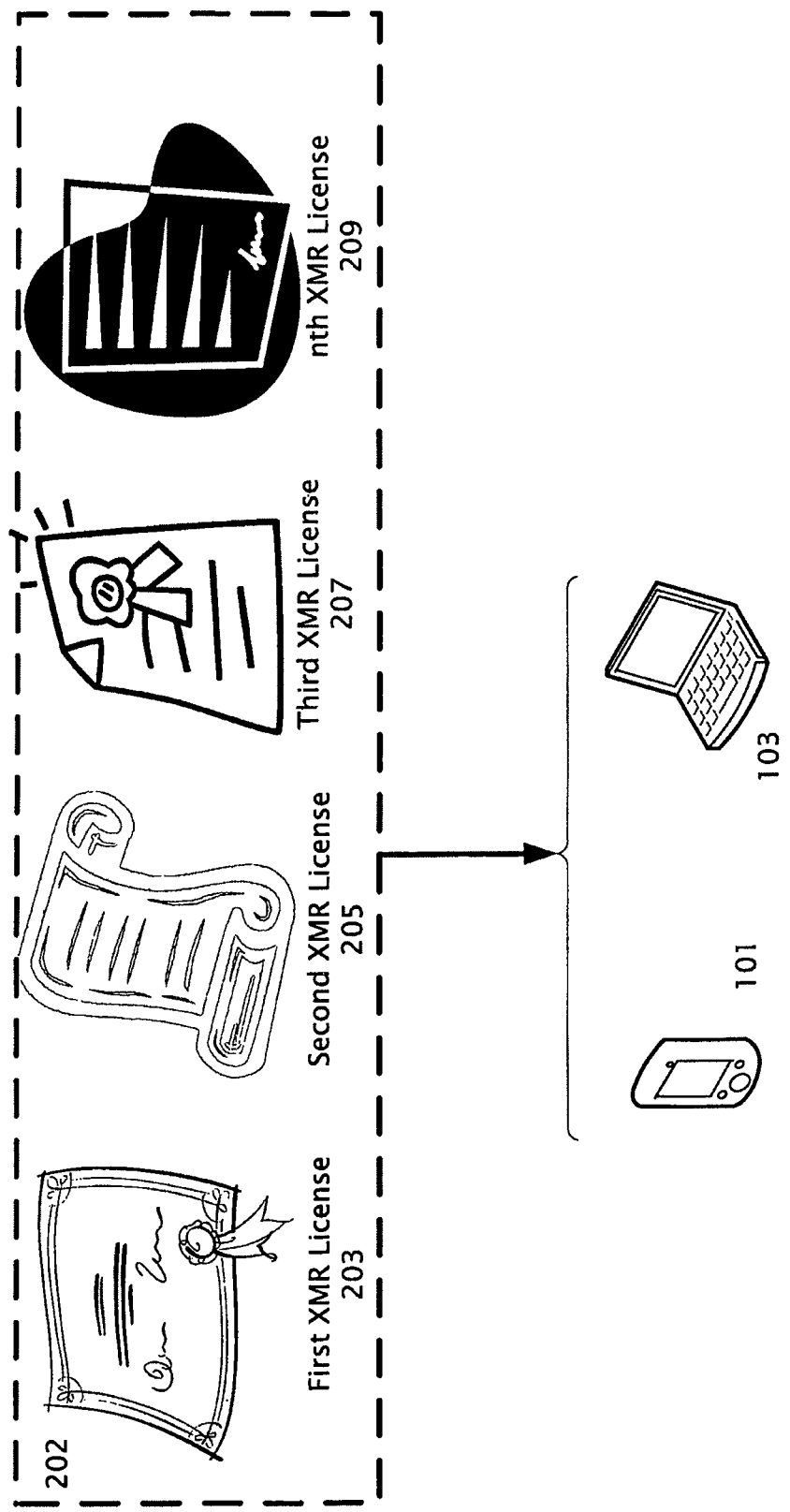
FIG. 2 is a diagram showing an XMR DRM licenses.

FIG. 2 is a diagram showing a plurality of typical XMR DRM licenses 202. XMR Licenses are typically exchanged as in a typical client server exchange. First a client initiates contact with a server and presents a certificate having a public key to the server. The server then sends an XMR license to the client. In this example the XMR license sent is an exemplary XMR license. In alternative embodiments any suitable method issuing a license may be utilized to cause an XMR license to be transmitted.

An XMR license typically accompanies a media file (not shown) that has been downloaded to the CE device 101, or to a PC 103. In the past licenses have been typically downloaded with the content, and not separately, although they may be downloaded together. The number of XMR licenses on the CE device 101 can be extremely large, such that a user typically can not keep track of the individual conditions applied to each media file by its associated license. A PC will typically contain even more XMR licenses. Occasionally, more than one XMR license will be associated with a media file.

XMR licenses typically regulate the use of content. Most current DRM solutions rely on unique identification of user devices, such as CE devices. In such systems each XMR license is typically bound to a unique consumer electronics device (or playback device), so the XMR license stored in one CE device typically can not be transferred or used by another device. The XMR licenses are typically stored separately from the content, typically in a dedicated storage area such as a secure store.

Figure 3:
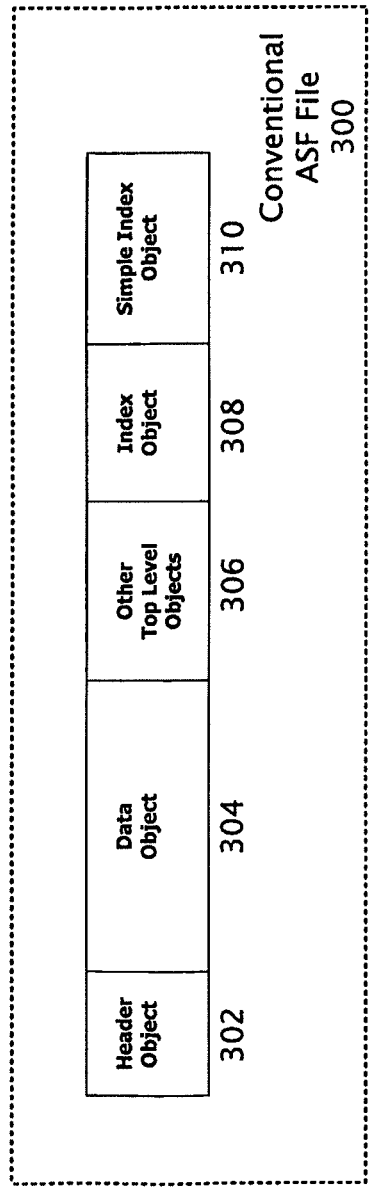
FIG. 3 is a diagram showing a conventional ASF file.

FIG. 3 Illustrates a conventional Advanced Streaming Format ("ASF") data file structure and its use. A conventional ASF media file 300 may be stored on a computer 301, and may be played 305 by, a conventional media player application 303 or the like. Current ASF media files 300 typically are not used to provide licenses in DRM systems. Typically the ASF file is loaded by an application 303, and subsequently processed (or played) by the application 303, to produce an output such as the video output 309 and, sound output 307 shown here. ASF files 300 have been used convey a variety of information such as music, video and the like. Media players may include audio players, video players, editing programs, digital photo albums, and the like. The possible outputs 307, may include audio video and the like.

A typical ASF file may include a header object 302, a data object 304, and one or more index objects 308 310. In the ASF file structure space is provided for other top level objects 306. An ASF header object 302 typically includes a set of tables that may include information on the entire file, including the size of the file, if the file is packetized, how large the packets are, if there is audio stream, the number of streams present in the file, and the like. An ASF data object 104 may include the data or media content.

The ASF data object 304 that contains the digital media typically varies in length. The following paragraphs describe licenses that may incorporate the variable length structure of ASF files.

Figure 4:
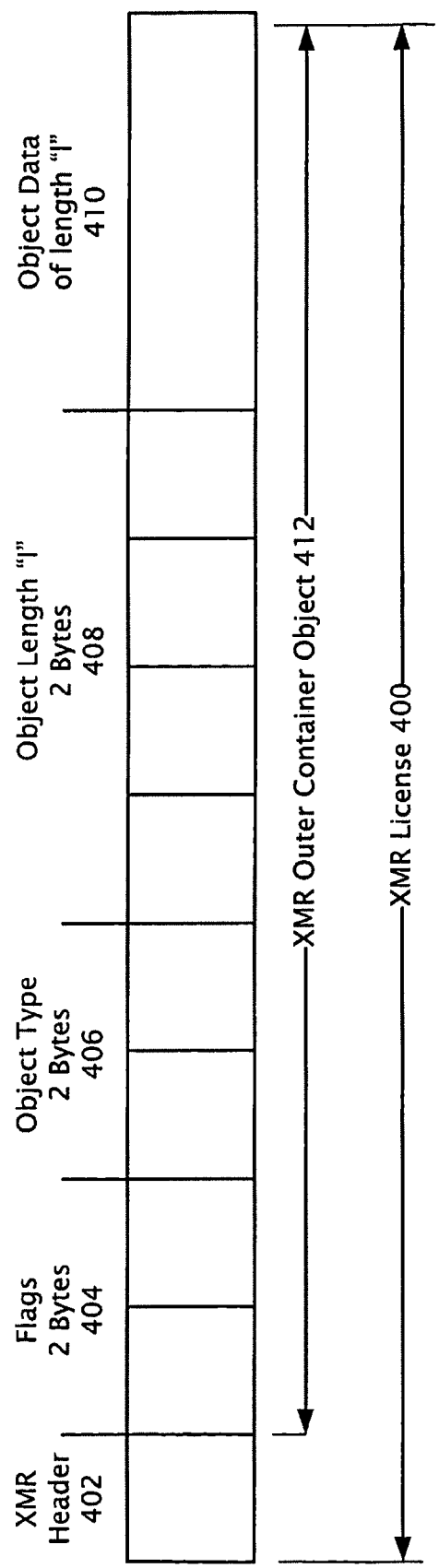
FIG. 4 shows an XMR structure having a header object and an outer container object.

FIG. 4 shows an XMR structure having a header object 402 and an outer container object 412. Many different license features may be described in an XMR structure by coupling various base XMR objects together under a header 402. (One XMR base object is shown for simplicity.) The XMR objects may be assembled or coupled under a header in a variety of ways that may include nested structures inside the outer container structure. However, the XMR objects assembled under a header typically include a common structure like that of the XMR container object or template. For example, a number of license features may each be represented by XMR objects, by assembling them under a header to form an XMR license. In this arrangement each XMR object may have the structure of the XMR base object 401, and may be nested within the XMR container object.

The first two bytes of the XMR base object may be used for flags 404, the next two bytes may describe the object type 406, and the next four bytes may represent the object length "I" 408 of the information that makes up the object data 410. An object data of length "I" 410 typically follows the bytes that describe the object length. In addition the object 410 may contain numerous sub objects, where the length of each sub object may be provided in its own header.

XMR objects may be stored in network byte order (big-endian) and 1-byte alignment may be assumed (in other words, no alignment), so alignment-related padding bytes need not be inserted. Storage of these binary objects is typically provided by one or more memory registers, or data buffers.

FIG. 5 shows the details of an XMR header object 500. In order to perform an efficient check that a particular data buffer contains a valid and complete XMR representation, it is typically required that every XMR representation begin with the header structure shown. The header 500 may include the header constant 502, the XMR version 504, and the rights ID 506. An XMR license typically contains a header structure followed by a "container" object that may contain nested XMR "data" objects within it. Such a container object may be called an XMR outer container object. In alternate examples the length of the accompanying data object may be included in the header object.

FIG. 6 shows the details of a base XMR container object 600. Details of the flags 602, object type 604, object length 608, and object data 610 are shown in the figure. The remainder of the XMR binary representation may be composed of logically nested "objects", which may be self-descriptive tag/length/value tuples. XMR representations will typically contain multiple derived objects with certain portions of the logical ordering and nesting structure being structured as indicated in the example described below.

A flag may be used to distinguish between "data objects" that contain additional fields in a structure derived from a base XMR object representation (such as an XMR outer container object) and "container" objects that have only nested XMR objects as their contents and are otherwise identical in structure to the base XMR object. Flags may simplify parsing, validating, extending, and diagnosing XMR data dumps.

The flags are typically used for a must understand object that indicates that at least the present field must be understood in order to process or enforce the license. In order to simplify parsing, validating, extending, and diagnosing of XMR data dumps, XMR objects typically begin with a field for flags. The current extension provided in this example defines flags that may distinguish between container or leaf objects and between mandatory and optional objects.

The must understand flag (0x0001) is used as a signal to compliant XMR parsers that if they don't recognize this object's object type value, they should return an error code to the calling application, rather than silently ignoring the object. The XMR parser should also understand all of the values of the object. For instance, an XMR object might define a DWORD which has newly introduced values for subsequent releases. Such values should be understood, or an error should be returned to the application. In general, the must understand flag will not be set on objects that represent rights and will be set on objects that represent restrictions.

If a container object is marked that it need not be understood, then an XMR parser should not check contained objects for the must understand flag unless the parser understands the container. For instance, the copy policy container does not have the must understand flag set. If an XMR parser does not understand the concept of copying, it need not understand any contained restrictions on the copy.

The container object flag (0x0002) is used when the XMR object contains data consisting of zero or more "nested" XMR objects. This construct is used for logical grouping and scoping reasons, and is distinguished in order to support general purpose tools as well as to simplify the logical rights usage design.

Each XMR object of the plurality of objects may be assigned a unique object type 604, as indicated by the type field. The length field 608 typically specifies the length of the object and it's plurality of nested children. The object type values may be centrally managed by a service provider, and may be allocated out of a single 16-bit space. Object type values should be given as part of each XMR object description.

The object data 610 is of variable length. The object length 608 may be the length in bytes of the entire object including the header structure. For container objects, this length includes the size of all the enveloped child objects. The child objects may refer to data objects that may be nested in an enveloping container object.

A use for XMR is to represent DRM licenses. The binary rendition of the XMR license puts the license in a form that typically needs little processing, or translation to be used. Some conventional licenses have typically been represented using a script based description, such as a proprietary XML schema. A conventional license, having a script based description, is typically not a binary representation, has a relatively large size, and a high processing time. This may limit the performance of DRM systems, especially as the size of the license store grows larger. XMR typically provides a very compact binary representation of a license which may help provide a minimal processing time. A binary format also tends to eliminate the need for parsers or interpreters typically utilized in script based licenses.

Figure 7:
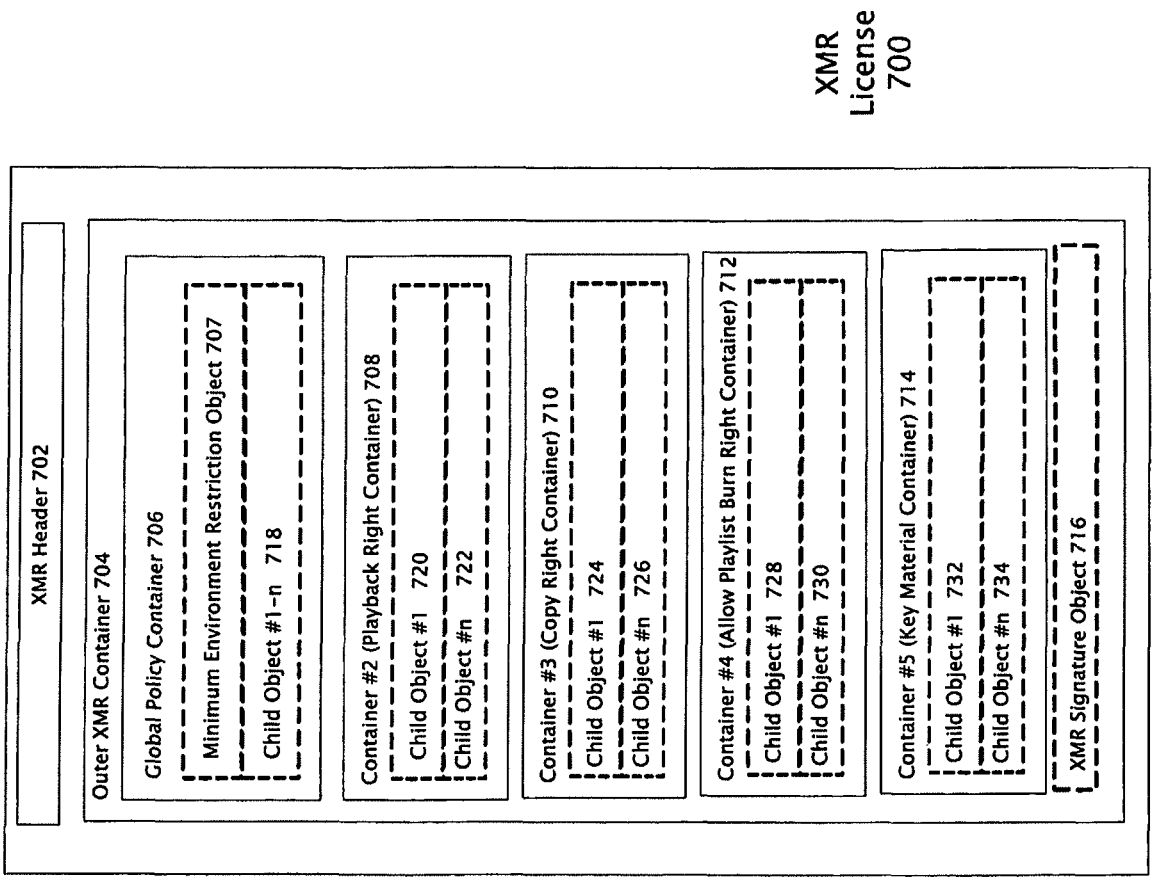
FIG. 7 is a block diagram showing an exemplary XMR DRM license.

FIG. 7 is a block diagram showing an exemplary XMR DRM license 700.

In the example provided mandatory and optional objects may be provided for the present example. In alternative embodiments the importance of the objects may change depending upon the purpose of the embodiment. In particular the example illustrates an application of the previously described XMR license structure.

The XMR header 702 is followed by a single outermost XMR container object 704 which typically has a plurality of nested objects 706, 708, 710, 712, 714 within it. The outer container object 704 is typically used to supply a total length value for the remainder of the XMR license. Extensions to the base XMR framework provided by the outer XMR container 704 may be logically nested within this outermost XMR container. The outer XMR container object typically includes flags, object type, and object length information. The last object within the outer XMR container will typically be the signature object 716 which ensures the integrity of the represented license. The outer XMR container object may include a number of containers 706, 708, 710, 712, 714 nested within it. It is possible to extend this license configuration by adding additional objects. Such an extensible structure may add other objects that may include one or more additional licensing constraints such as: a grace period, a source ID, an explicit uncompressed digital output protection list, a revocation container, a license granter key, a user ID and the like. The extensible structure may be used to change or extend the capabilities of current licenses, or may be used supply new licenses that specify digital rights beyond those previously downloaded.

A global policy container 706 is the first container nested in the outer XMR container 703. This object typically contains any data objects 707, 718 related to global policy, that is, policy not specific to playback or any other media usage scenario. This object may also include fields for flags, object types, and object lengths.

A minimum environment restriction object 707 may specify restrictions that may indicate several minimum requirements for security, and for the age of a revocation list (through versioning). In this example the minimum environment restriction object 707 can only be a child of a "Global Policy Container" XMR object. XMR encoding of this minimum environment restriction object 707 may include fields for flags, object type, object length, minimum security level, minimum app revocation list version, and minimum device revocation list version. The minimum security level typically specifies the lowest security level that the device must adhere to before it can access the content. The value from the license is compared with the security level from the device certificate. The value from the device certificate should be greater than or equal to the value from the license or the license must not be used to access the content.

In addition to the minimum environment restriction object 707 the global policy container 706 may include one or more additional child objects 718. In particular the child objects 718 of the global policy container 706 may include one or more of the following objects: minimum environment restriction, serial number restriction (Optional), rights settings (Optional), priority object (Optional); expiration restriction (Optional), issue date (Optional), expiration after first use restriction (Optional), expiration after first store restriction (Optional), and metering restriction (Optional).

The serial number restriction (Optional) restricts the content usage to one specific digital media receiver ("DMR"). This restriction is typically made only when multiple devices share the same device certificate. This restriction can typically only be a child of a "Global Policy Container" XMR object. This restriction may include fields for flags (set to must understand), object types, object length, and serial number. Serial number is a byte array containing the serial number of the DMR.

The rights settings (Optional), defines various rights settings that are global to the license. Various Boolean rights may be represented by this single object. This object can typically only be a child of a "Global Policy Container" XMR object. Object may contain fields for flags, object type, object length, and rights. Rights may have various states including: cannot persist, allow backup and restore collaborative play, and base license. The cannot persist bit indicates the license and content cannot be persisted; they should be used then discarded. The allow backup and restore bit indicates that a license may be backed up or restored to the same, or another device using a DRM backup and restore feature. The collaborative play right enables the single scenario that allows sharing of WMDRM protected content. The base license field may be used to derive keys for accessing other licenses.

The priority object (Optional), assigns the license a priority. This object need only be specified if there are two or more licenses issued for the same Key ID. This object can typically only be a child of a "global policy container" object. The XMR encoding of this object may include fields for flags, object type, object length, and priority. The priority field assigns a priority to the License. For licenses with the same key ID ("KID"), the license with the higher priority takes precedence.

The expiration restriction (Optional), describes any time limitations of the license. Fields may include flags, object type, object length, begin date and end date. The begin date typically controls the beginning of the validity period for the license. In this example the special value 0 indicates that the license may be valid from the beginning of time. The end date typically controls the end of validity period for the license. In the present example the special value 0xFFFFFFFF may indicate that the license is valid until the end of time, or its equivalent.

The issue date (Optional), object indicates when the license was issued. This object can typically only be a child of a "Global Policy Container" object. Object fields may include flags, object type, object length, and issue date.

The expiration after first use restriction (Optional), specifies the number of seconds the content may be played after first playback. The value of this restriction is that it allows the end user to choose when to begin playback, after which point they will have a specific number of seconds in which to play back the content. An alternative example replaces the first use restriction field with, an absolute expiration end date. This restriction can typically only be a child of a "Global Policy Container" object. Fields for this object may include flags, object type, object length, and expire after first use.

The expiration after first store restriction (Optional), This restriction specifies the time the content may be played after the license is first stored. This restriction allows a content provider to allow content to be used for a relative period of time regardless of the current time or time zone. The existence of this restriction in a license defines the license to be stateful. If a license containing this restriction is copied to another device or backed up, the state associated with this restriction is not copied. Instead, the copied license is assigned an absolute expiration end date. Fields for this object may include flags, object type, object length, and expire after first store. This restriction can typically only be a child of a "Global Policy Container" object.

The metering restriction (Optional) defines the information clients may be required to collect and where to remit that information to. This field may include flags, object type, object length, and metering ID. The metering ID may be the GUID of the metering requirements. This restriction can typically only be a child of a "Global Policy Container" object. Additional objects as described below may also be added, in addition to those shown above.

The Key material container object is used to contain any data objects related to key material and content encryption. This object can only be a child of an "Outer Container" XMR object. Typical fields include Flags, object type, and object length.

The RSA device key object defines the RSA public key of the device the license is bound to. This object can hold an RSA key. Emerald devices should have a 1024-bit or 2048-bit RSA key with an exponent of 65537. This object can typically only be a child of a "Key Material Container" XMR object. Fields for this object may include flags, object type, object Length, exponent, modulus Length, and modulus. Exponent specifies the exponent of the RSA key modulus length Specifies the length of the RSA key in bytes. For 2048-bit RSA, this value should be 256. Modulus is the modulus of the RSA key in network byte (big-endian) order.

Grace period (optional) indicates the number of seconds during which protected content can be played on a device after its clock becomes unset. The default value is zero seconds. This object can typically only be a child of a "Global Policy Container" object. Fields for this object may include flags, object type, object length and grace period.

Source ID (optional) identifies the source of the content. It could be used to make policy decisions based on the source. This object can typically only be a child of a "Global Policy Container" object. Fields for this object may include flags, object type, object length, and source ID. The source ID is typically an Identifier for the source of the content.

Explicit uncompressed digital audio output protection list (optional) is typically a container for Uncompressed Digital Audio Output Configuration objects. This container has a list of explicitly included Uncompressed Digital Audio output protection technologies that may be enumerated separately due to licensing restrictions. The application must employ all of the listed technologies that apply to the referenced output when outputting content to analog outputs. This is in addition to any other restrictions that may be on the output. Each listed output protection technology represents an addition requirement beyond the Uncompressed Digital Audio Output Protection level. The listed technologies only apply to digital outputs. Content sent to analog outputs is not affected by the list. This container can typically only be a child of a "Playback Right Container" XMR object. Fields typically include flags, object type, and object length.

Uncompressed Digital Audio Output Configuration Restriction (optional) typically requires the use of a certain uncompressed audio output protection scheme and provides relevant configuration data to be used by the scheme. This object typically can only be a child of an "Explicit Uncompressed Digital Audio Output Protection Container" XMR object. Fields typically include flags, object type, object length, audio output protection ID, and binary configuration data. The object length field typically Includes the 8-byte header, the 16-byte GUID, and the variable-length binary configuration data. The binary configuration data may include the configuration data for this output configuration. The size of the variable-length array is implied by the object length field of the object. The Binary Configuration Data is a variable length binary data field whose type is dependent on the value of the Audio Output Protection ID field. For the currently defined Audio Output Protection IDs, the Binary Configuration Data consists of a variable length unsigned integer in network byte order. The integer may be from 0 to 4 bytes long depending on the magnitude of the integer. The value and interpretation of the integer is defined below for each of the Audio Protection IDs. For the Downsample Required ID, the uncompressed digital audio must be downsample to a maximum value specified by the Binary Configuration Data. The Binary Configuration Data is a single integer containing an ordinal defining the downsample requirements. Currently, the only value 1 is defined. A value of 1 requires 48 KHz max sample rate, 16 bit max sample size. This Downsample Required ID applies to uncompressed digital audio outputs.

The revocation container object (optional) typically contains any data objects related to revoking or deleting XMR licenses. This object can typically only be a child of an "outer container" XMR object. Fields for this object may include flags, object type and object length.

The license granter key object typically specifies RSA public key of the entity that issued the license. When this license is revoked or deleted, the caller must prove possession of the corresponding RSA private key. This object can typically hold an RSA key. This object can typically only be a child of a "Revocation" XMR object. Fields for this object may include flags, object type, object length, exponent, modulus length, and modulus. Exponent typically specifies the exponent of the RSA key. Modulus length typically specifies the length of the RSA key in bytes. For 1024-bit RSA, this value should be 128. The modulus field is typically the modulus of the RSA key in network byte (big-endian) order.

The user ID object (optional) typically specifies a User ID to be associated with the license. The user ID is defined by the entity that issues the license. When this license is revoked or deleted, the caller may specify that only licenses with a particular User ID are to be deleted. The User ID is considered to be a binary blob. As such, if the User ID is a text string, any comparison with the blob is case sensitive. This object can only be a child of a "Revocation" XMR object. Fields for this object may include flags, object types, object length, and user ID.

The outer XMR container object 704 may also include on or more additional containers 708, 710, 712, 714 that may each include one or more additional child objects 720, 722, 724, 726, 728, 730, 732, 734. It is also specifically contemplated that additional child objects not listed here may be added, due to the extensible characteristics of this structure.

The second additional container 708 may be a playback right container. The playback right grants the ability to play the content. This object also contains any data objects related to media playback policy. This object typically includes fields for flags, object type and object length. This container can typically only be a child of an "outer container" XMR object.

The plurality of one through n child objects 720, 722 of the second additional container 708 may include any or all of the following: play count restriction (optional), output protection level restriction, explicit analog video output protection container object (optional), analog video output configuration restriction object (optional).

The play count restriction (optional), restriction specifies the number of times the content can be played. Play is defined as the first packet being decrypted. The existence of this restriction in a license defines the license to be stateful. If a license containing this restriction is copied to another device, the state associated with this restriction is usually not copied. Instead, another play count number of plays are allowed by the license copy.

If a license containing this restriction is backed up, the play count restriction in the backed up license is set to the net number of plays left instead of the original play count. This algorithm attempts to protect the content provider by accounting for the plays already consumed. However, it is impossible to account for any copies made between the time when the license was backed up and when the license was restored. Objects may include fields for flags, object type, object length and play count. This restriction can typically only be a child of a "Playback Right Container" object.

The output protection level restriction, restriction indicates several minimum requirements for content output protection, based on the type of content being output and the format of that content.

Output protection levels are specified by a number defining a minimum level of content protection required for a particular type and format of content. Larger numbers may imply that stronger content protection is required. Specific values may be defined for each type and format of content. Licenses should be issued with those specific defined values. Fields that may be included in this object include flags, object type, object length, digital compressed video output protection level, digital uncompressed video output protection level, analog video output protection level, digital compressed audio output protection level, and digital uncompressed audio output protection level.

The values defined for each type and format are mapped by this document to particular output technologies. That list of technologies may be expanded from time to time without notice. An application may map any technologies it supports to the levels defined by this document.

Licenses should be interpreted to allow for values that are not yet defined. For instance, if an output protection level defines a value of 200 for XXX content protection and 400 for ZZZ content protection, then an application that implements both XXX and ZZZ should interpret licenses at levels 201 through 400 inclusive as requiring ZZZ content protection. If a subsequent WMDRM specification defines level 300 for YYY content protection, a license issued for level 300 will be properly interpreted by the application.

Output protection levels may be defined for a type of output regardless of the original input format. For instance, if an application has an input of digital compressed video and doesn't support the required content protection for the digital compressed video, the application may uncompress the digital video and output that content based on the digital uncompressed video output protection level. This object can typically only be a child of a "playback right container" XMR object. The concept of output protection levels are further described in U.S. Pat. No. 8,725,646 filed Apr. 15, 2005, the contents of which are hereby incorporated by reference.

The explicit analog video output protection container object (optional), is a container for analog video output configuration objects. This container typically has a list of explicitly included analog video output protection technologies that have to be enumerated separately due to licensing restrictions.

The application program must typically employ one of the listed technologies when outputting content to analog outputs. This is in addition to any other restrictions on the output. Each listed output protection technology represents an addition requirement beyond the analog video output protection level. The listed technologies only apply to analog outputs. Content sent to digital outputs is not affected by the list. Fields for this object may include flags, object type, and object length. This container can typically only be a child of a "Playback Right Container" XMR object The analog video output configuration restriction object (optional) explicitly requires the use of a certain analog video output protection scheme and provides relevant configuration data to be used by the scheme. This object can typically only be a child of an "Explicit Audio Video Output Protection Container" XMR object A third additional container 710 may be the optional copy right container. Copy right grants the ability to make a copy of this license on another CE device. This object is also a container that may contain any data objects related to media copy policy. Fields may include flags, object type and object length. This container can typically only be a child of an "outer container" XMR object. Child objects 1-n 724, 724 of the copy right container 710 may include any or all of the following: copy count restriction (optional), and copy protection level restriction (Optional).

The copy count restriction (optional), restriction allows an absolute number of copies to be made of the digital media. When a copy of this license is made to another device, state is maintained about the number of copies made. If the copy count restriction is not specified in a license, the license may be copied freely. The existence of this object in a license defines the license to be stateful. If a license containing this restriction is copied to another device, the state associated with this restriction is not copied. Instead, the copied license should have the copy policy container and all the child objects stripped from the license. The copied license can only be used to play the content. If a license containing this restriction is backed up, the copy count restriction in the backed up license is set to the net number of copies left instead of the original copy count. This process attempts to protect the content provider by accounting for the copies already made. However, it is impossible to account for any copies made between the time when the license was backed up and when the license was restored. Fields for this object may include flags, object type, object length and copy count. Copy count specifies the typically absolute number of copies that can be made. This restriction can typically only be a child of a "Copy Right Container" XMR object.

The copy protection level restriction (optional), defines the minimum level of protection for a destination copy. If a content protection system that meets the minimum level is not available then the copy isn't allowed. Fields for this object may include flags, object type, object length, and a minimum copy protection level. The minimum copy protection may start out with a suitable default value. This object can only be a child of a "Copy Right Container" XMR object.

A fourth additional container 712 may be the optional allow playlist burn right container. The allow playlist burn right grants the right to burn the content to a CD as part of a playlist. This object is also used to contain any data objects related to playlist burn policy. CD burning is typically not considered to be a copy. If no restrictions are set, an unlimited number of playlist burns are permitted. This object may include fields for flags, object type, and object length. This object can typically only be a child of an "outer container" XMR object. Child objects of the allow playlist burn right container 712 may include the playlist burn restriction as a child object 728.

The playlist burn restriction (optional) specifies limits on the right to burn playlists. The maxplaylistburncount field specifies the number of times that content can be copied to a CD as part of a particular playlist. The playlistburntrackcount field specifies the number of times that content can be copied to a CD as part of any playlist. The existence of this restriction in a license defines the license to be stateful. If a license containing this restriction is copied to another device, the state associated with this restriction is not copied. Instead, the entire CD burn policy container is not copied to the destination device. As such, the destination device may not burn CDs. If a license containing this restriction is backed up, the maxPlaylistburncount restriction is backed up intact. That is, a restored copy of the license is allowed to create copies of any particular play list. Due to the nature of this restriction, any other design would have to backup all of the play lists this license was used in. If a license containing this restriction is backed up, the playlistburntrackcount restriction in the backed up license is set to the net number of burns left instead of the original burn count. This process attempts to protect the content provider by accounting for the burns already consumed. However, it is impossible to account for any burns made between the time when the license was backed up and when the license was restored. Fields for this object may include flags, object type, object length, maxplaylistburncount, and playlistburntrackcount. Playlistburntrackcount right specifies the number of times the consumer is allowed to copy this particular media file within any playlist to a CD This object can only be a child of an "Allow Playlist Burn Right container" XMR object.

A fifth additional container may be the key material container object 714. The previously presented CD burn right grants the right to burn the content to a CD. This object 714 is also used to contain any data objects related to media CD burn policy. CD burning is not considered to be a copy. This right may be superseded by the allow playlist burn right, which should be used by content providers. Fields for this object may include flags, object type, and object length. Provision for this right is an example of backwards compatibility. This object can typically only be a child of an "outer container" XMR object. Child objects 1-n 732-734 may include: the content key object (optional), the RSA device key object (optional), and the uplink KID object (optional).

The content key object (optional) is used to contain any data objects related to key material and content encryption. Fields for the object may include flags, object type and object length. This object can typically only be a child of an "Outer Container" XMR object. This object is described further below.

The RSA device key object (optional), described more fully below, holds an encrypted version of the content key, and information about the crypto ciphers necessary to decrypt the key and then the content itself. DRM protected content typically contains a key ID identifying the key used to encrypt the content. That key ID is matched with the key ID in the Content key object to identify the license or licenses that contain the content key for the content. Fields for this object may include flags, object type, object length, key ID, symmetric cipher type, key encryption cipher type, encrypted key length, and encrypted key data. Key ID identifies the content key. Encrypted key length specifies the size of the encrypted key data. The encrypted key data buffers (the key data) encrypted using the specified Key Encryption Cipher type. The Symmetric Cipher Type defines how to interpret the decrypted buffer. This object can typically only be a child of a "Key Material Container" XMR object. In this application the key data is actually a combination of the content key and the integrity key typically used to sign the license. This combination of keys ties the signature to the creator of the license. This combination of keys also tends to eliminate any need for a PK based signature that might be present.

The uplink KID object (optional) specifies the key ID of the uplink license in chain of chained licenses. The uplink license contains the key used to encrypt the encrypted key in the content key object, and a chained checksum. The uplink KID object is present when this license is chained to another license instead of being granted to a device. The content key object indicates that the license is chained to another license by specifying a key encryption cipher type of "chained license". In that case, the uplink KID object points to an uplink license. Fields may include flags, object type, object length, and uplink KID object including a chained checksum. Uplink KID specifies the Key ID of the license containing the content key used to encrypt the encrypted key. The chained checksum is typically a hash of the key from the uplink license That uplink license itself contains a content key.

As may be seen above extensibility may be provided in the XMR DRM license. XMR typically allows extensions to be introduced by defining new objects. Older XMR parsers typically ignore any objects that they do not know how to parse (unless the object is marked with a must understand flag), and may continue to parse any data following the unknown object. New objects may be introduced by nesting.

The outer XMR container 704 constructed in accordance with the base XMR object which includes the remainder of the XMR binary representation following the header which may be composed of logically nested "objects" 706, 708, 710, 712, 714 which are simply self-descriptive tag/length/value tuples. All XMR representations may contain multiple derived objects with certain portions of the logical ordering and nesting structure being mandatory in this example. The designations of mandatory and optional used in this particular example are not intended to imply that other alternative examples must be limited by the same optional and mandatory designations.

FIG. 8 is a block diagram showing a computer processor capable of processing an XMR license structure. Exemplary computing environment 800 is only one example of a computing system and is not intended to limit the examples described in this application to this particular computing environment.

The computing environment 800 can be implemented with numerous other general purpose or special purpose computing system configurations. Examples of well known computing systems, may include, but are not limited to, personal computers, hand-held or laptop devices, microprocessor-based systems, multiprocessor systems, set top boxes, programmable consumer electronics, gaming consoles, consumer electronics, cellular telephones, PDAs, and the like.

The computer 800 includes a general-purpose computing system in the form of a computing device 801. The components of computing device 801 can include one or more processors (including CPUs, GPUs, microprocessors and the like) 807, a system memory 809, and a system bus 808 that couples the various system components. Processor 807 processes various computer executable instructions to control the operation of computing device 801 and to communicate with other electronic and computing devices (not shown). The system bus 808 represents any number of several types of bus structures, including a memory bus or memory controller, a peripheral bus, an accelerated graphics port, and a processor or local bus using any of a variety of bus architectures.

The system memory 809 includes computer-readable media in the form of volatile memory, such as random access memory (RAM), and/or non-volatile memory, such as read only memory (ROM). A basic input/output system (BIOS) is stored in ROM. RAM typically contains data and/or program modules that are immediately accessible to and/or presently operated on by one or more of the processors 807.

Mass storage devices 804 may be coupled to the computing device 801 or incorporated into the computing device by coupling to the buss. Such mass storage devices 804 may include a magnetic disk drive which reads from and writes to a removable, non volatile magnetic disk (e.g., a "floppy disk") 805, or an optical disk drive that reads from and/or writes to a removable, non-volatile optical disk such as a CD ROM or the like 806. Computer readable media 805, 806 typically embody computer readable instructions, data structures, program modules and the like supplied on floppy disks, CDs, portable memory sticks and the like.

Any number of program modules can be stored on the hard disk 810. For example a number of XMR licenses 700. Mass storage device 804, ROM and/or RAM 809, including by way of example, an operating system, one or more application programs, other program modules, and program data. Each of such operating system, application programs, other program modules and program data (or some combination thereof) may include an embodiment of the systems and methods described herein.

A display device 802 can be connected to the system bus 808 via an interface, such as a video adapter 811. A user can interface with computing device 802 via any number of different input devices 803 such as a keyboard, pointing device, joystick, game pad, serial port, and/or the like. These and other input devices are connected to the processors 807 via input/output interfaces 812 that are coupled to the system bus 808, but may be connected by other interface and bus structures, such as a parallel port, game port, and/or a universal serial bus (USB).

Computing device 800 can operate in a networked environment using connections to one or more remote computers through one or more local area networks (LANs), wide area networks (WANs) and the like. The computing device 801 is connected to a network 814 via a network adapter 813 or alternatively by a modem, DSL, ISDN interface or the like.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A computer implemented method of accessing rights-protected data at a client receiver device, the computer implemented method comprising:
   receiving, by the client receiver device, an extensible media rights (XMR) license;

bonding, by the client receiver device, the XMR license to the device;

receiving, by the client receiver device, a request to access content;

parsing, by the client receiver device, the XMR license;

extracting, by the client receiver device, from the parsed XMR license one more objects, including:

a minimum environment restriction object, the minimum environment restriction object indicating first minimum version of a revocation list that the client receiver device must adhere to before accessing the content, and a device key object, defines a public key of the client receiver device to which the XMR license is bound to;

retrieving, by the client receiver device, the first minimum version of the revocation list indicated by the minimum environment restriction object;

accessing, by the client receiver device, a device certificate, the device certificate including a second minimum version of a revocation list and a public key of the client receiver device;

comparing, by the client receiver device, the retrieved first minimum version of the revocation list with the second minimum version of a revocation list stored in the device certificate;

extracting from the parsed XMR license the device key object;

determining, by the client receiver device, that the second minimum version of the revocation list stored in the device certificate is greater than or equal to the retrieved first minimum version of the revocation list from the parsed XMR license and the public key of the client receiver device is associated with the device key object; and based on the determining that the second minimum version of the revocation list stored in the device certificate is greater than or equal to the retrieved first minimum version of the revocation list from the parsed XMR license and the public key of the client receiver device is associated with, the device key object, accessing the content.

2. The computer implemented method of claim 1, wherein the minimum environment restriction object also indicates a lowest security level that the client receiver device must adhere to before it can access the content.

3. The computed implemented method of claim 2, wherein the lowest security level is determined by comparing a security value from the XMR license with a security value from a digital certificate that uniquely identifies the client receiver device.

4. The computer implemented method of claim 3, further comprising:

determining that the digital certificate is greater than or equal to the security value from the XMR license;

based on the determining that the digital certificate is greater than or equal to the security value from the XMR license, the XMR license is used to access the content.

5. The computer implemented method of claim 1, wherein the minimum environment restriction object indicates a minimum application revocation list version.

6. The computer-implemented method of claim 1, wherein a content key is combined with an integrity key to sign in the XMR license.

7. The computer implemented method of claim 1, wherein the device key object indicates a symmetric cipher type that defines how to interpret decrypted key data.

8. The computer implemented method of claim 1, wherein the minimum environment restriction object is a child object of a Global Policy Container XMR object.

9. The computer implemented method of claim 8, wherein the device key object is a child object of a Key Material Container XMR object.

10. The computer implemented method of claim 9, wherein the Global Policy Container XMR object and the Key Material Container XMR object are nested in an outer container object of the XMR license.

11. A computer system for accessing rights-protected data at a client receiver device, the computer system comprising:

at least one processor; and at least one computer storage device, communicatively coupled to the at least one processor and containing computer-readable instructions that, when executed by the at least one processor, causes the one processor to performs a method comprising:

receiving an extensible media rights (XMR) license;

bonding, by the client receiver device, the XMR license to the device;

receiving a request to access content;

parsing the XMR license;

extracting from the parsed XMR license one more objects, including:

a minimum environment restriction object, the minimum environment restriction object indicating first minimum version of a revocation list that the client receiver device must adhere to before accessing the content, and a device key object, defines the public key of the client receiver device to which the XMR license is bound to;

accessing a device certificate, the device certificate including a second minimum version of a revocation list and a public key of the client receiver device;

comparing the retrieved first minimum version of the revocation list with the second minimum version of a revocation list stored in the device certificate; extracting from the parsed XMR license the device key object;

determining that the second minimum version of the revocation list stored in the device certificate is greater than or equal to the retrieved first minimum version of the revocation list from the parsed XMR license and that the public key of the client receiver device is associated with, defined by the device key object; and based on the determining that the second minimum version of the revocation list stored in the device certificate is greater than or equal to the retrieved first minimum version of the revocation list from the parsed XMR license and the public key of the client receiver device is associated with the device key object, accessing the content.

12. The computer system of claim 11, wherein the minimum environment restriction object also indicates a lowest security level that the client receiver device must adhere to before it can access the content.

13. The computer system of claim 12, wherein the lowest security level is determined by comparing a security value from the XMR license with a security value from a digital certificate that uniquely identifies the client receiver device.

14. The computer system of claim 13, determining that the digital certificate is greater than or equal to the security value from the XMR license;

based on the determining that the digital certificate is greater than or equal to the security value from the XMR license, the XMR license is used to access the content.

15. The computer system of claim 11, wherein the minimum environment restriction object indicates a minimum application revocation list version.

16. The computer system of claim 11, wherein a content key is combined with a integrity key to sign the XMR license.

17. The computer system of claim 11, wherein the device key object indicates a symmetric cipher type that defines how to interpret decrypted key data.

18. The computer system of claim 11, wherein the minimum environment restriction object is a child object of a Global Policy Container XMR object.

19. The computer system of claim 18, wherein the device key object is a child object of a Key Material Container XMR object.

20. The computer system of claim 19, wherein the Global Policy Container XMR object and the Key Material Container XMR object are nested in an outer container object of the XMR license.

\* \* \* \* \*